June 19, 1962  R. E. EDMINSTER ETAL  3,039,682
DOCUMENT READING AND SORTING MACHINE
Filed Dec. 31, 1956  46 Sheets-Sheet 6

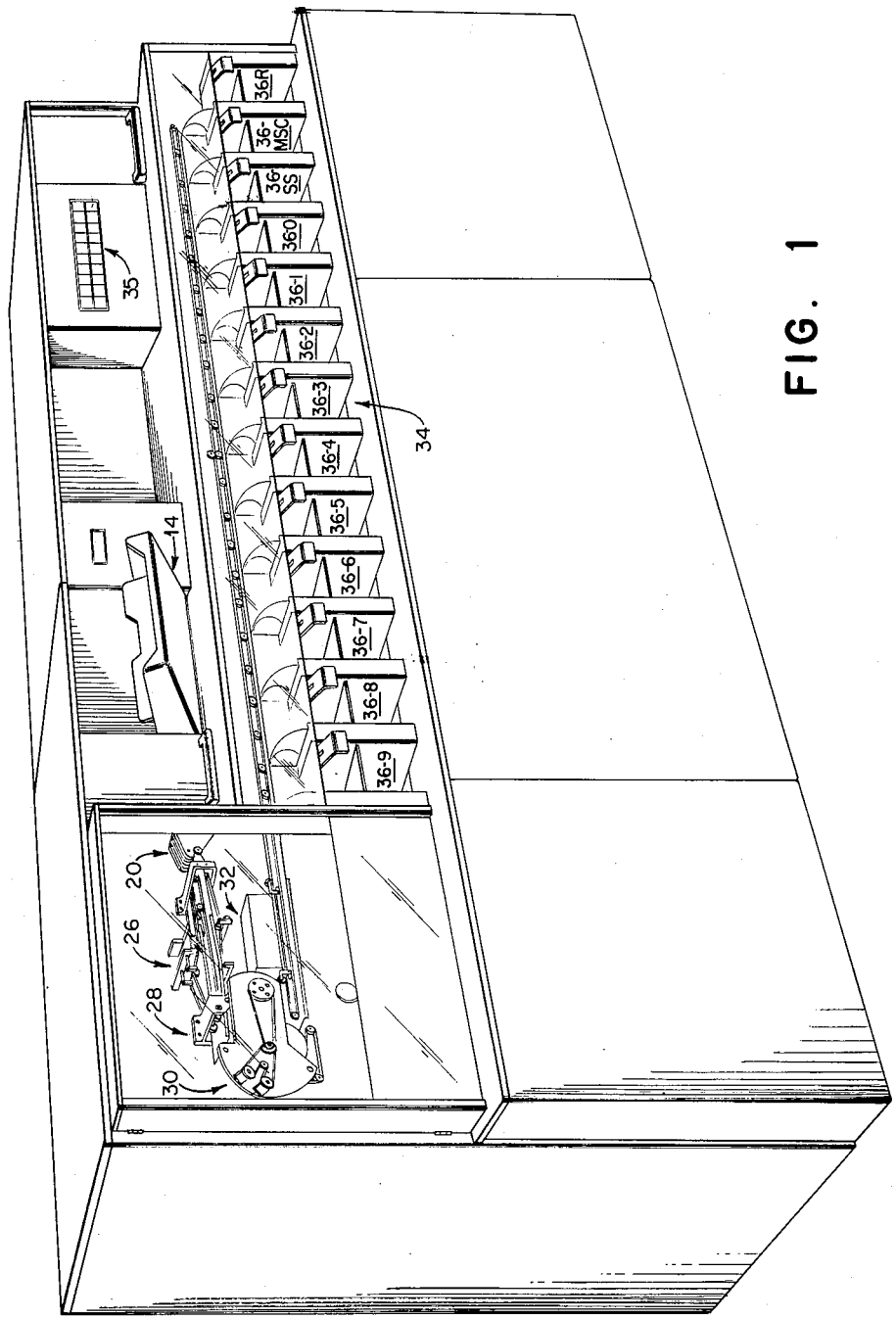

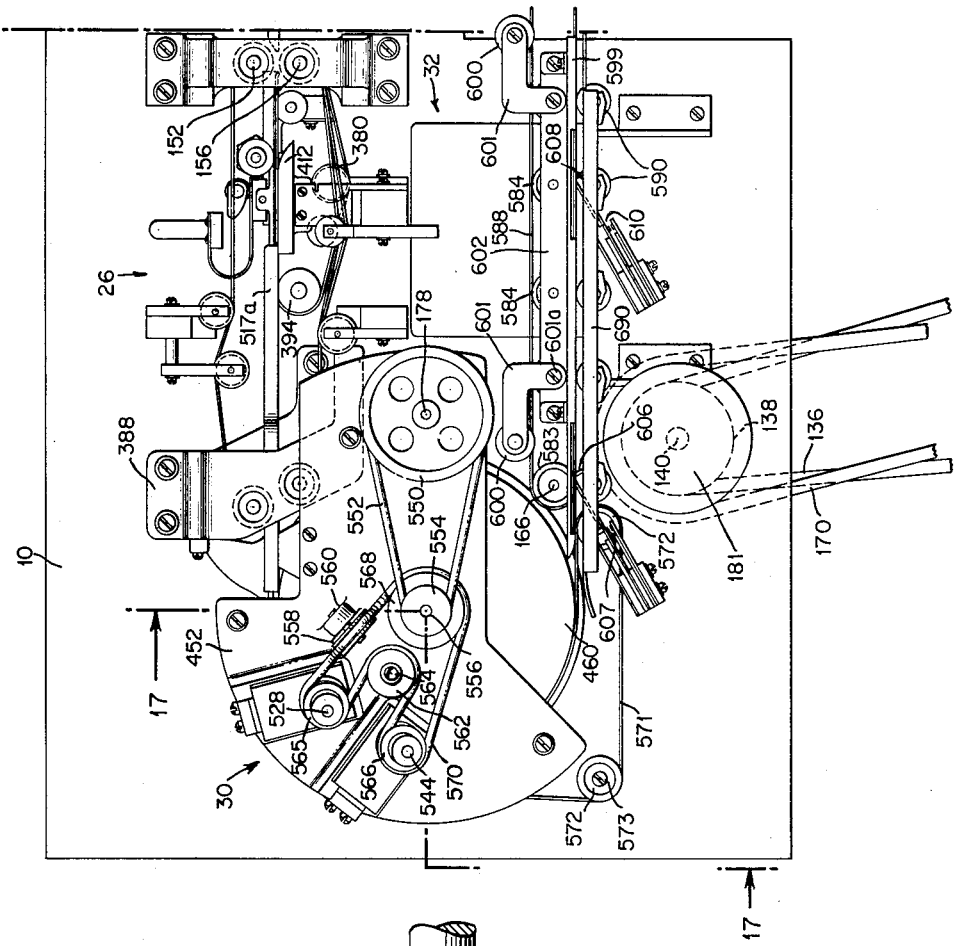

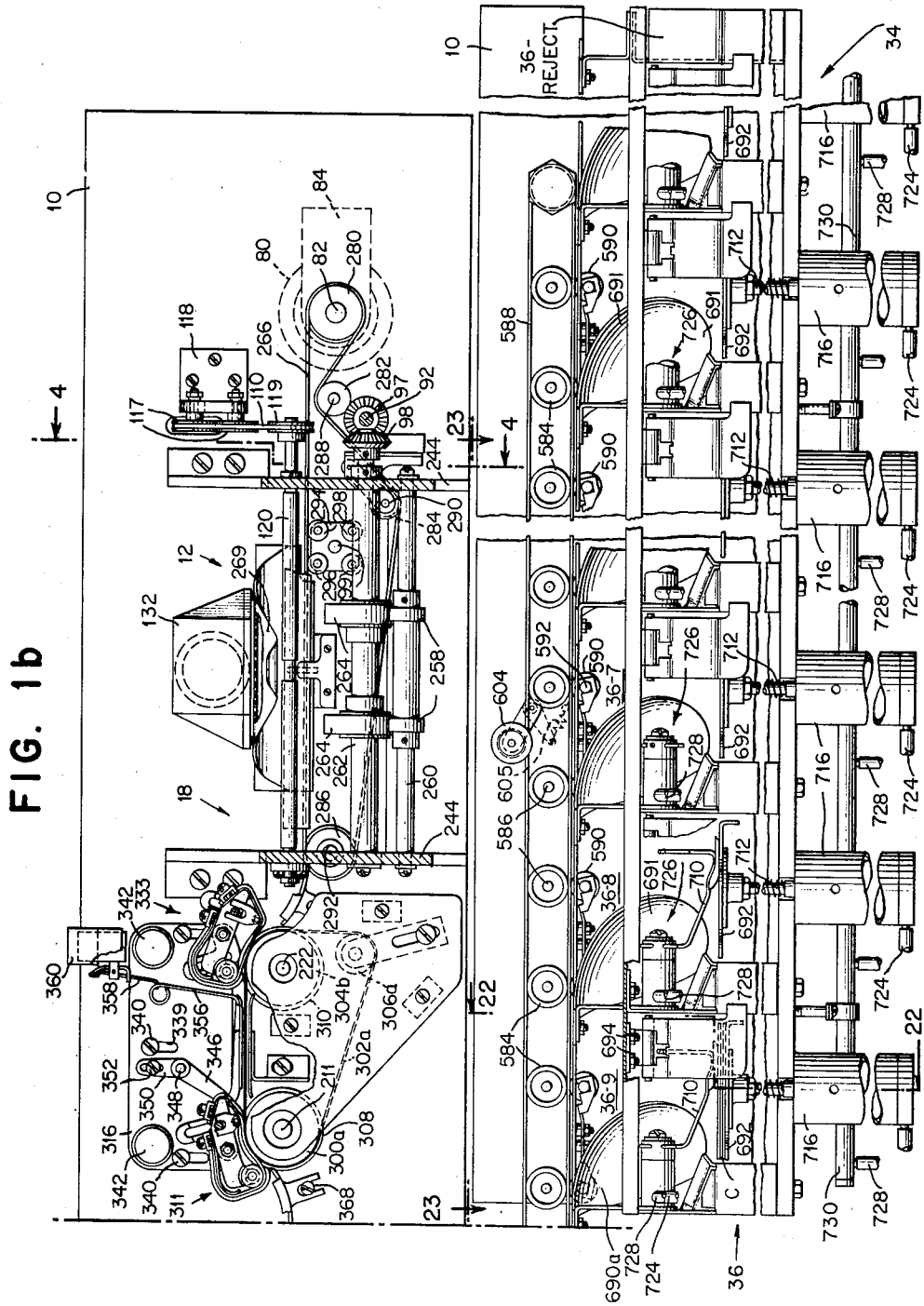

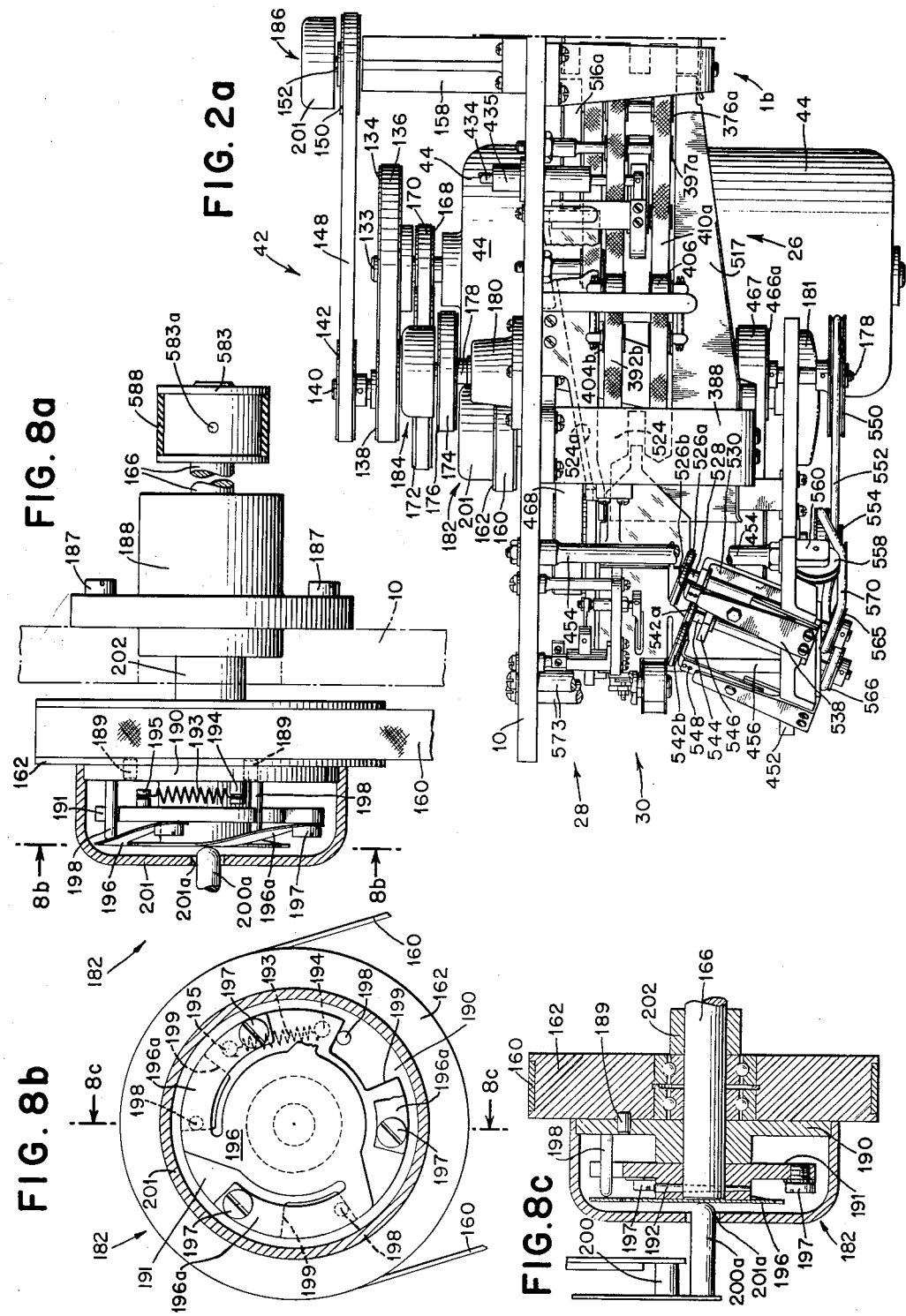

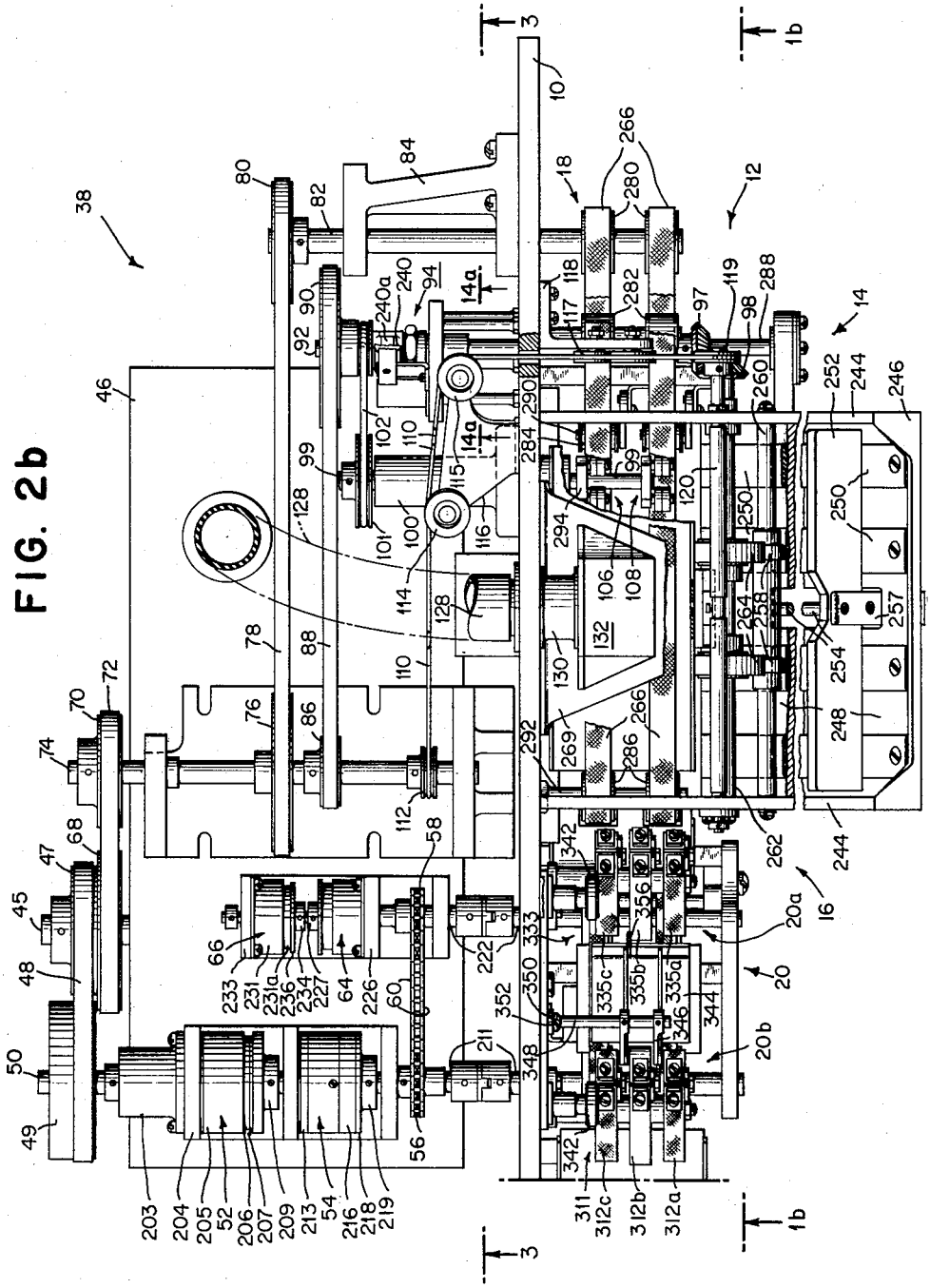

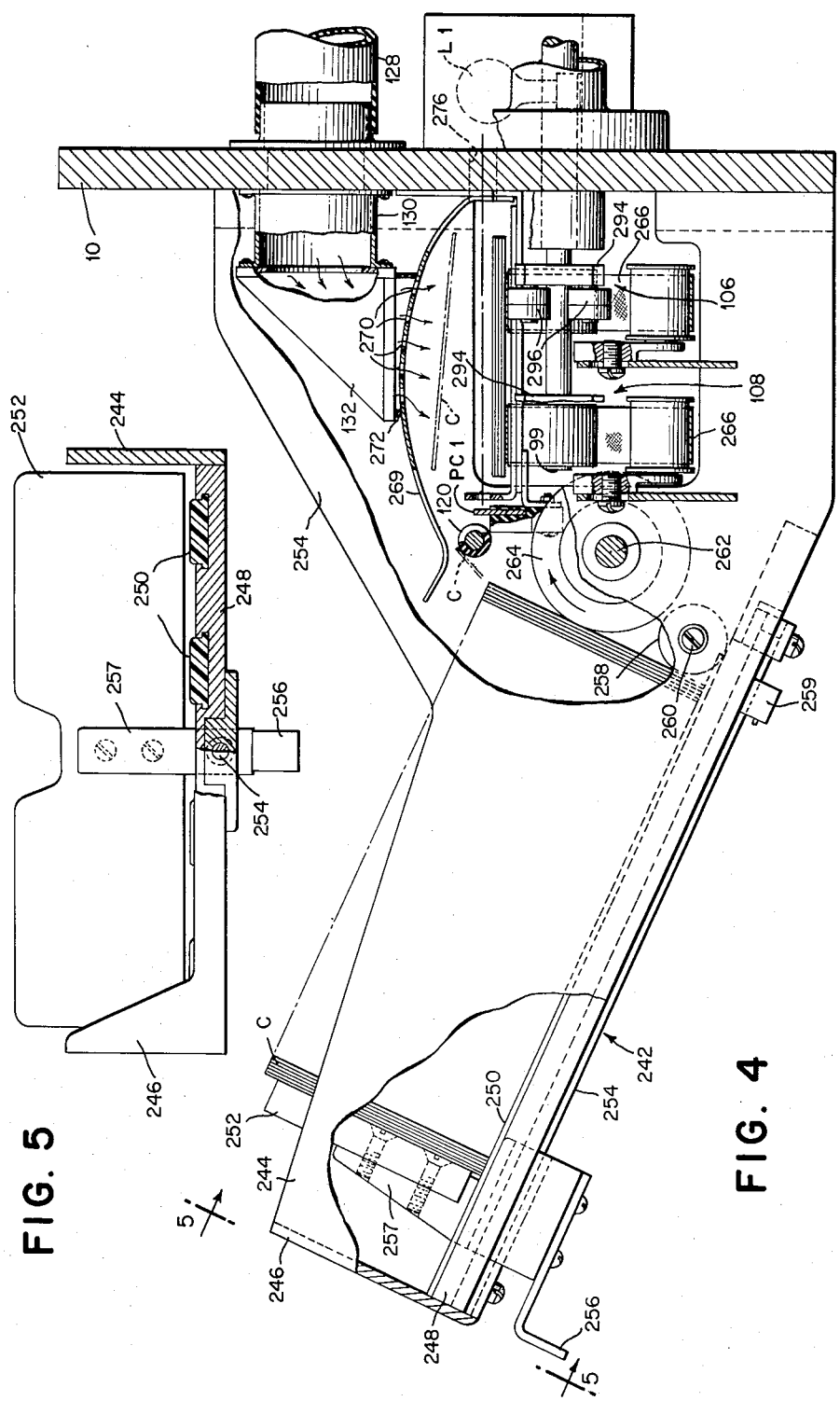

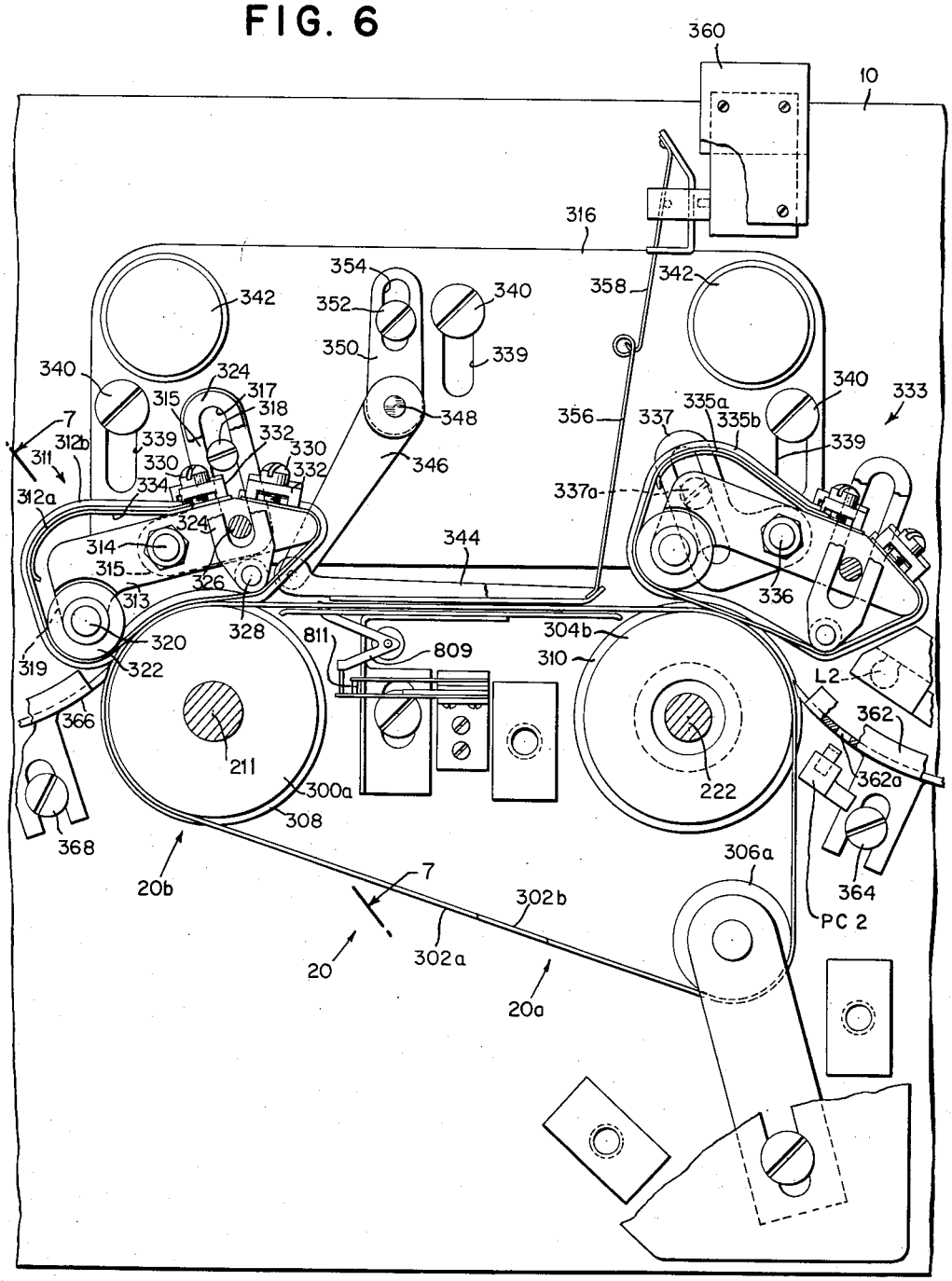

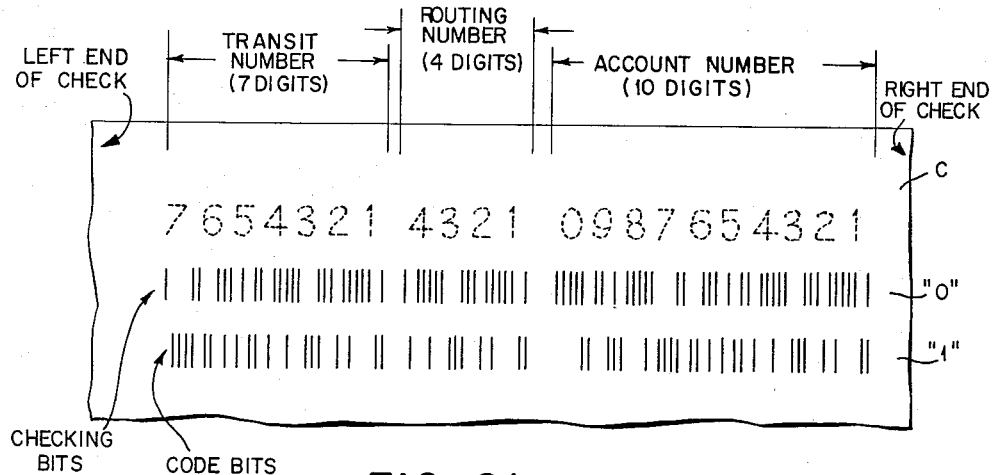
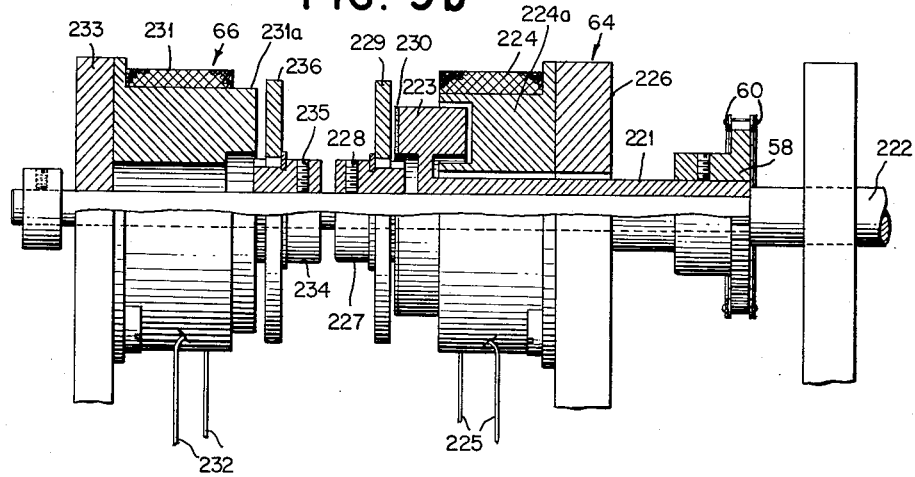
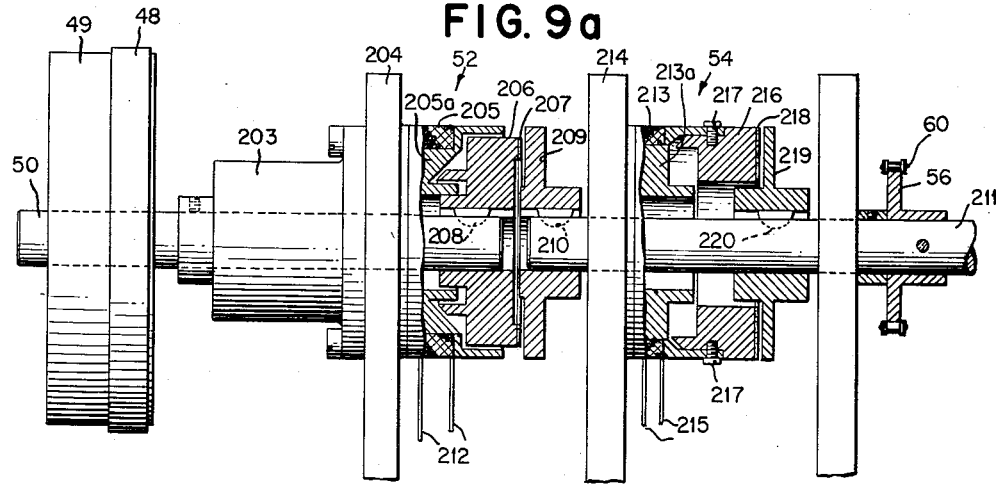

June 19, 1962

R. E. EDMINSTER ETAL 3,039,682

DOCUMENT READING AND SORTING MACHINE

Filed Dec. 31, 1956

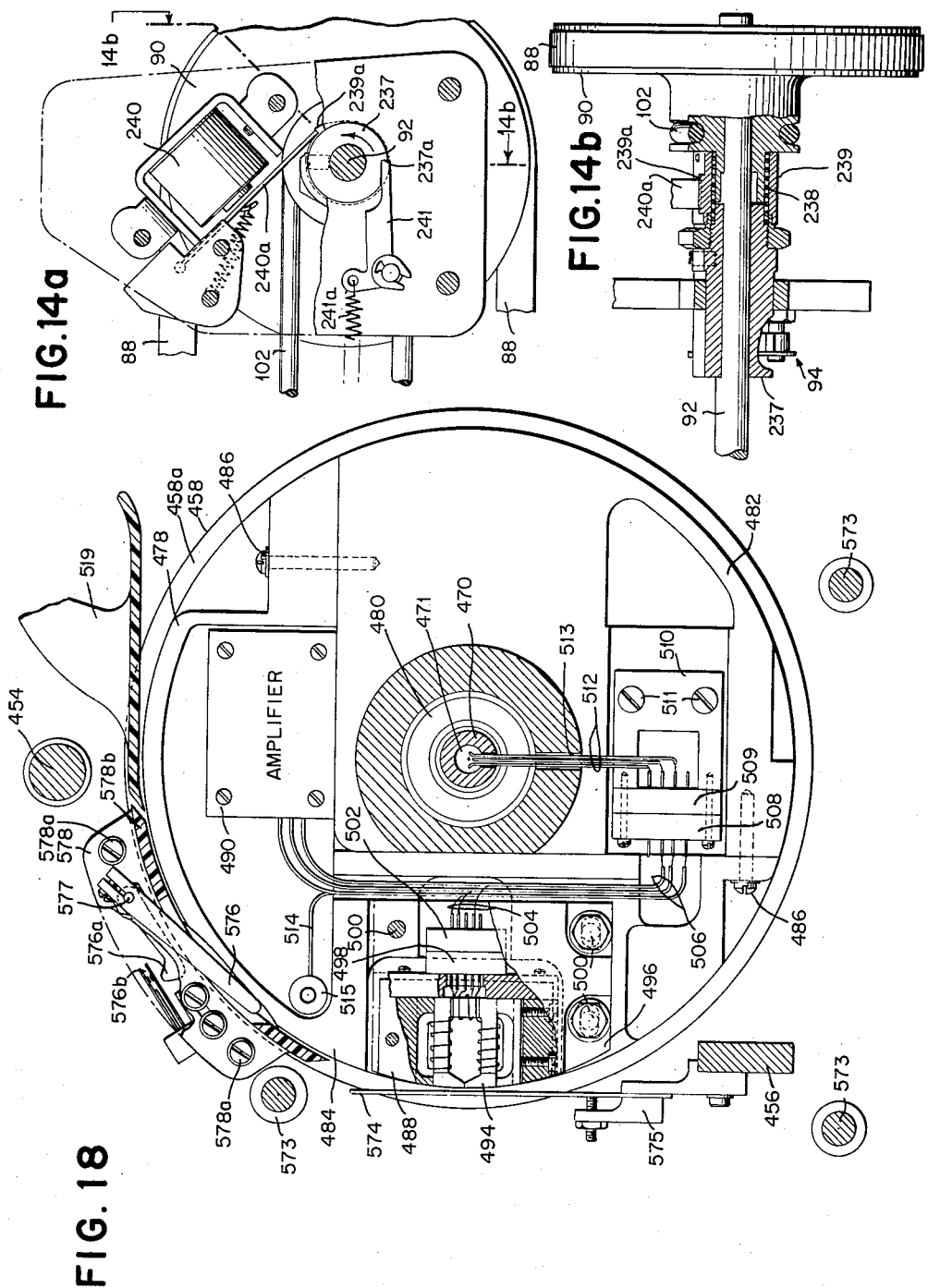

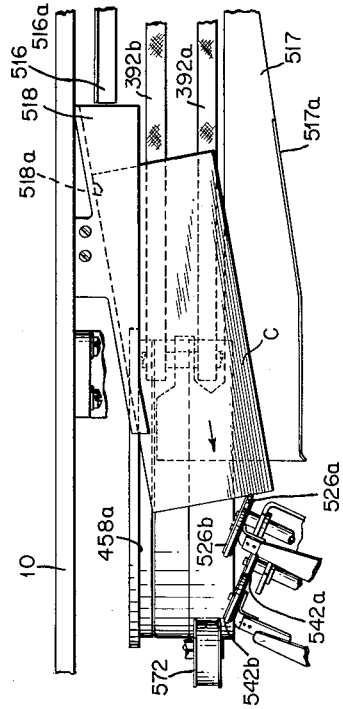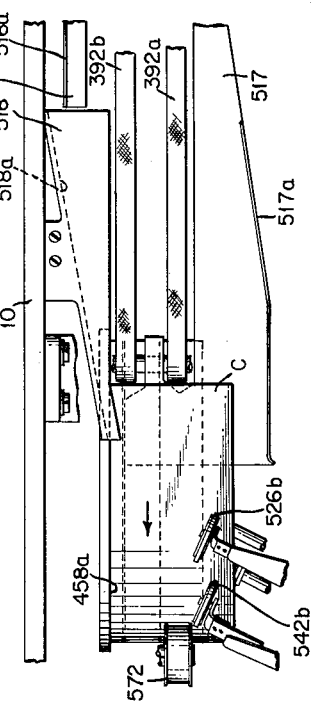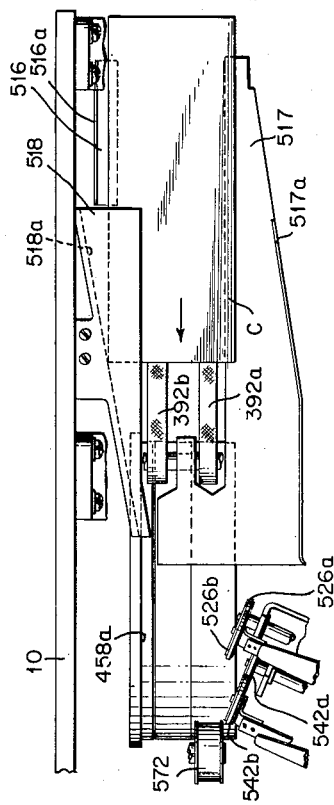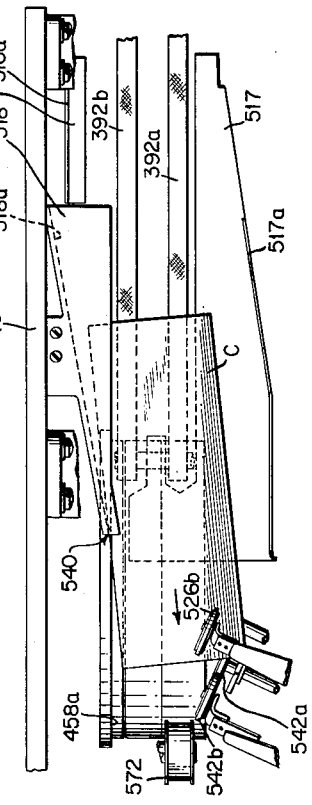

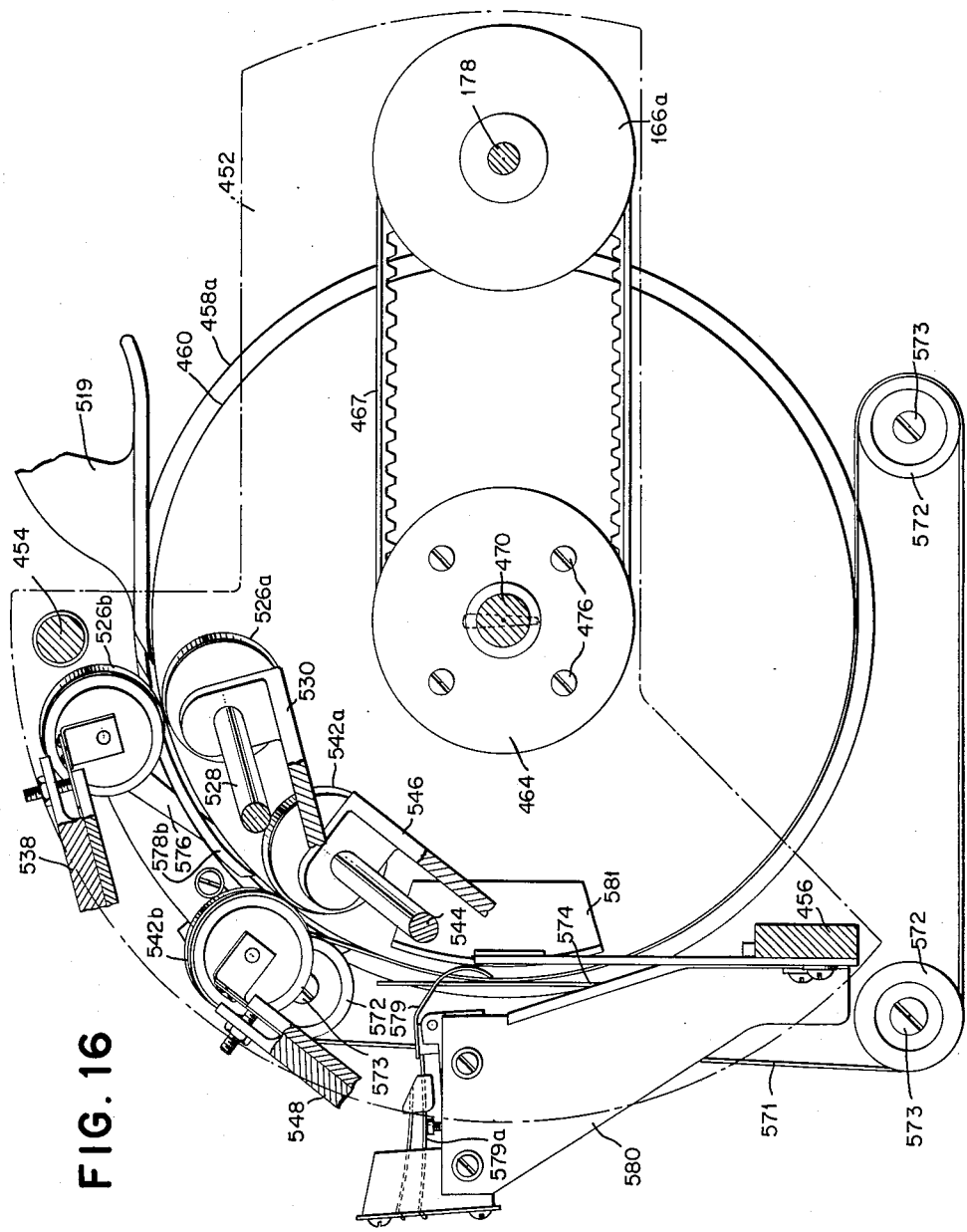

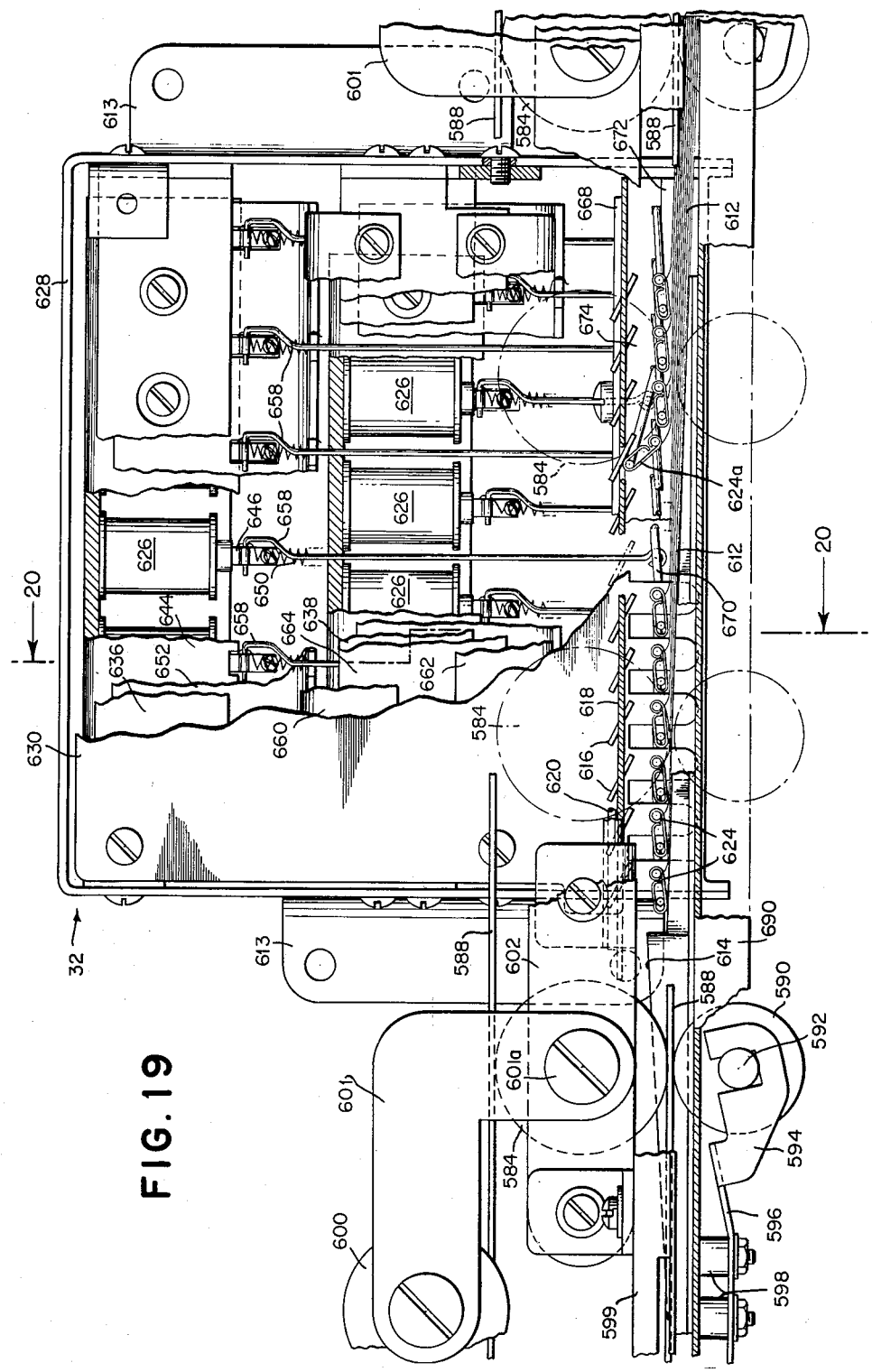

June 19, 1962 R. E. EDMINSTER ETAL 3,039,682
DOCUMENT READING AND SORTING MACHINE
Filed Dec. 31, 1956 46 Sheets-Sheet 19

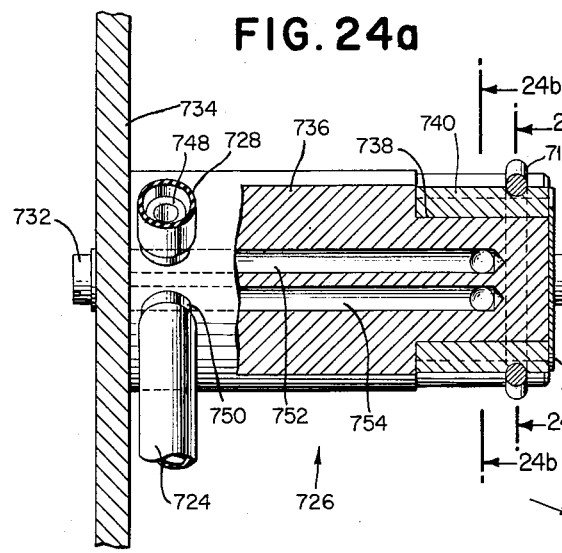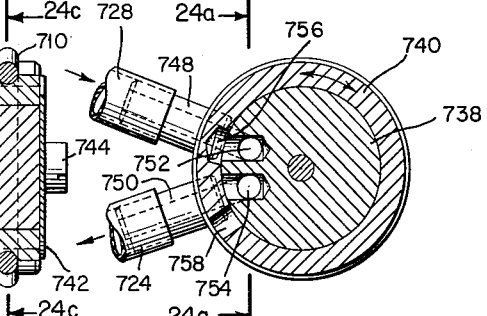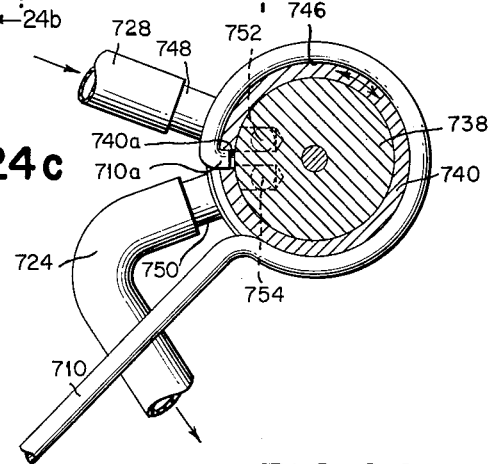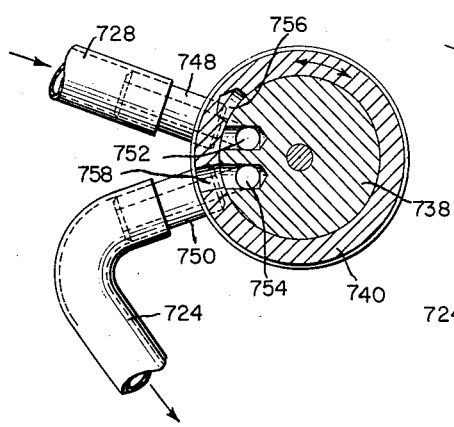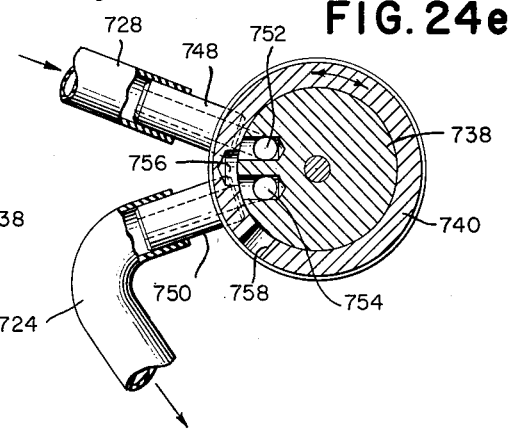

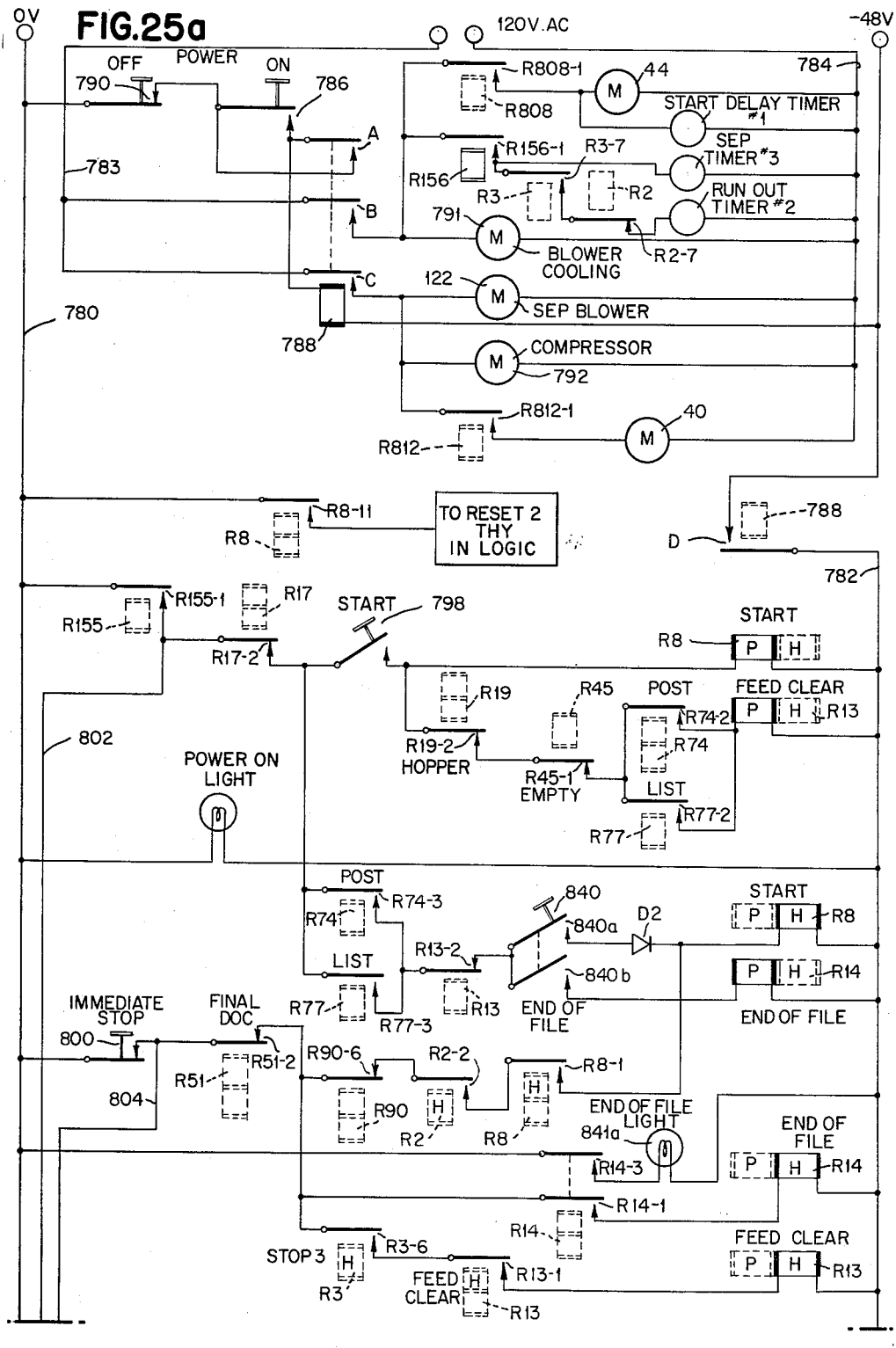

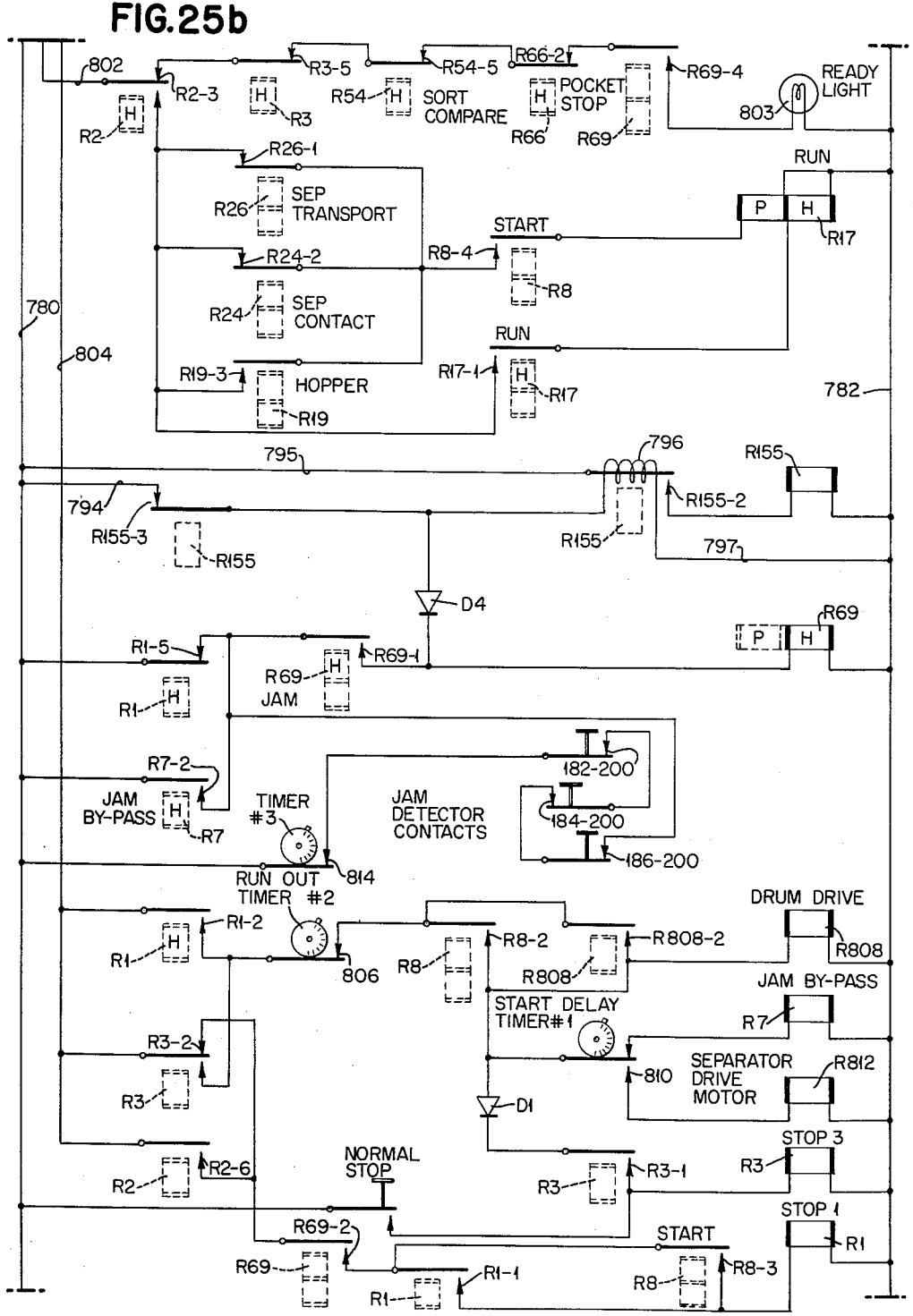

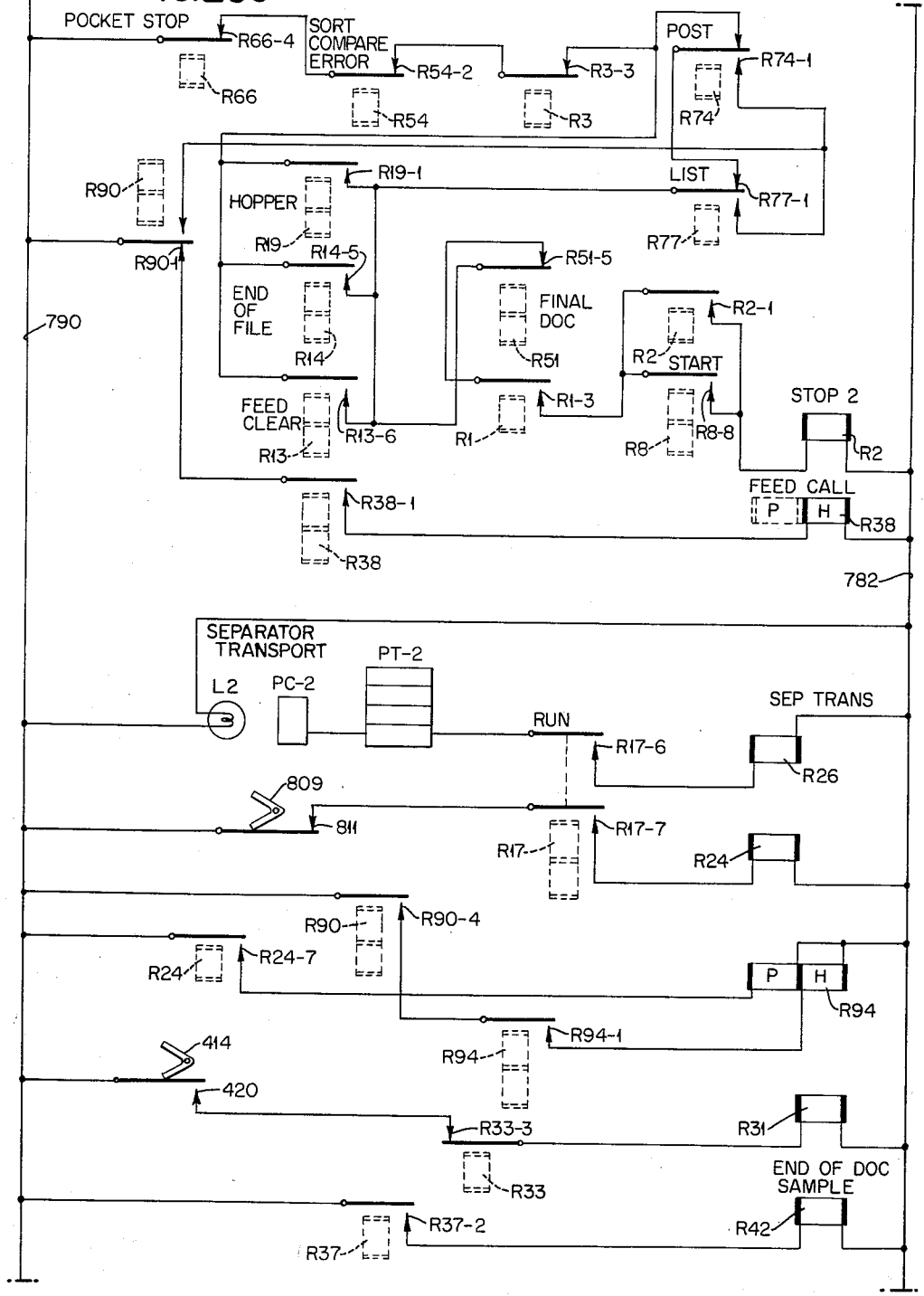

June 19, 1962 R. E. EDMINSTER ETAL 3,039,682
DOCUMENT READING AND SORTING MACHINE
Filed Dec. 31, 1956 46 Sheets-Sheet 25

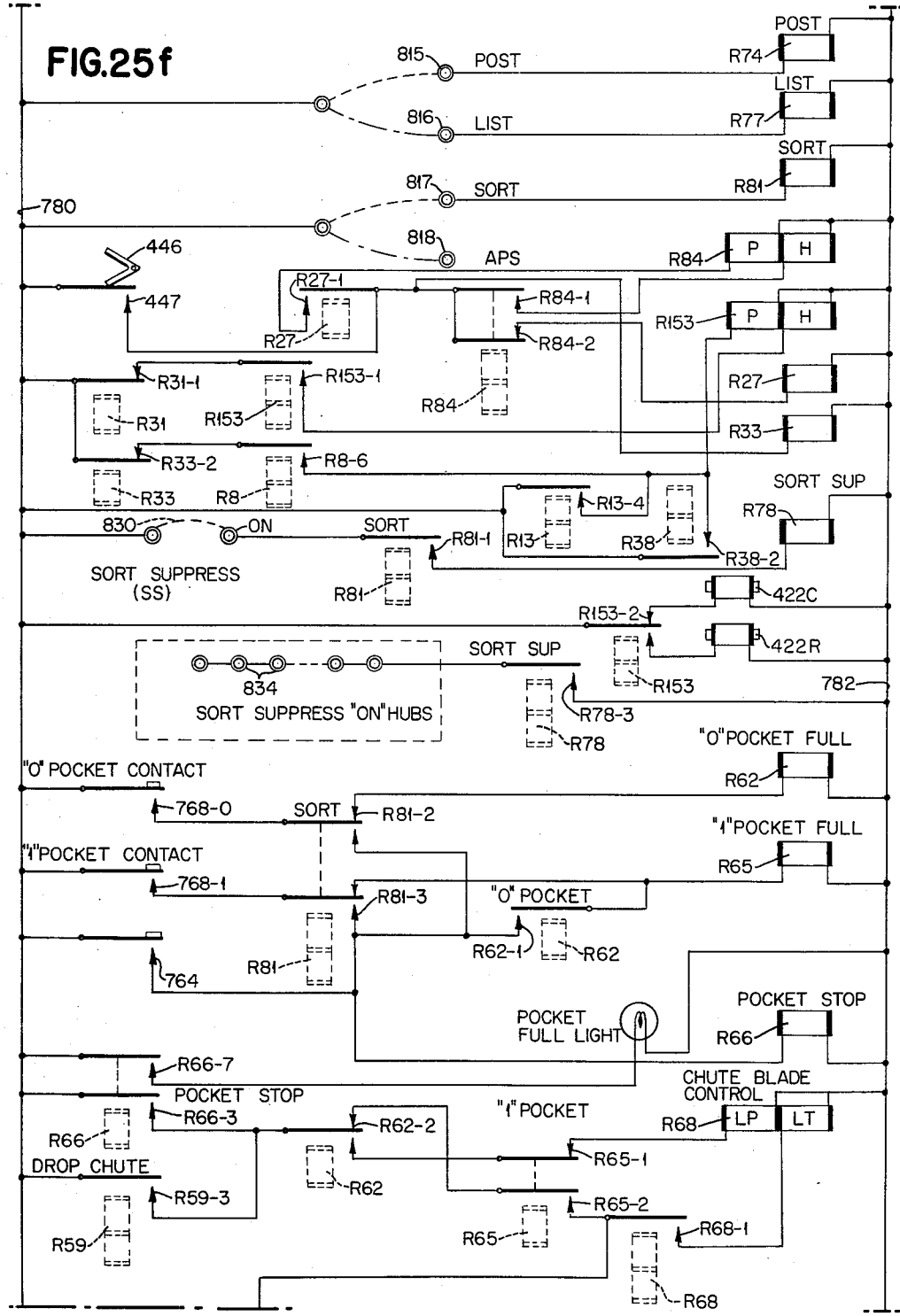

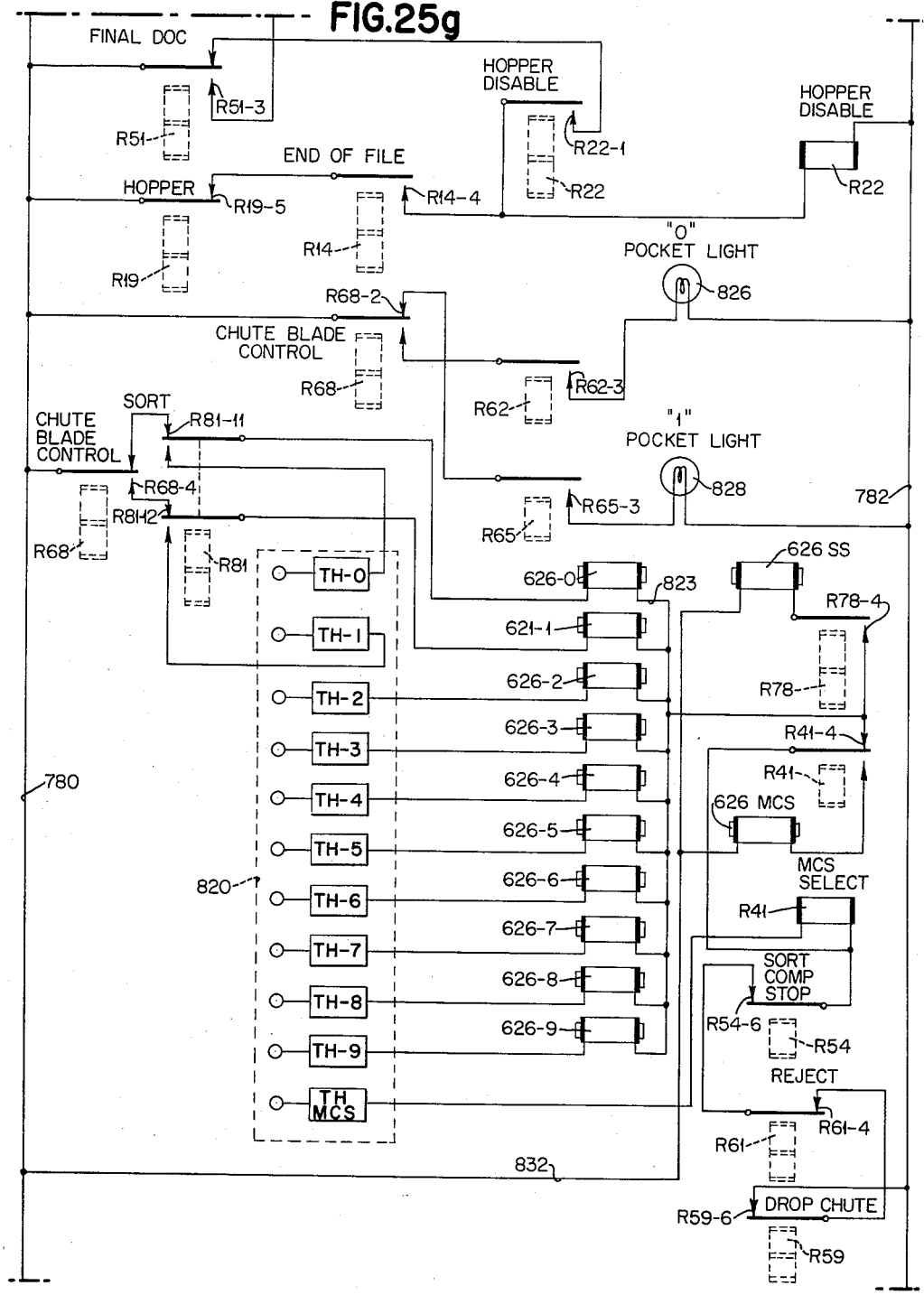

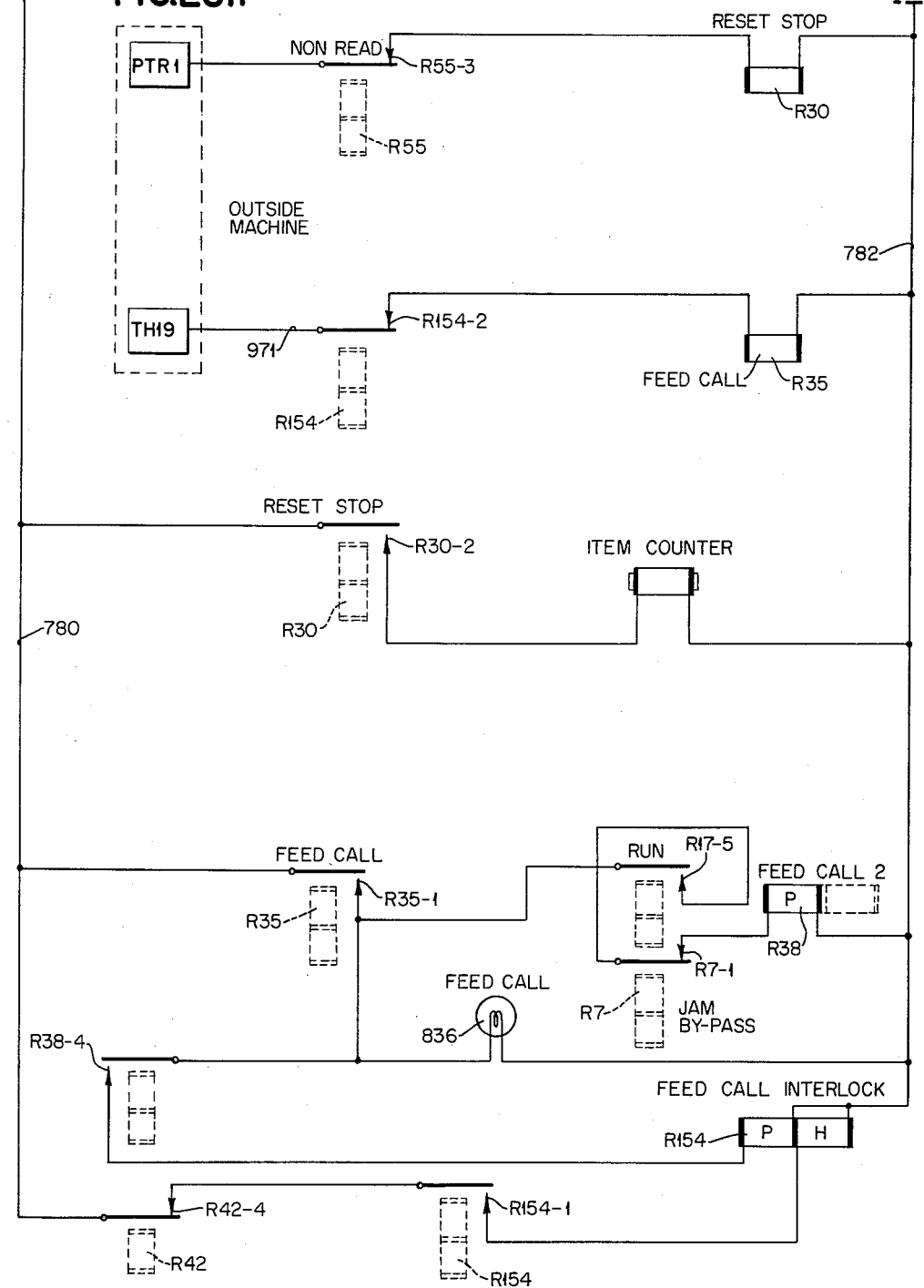

June 19, 1962 R. E. EDMINSTER ETAL 3,039,682
DOCUMENT READING AND SORTING MACHINE
Filed Dec. 31, 1956 46 Sheets-Sheet 30

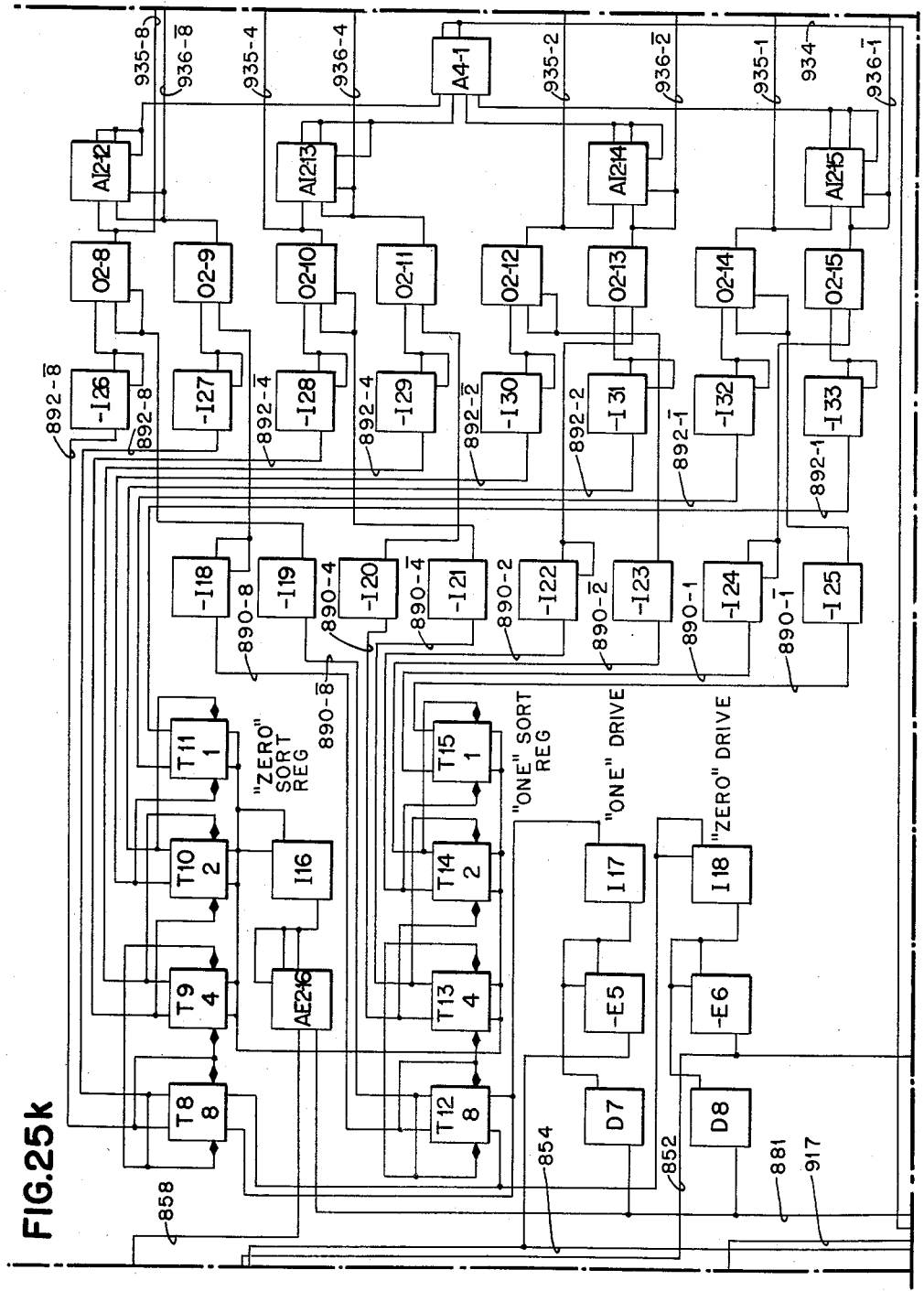

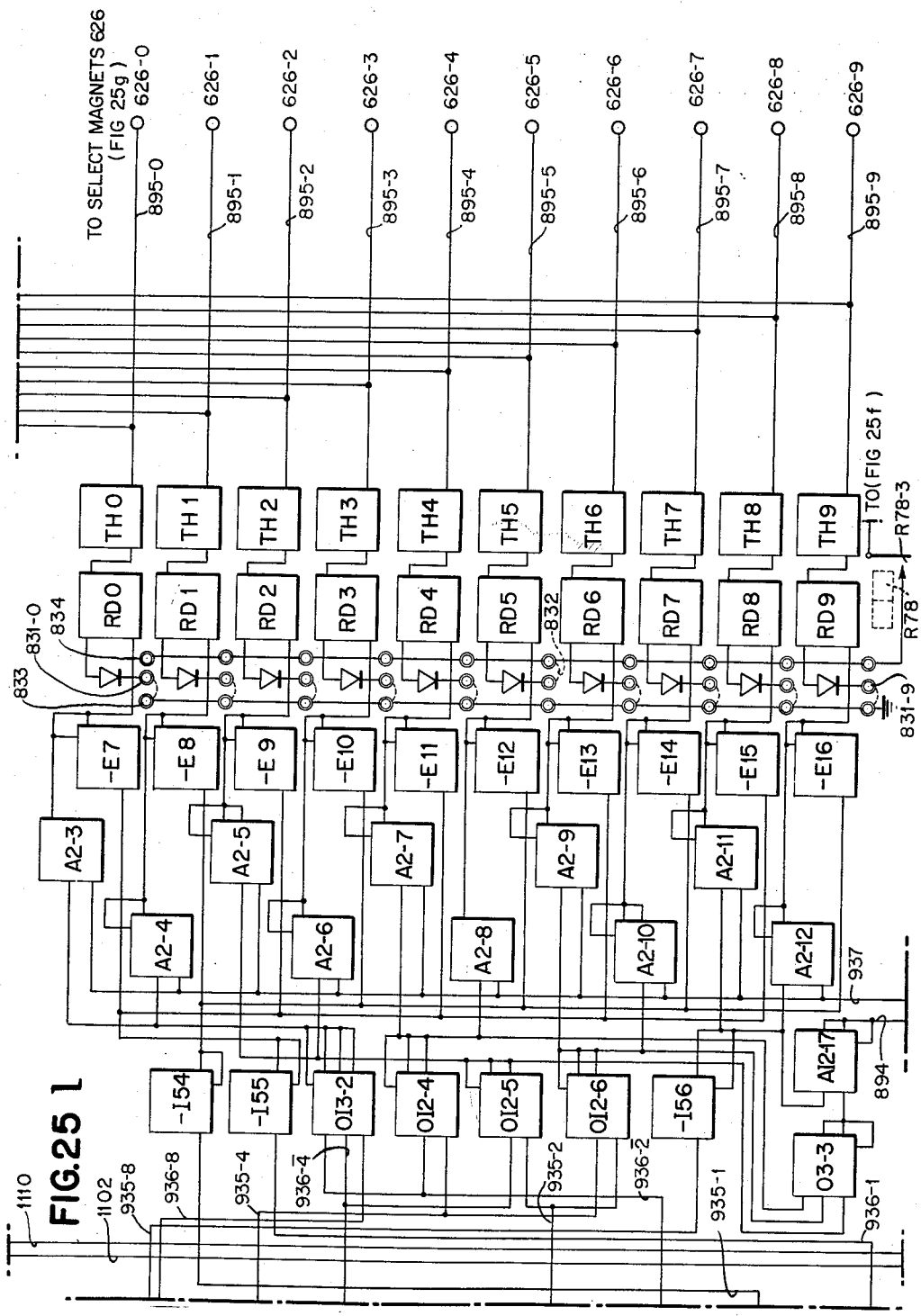

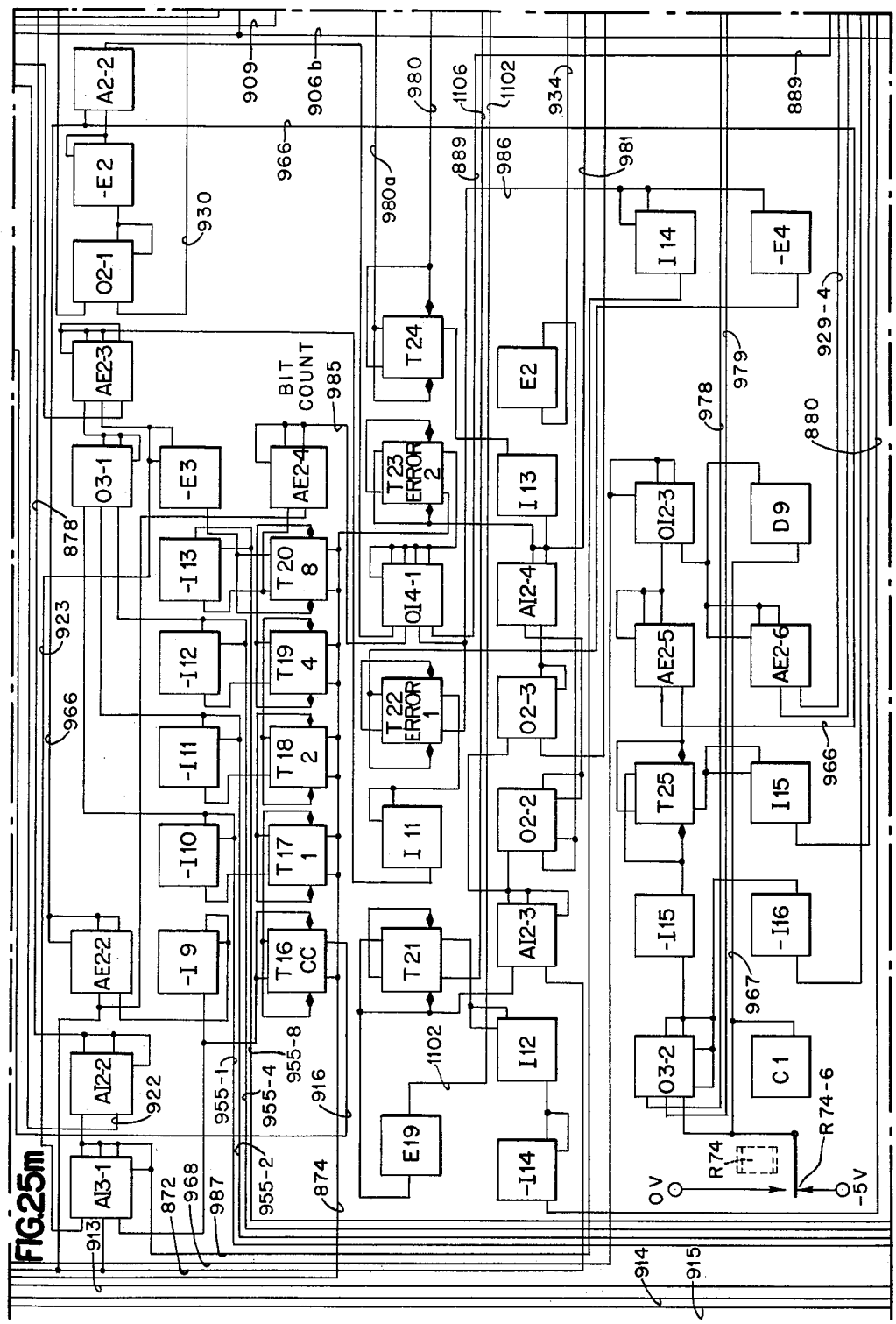

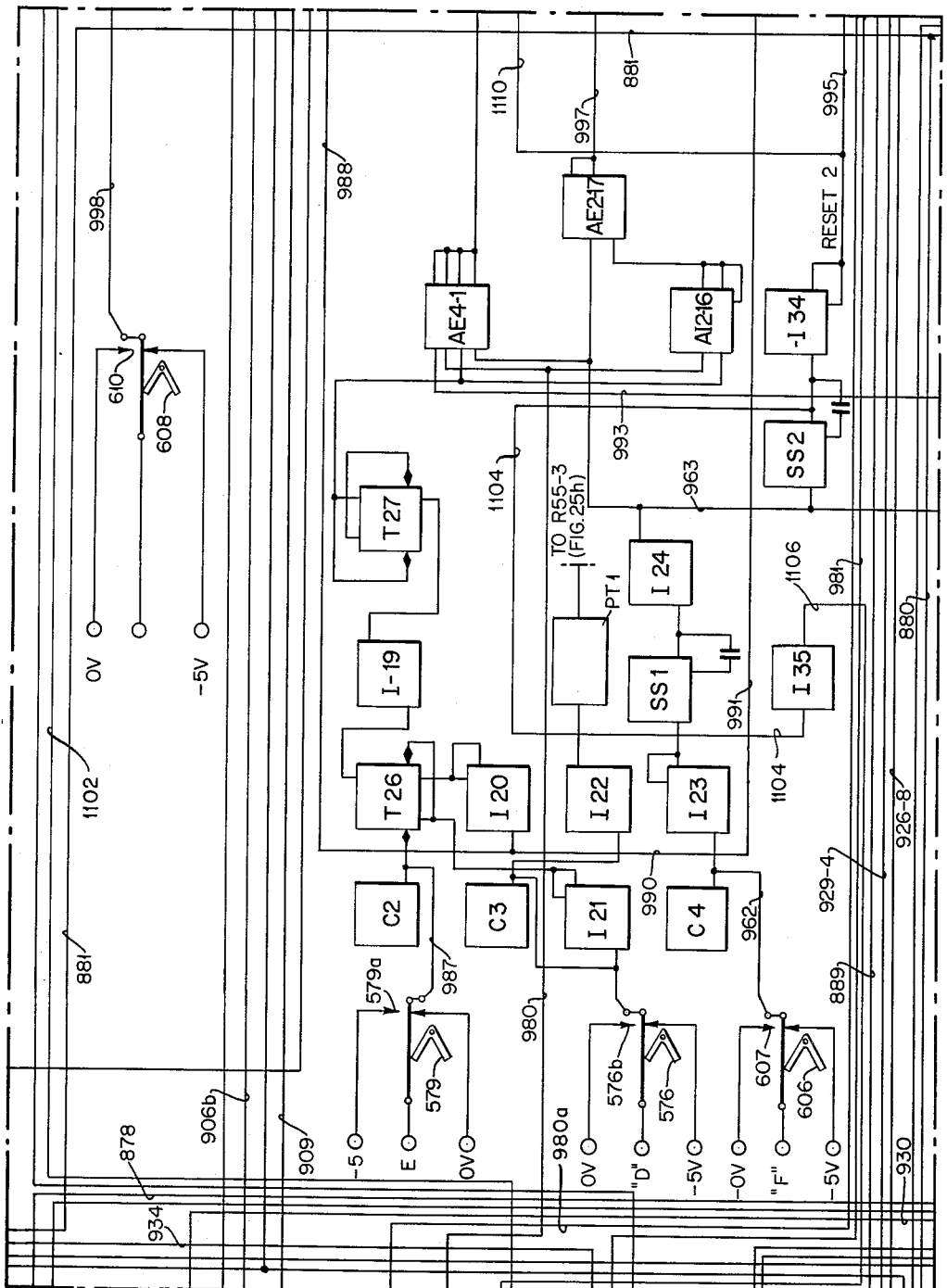

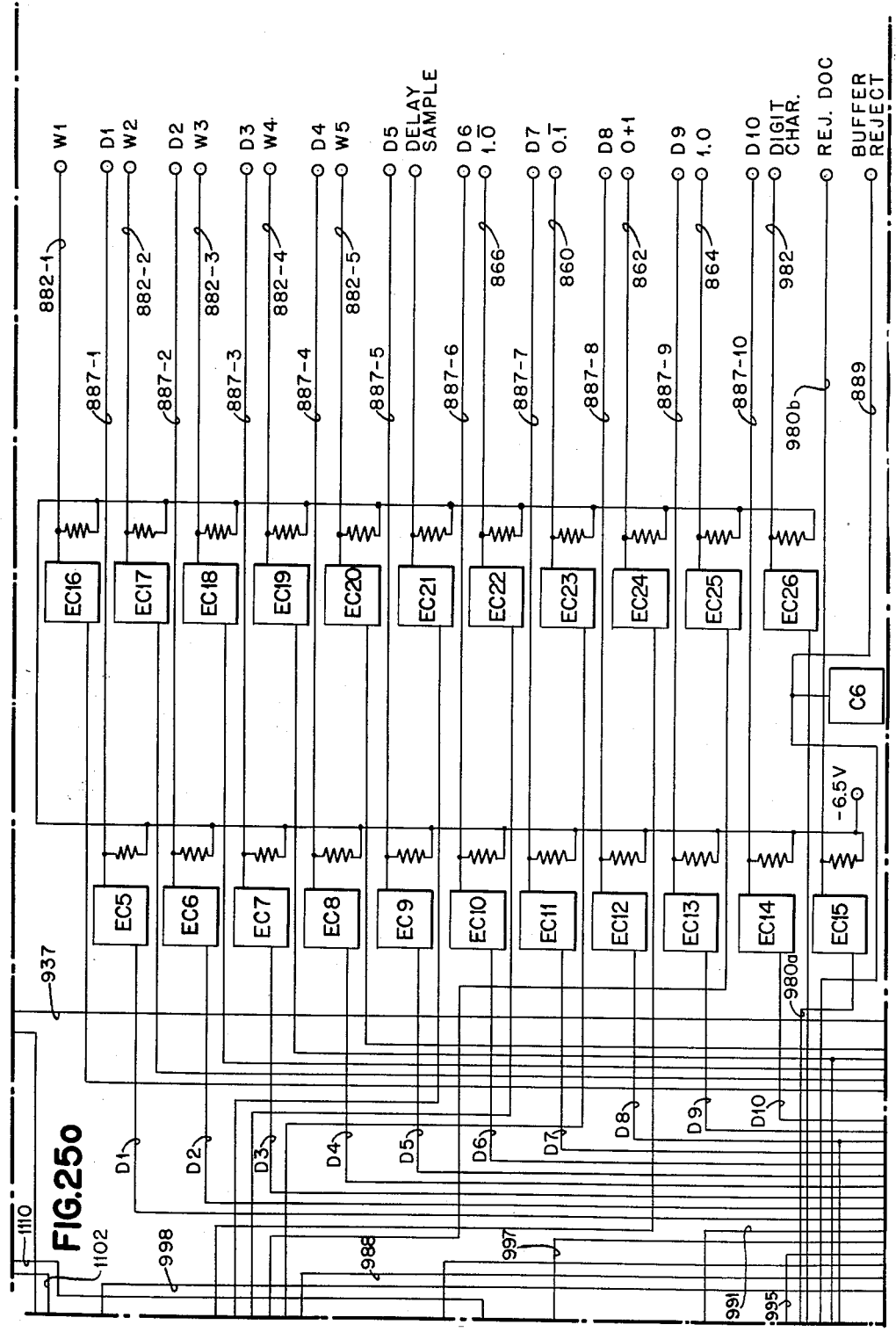

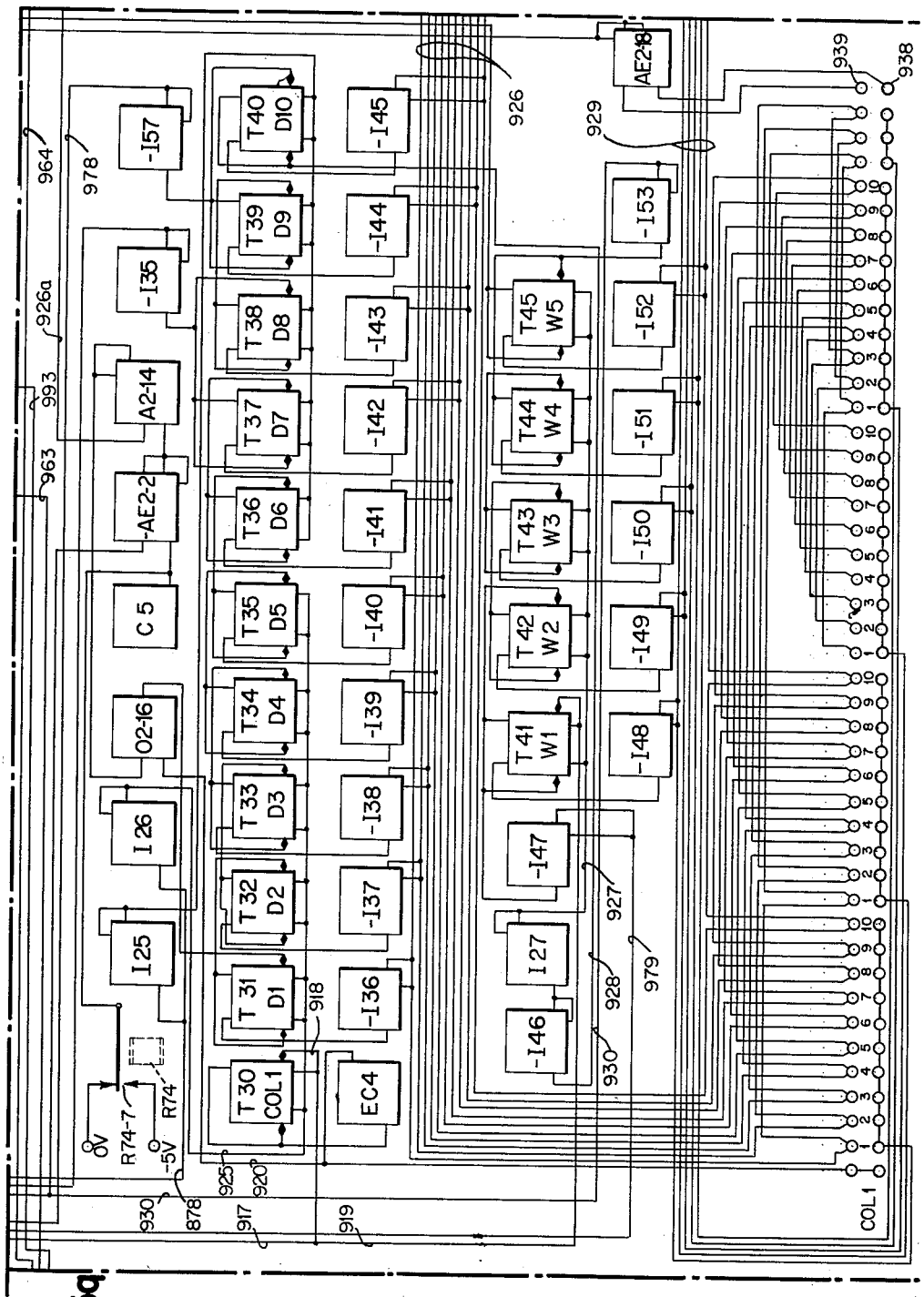

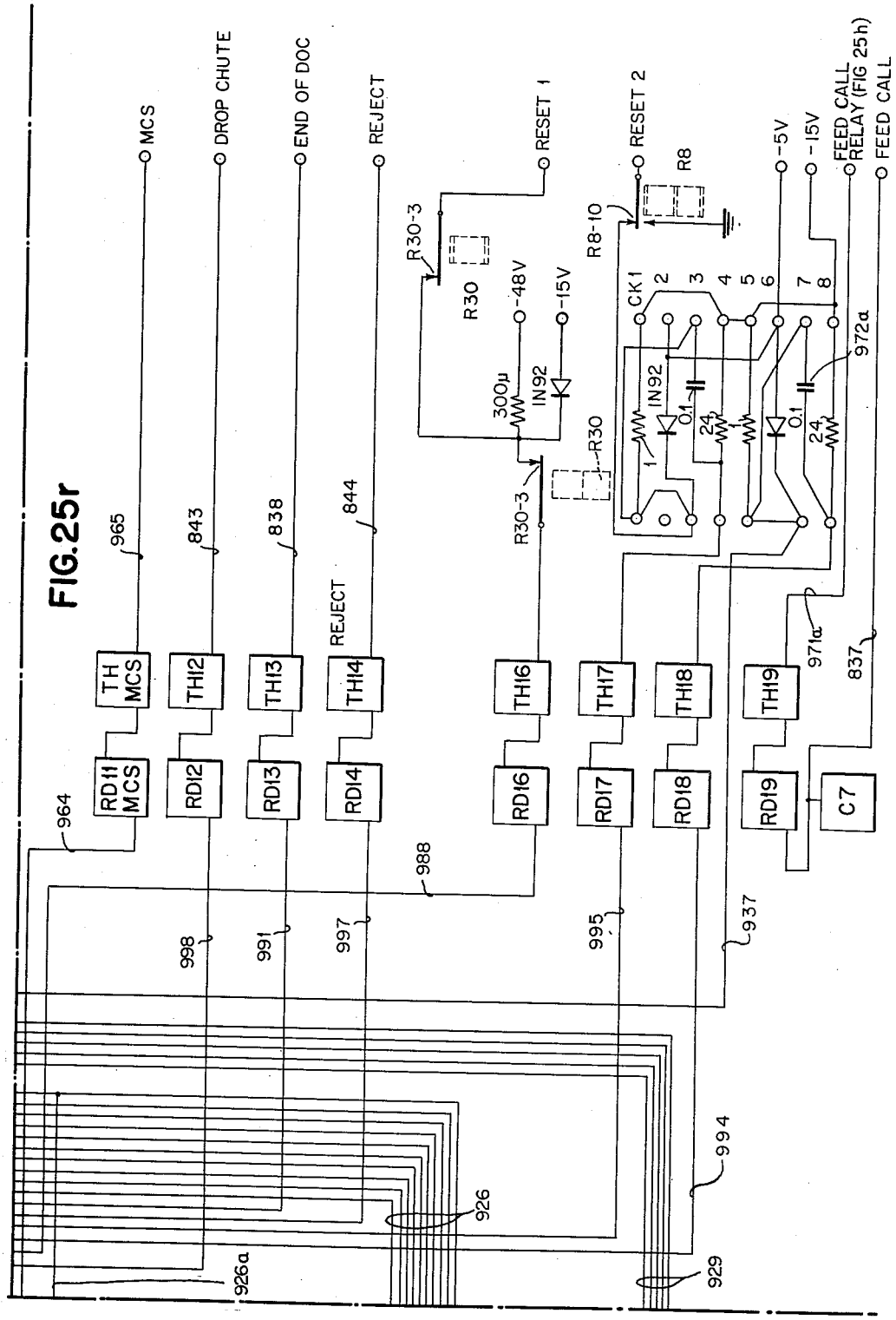

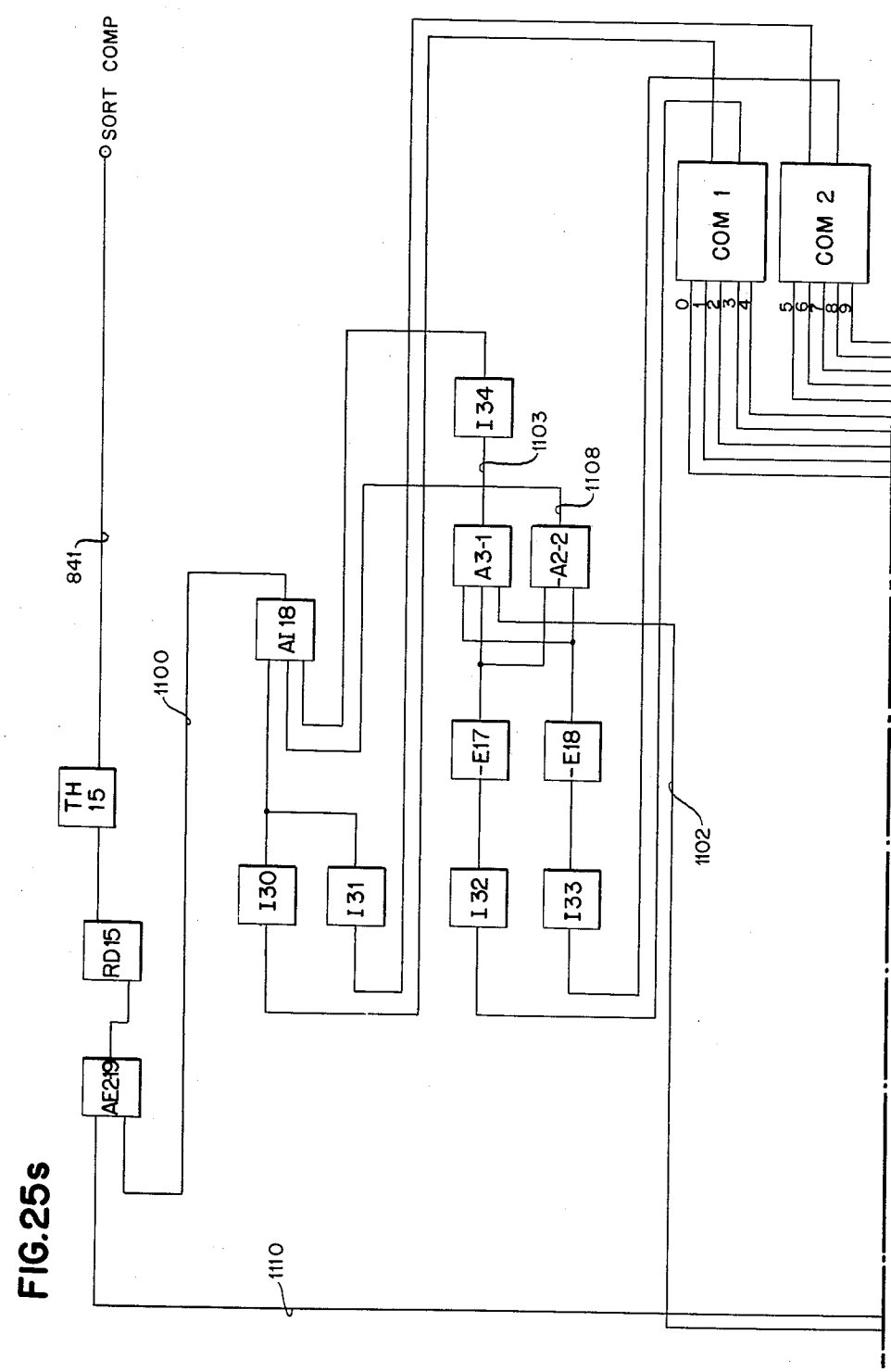

June 19, 1962  R. E. EDMINSTER ETAL  3,039,682
DOCUMENT READING AND SORTING MACHINE
Filed Dec. 31, 1956  46 Sheets-Sheet 40
FIG. 26a
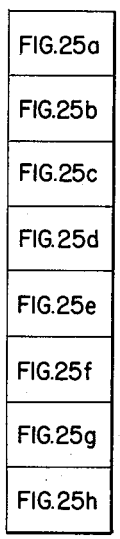
FIG. 26b
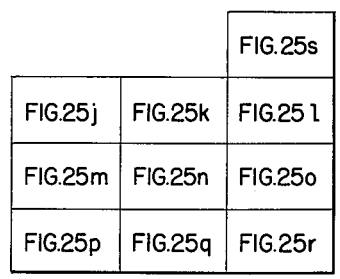
FIG. 28a    FIG. 28b    FIG. 28c
 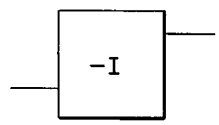 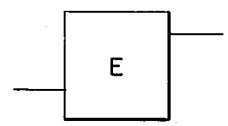
FIG. 28d    FIG. 28e    FIG. 28f
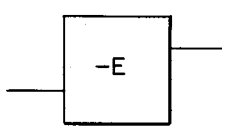 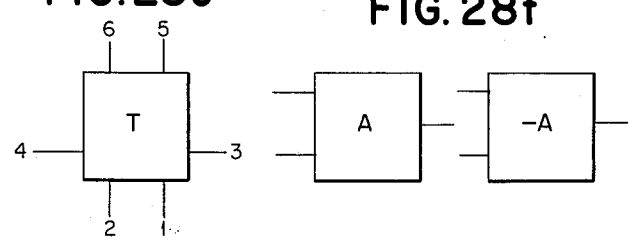
FIG. 28g    FIG. 28h    FIG. 28i
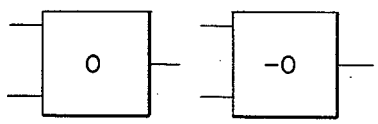 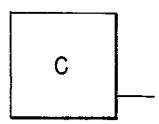 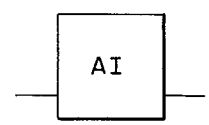

June 19, 1962 R. E. EDMINSTER ETAL 3,039,682
DOCUMENT READING AND SORTING MACHINE
Filed Dec. 31, 1956 46 Sheets-Sheet 46

3,039,682
DOCUMENT READING AND SORTING MACHINE
Robert E. Edminster, Hyde Park, Elliot L. Fritz, Pleasant Valley, Robert J. Furr, Poughkeepsie, Emil M. Valehrach, Wappingers Falls, and James A. Weidenhammer, Poughkeepsie, N.Y., assignors to International Business Machines Corporation, New York, N.Y., a corporation of New York
Filed Dec. 31, 1956, Ser. No. 631,925
6 Claims. (Cl. 235—61.11)

This invention relates to a document reading machine and more particularly to such a machine that sorts the read documents in accordance with the data read on the document and also operates as an input device to other data processing machines.

In the usual document handling machines, all documents are identical in size and thickness and are arranged in neat stacks prior to feeding. Also, the usual practice is to utilize a document reading machine only as an input device or only as a sorting device. The instant machine, variously referred to hereinafter as the Sorter-Read, the machine, etc., performs both functions, either one at a time or simultaneously.

In some businesses, the documents are not of uniform size or thickness and require several operations which are facilitated by the sorter-reader operation of the instant machine.

It is the principal object of this invention to provide a document handling machine capable of operating both as a document sorting machine and as an input source to other data processing machines.

Another object of this invention is to provide a document handling machine capable of handling interspersed documents of variable size and thickness and to feed those documents singly and in order through a sensing station.

A further object of this invention is to provide a primary source of documents and an intermediate source of documents and means for maintaining a predetermined supply of documents at the intermediate source for immediate delivery to a transport system of the machine.

Another object of this invention is to provide an improved device for feeding documents from the bottom of a stack of documents.

Yet another object of this invention is to provide means for separating overlapping documents whereby only the bottom document is advanced.

A further object of this invention is to provide first and second separating means for separating overlapping documents whereby only the bottom document is fed, the second separating means operating to correct any failure of the first separating means.

Another object of this invention is to provide first and second separating means serially arranged in a document path and individually controllable to separate overlapping documents and having controls for operating them individually.

Another object of this invention is to provide a mechanism in a document path for delaying the advance of a document along the path until a signal is received calling for the document to be advanced along the document path.

Still another object of this invention is to provide a delay station in a document path intermediate a source of documents and a destination of documents for delaying a document until a signal is received calling for the document to be advanced, and means associated with the delay station for feeding a next document from the source to the delay station.

Another object of this invention is to provide a device for aligning a predetermined edge of random sized documents along a predetermined line.

Still another object of this invention is to provide a device for moving documents in an aligned manner past data analyzing devices.

Yet another object of this invention is to provide a device for transporting documents through a routing station to selected ones of a plurality of desinations.

A further object of this invention is to provide novel pocket selecting means for routing documents in accordance with data sensed on said documents.

Another object of this invention is to provide a machine for analyzing data on documents, for sorting the documents in accordance with data sensed on the documents, and for transmitting the sensed data to another data processing machine.

Another object of this invention is to provide a machine for feeding, analyzing and sorting documents and having error checking means to check for errors in the sorting circuits, analyzing circuits, document spacing document jams and exhaustion of the supply of documents.

Other objects of the invention will be pointed out in the following description and claims and illustrated in the accompanying drawings, which disclose, by way of example, the principle of the invention and the best mode, which has been contemplated, of applying that principle.

In the drawings:

FIG. 1 is a perspective view of the machine.

FIGS. 1a and 1b together, comprise a front elevation of the machine, FIG. 1b being partly in section taken along the line 1b—1b in FIG. 2b and being partially cut away.

FIGS. 2a and 2b together, comprise a plan view of the machine.

FIG. 4 is a sectional view of the check feed taken along the lines 4—4 in FIG. 1b with parts broken away.

FIG. 5 is a front view of the check hopper partly in section taken on the line 5—5 in FIG. 4.

FIG. 6 is an enlarged front elevation showing a check separator.

FIG. 7 is a section taken along the lines 7—7 in FIG. 6.

FIGS. 8a, 8b and 8c show a jam detector device.

FIG. 9a is a view, partially in sections, of a clutch and brake assembly.

FIG. 9b is a view, similar to FIG. 9a, of a similar clutch and brake assembly.

FIG. 10 is an enlarged fragmentary view of a check showing the coded magnetic markings.

FIG. 12 is a plan view of the delay station and check prealigner.

FIG. 13 is a fragmentary view of the delay station showing a card lever contact.

FIGS. 14a and 14b show a spring clutch, FIG. 14a being a fragmentary vertical section along the line 14a—14a in FIG. 2b and FIG. 14b being an elevation partly in section taken along the line 14b—14b in FIG. 14a.

FIGS. 15a, 15b, 15c and 15d are schematic views illustrating the progress of a check through the check aligner.

Figure 17:
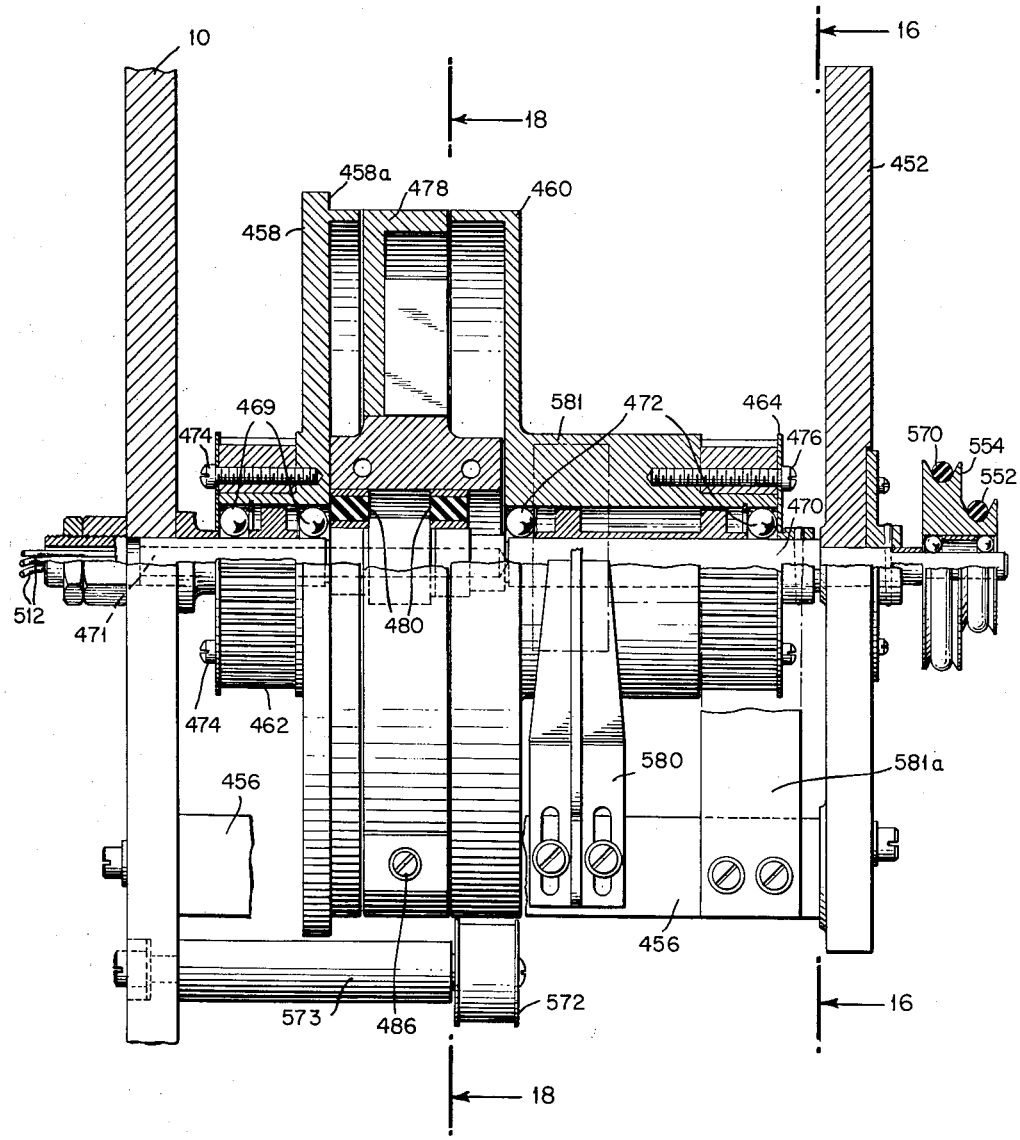

FIG. 16 is a section taken along line 16—16 in FIG. 17 showing the aligner drum, drum drive and skew rollers.

FIG. 17 is a section through the drum unit taken along line 17—17 in FIG. 1a.

FIG. 18 is a section taken along line 18—18 in FIG. 17 showing the magnetic read heads and associated equipment.

FIG. 19 is a front elevation of a chute blade selector mechanism.

Figure 20:
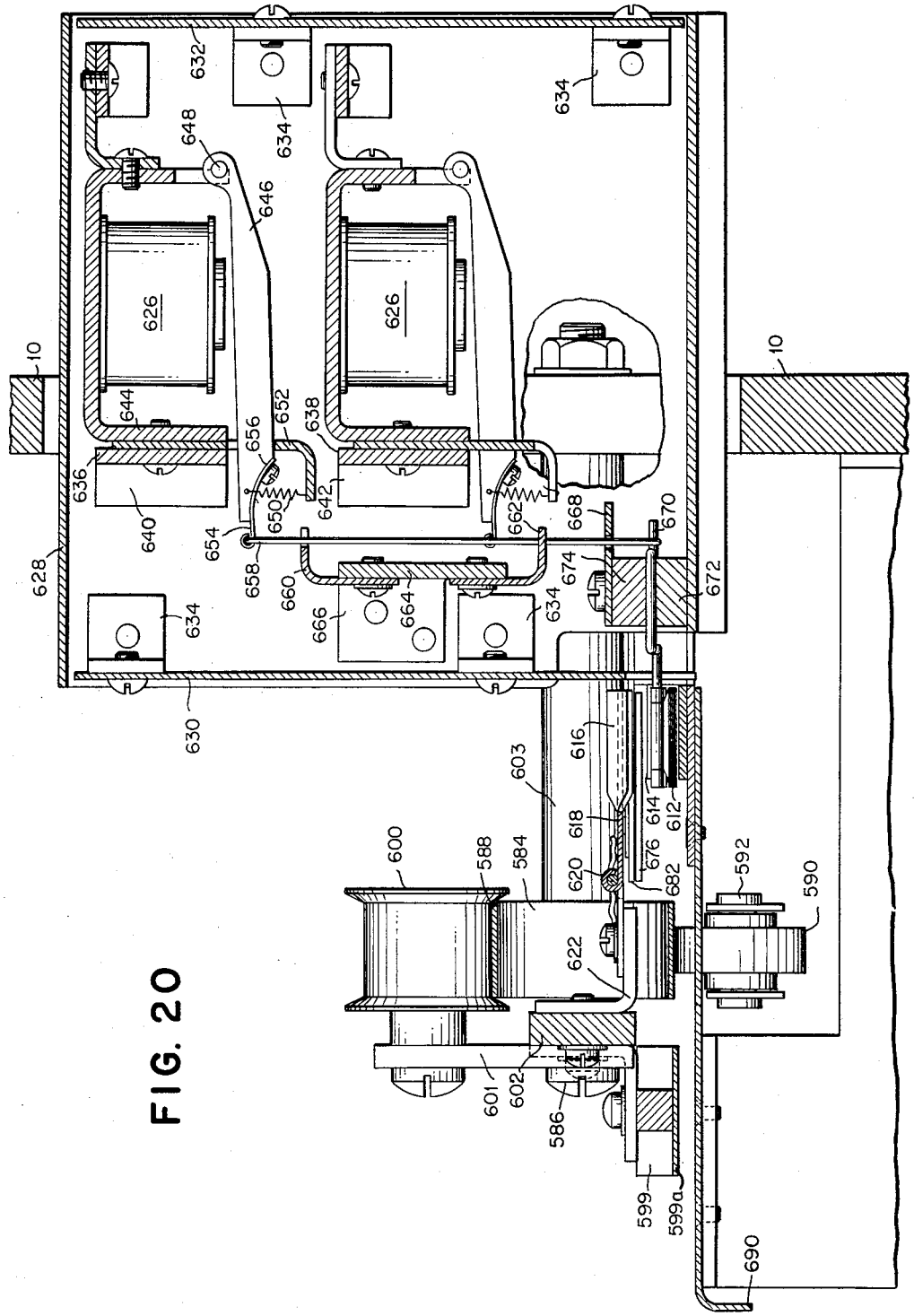

FIG. 20 is a sectional view taken along the line 20—20 in FIG. 19.

Figure 21:
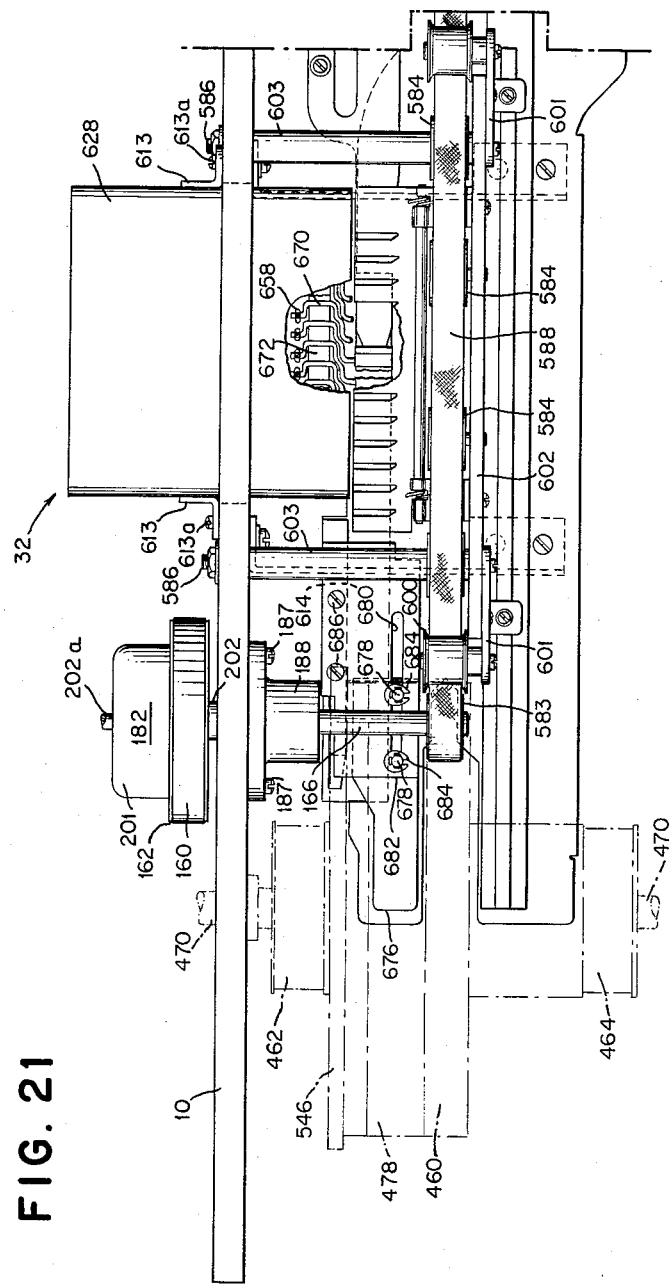

FIG. 21 is a plan view of the selector mechanism with parts broken away for clarity.

Figure 22:
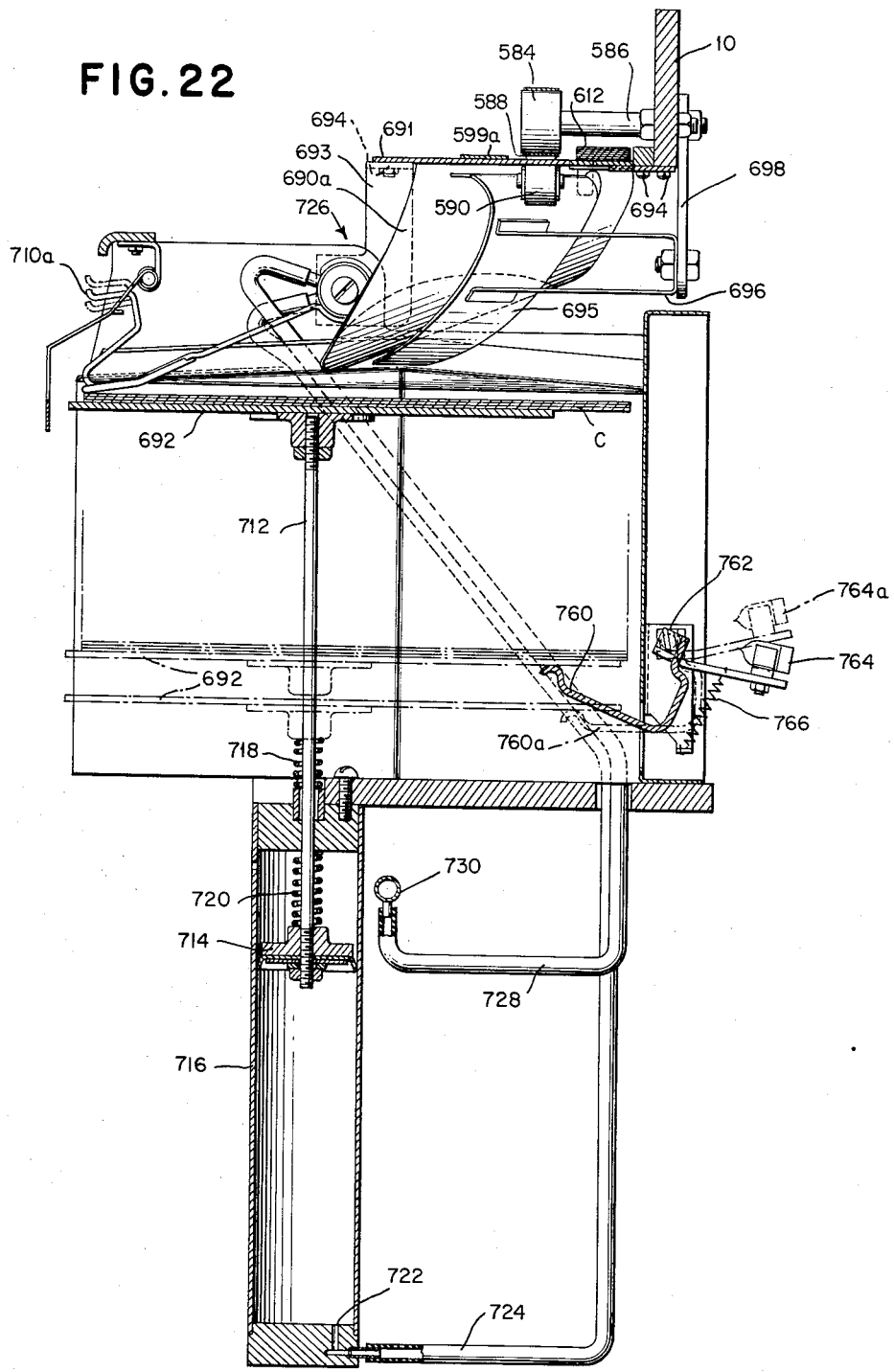

FIG. 22 is a sectional view of a stacker pocket taken along the lines 22—22 in FIG. 1b.

Figure 23:
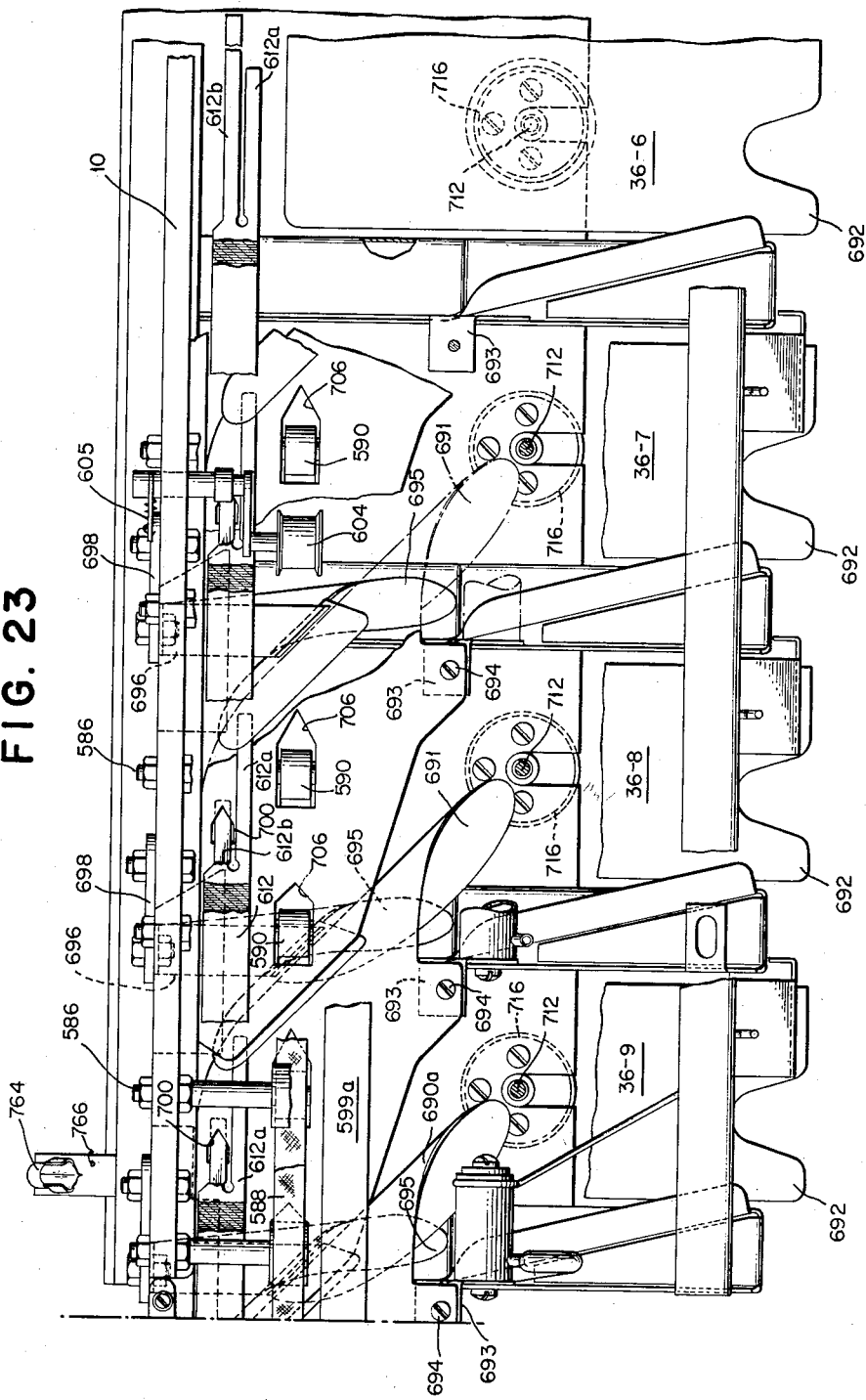

FIG. 23 is a sectional view taken along the line 23—23 in FIG. 1b.

FIGS. 24a, 24b, 24c, 24d, and 24e are sectional views of a valve, FIG. 24a being taken along the line 24a—24a in FIG. 24b, FIGS. 24b, 24d and 24e being taken along line 24b—24b in FIG. 24a, and FIG. 24c being taken along line 24c—24c in FIG. 24a.

FIGS. 25a through 25h, when arranged as shown in FIG. 26a, comprise a wiring schematic of the circuitry for controlling the mechanical portion of the machine.

FIGS. 25j through 25s, when arranged as illustrated in FIG. 26b, comprise a diagram of the transistor logic for processing the data read on a check. Certain interconnections exist between the circuits of FIGS. 25a–25h and the circuits of FIGS. 25j–25s as shown therein.

Figure 27A:
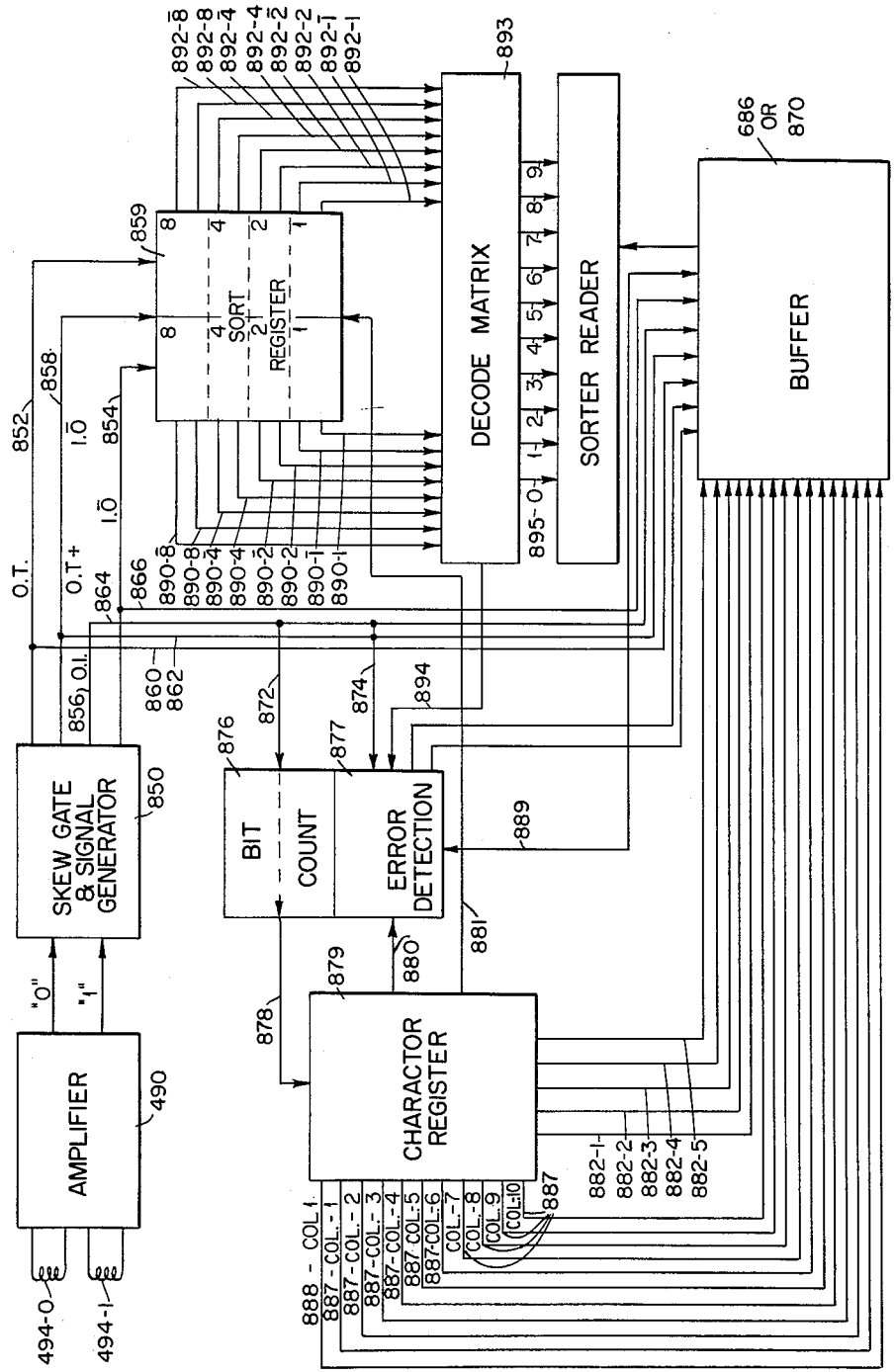

FIG. 27a is a block representation of the machine circuit.

Figure 27B:
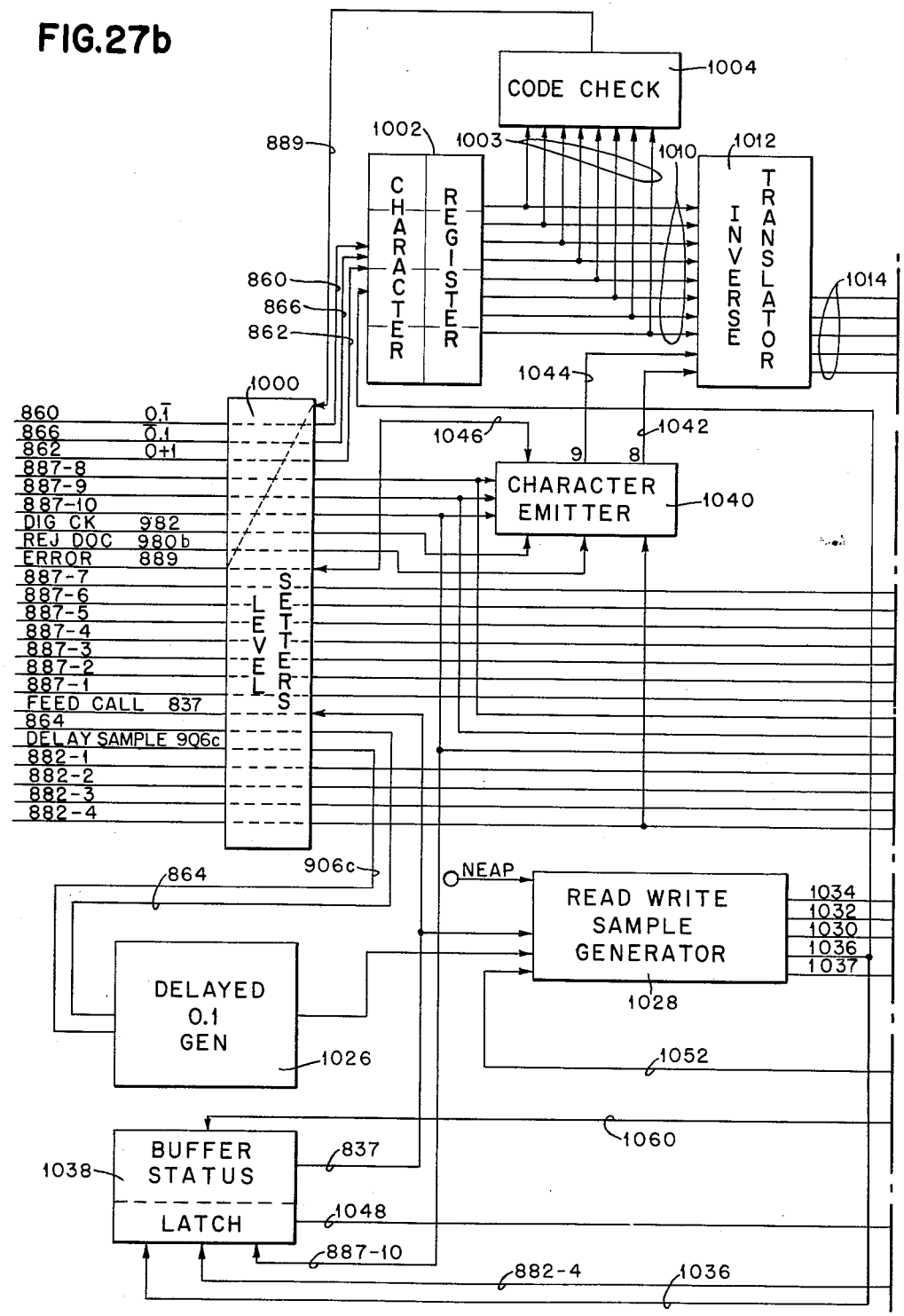
Figure 27C:
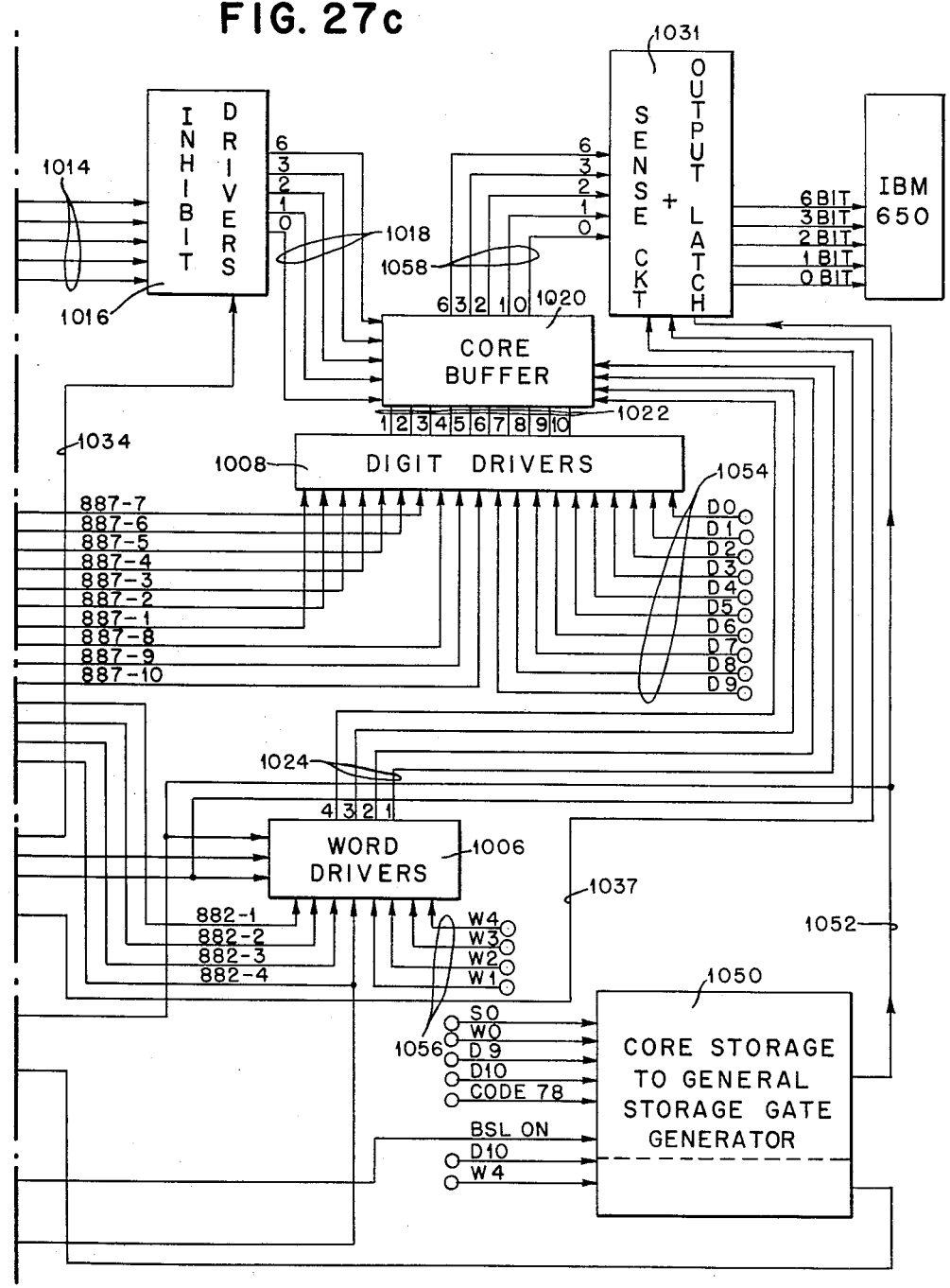

FIGS. 27b and 27c comprise a block representation of the posting machine buffer.

Figure 27D:
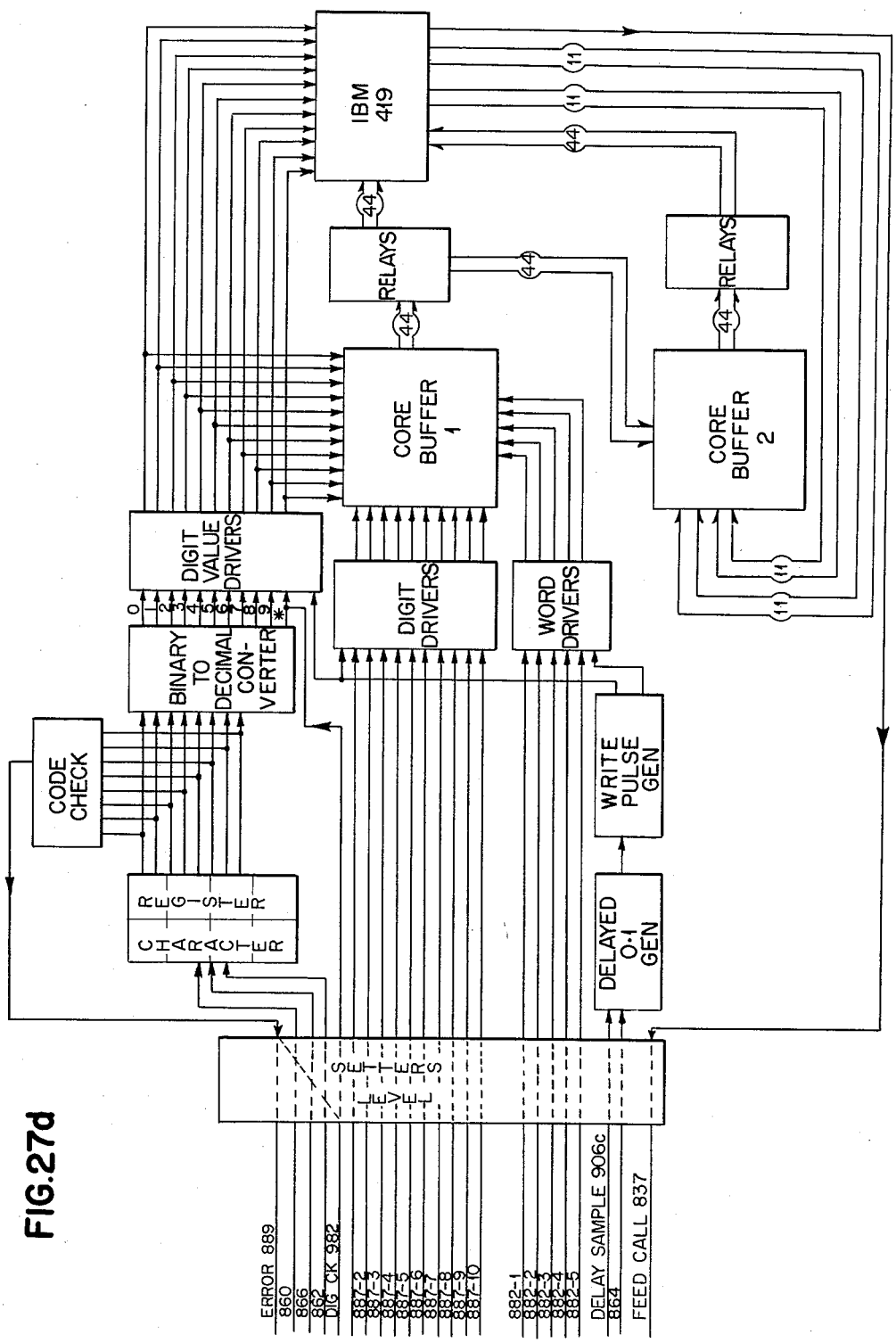

FIG. 27d is a block representation of the listing machine buffer.

Figures 28J, 28K, 28M:
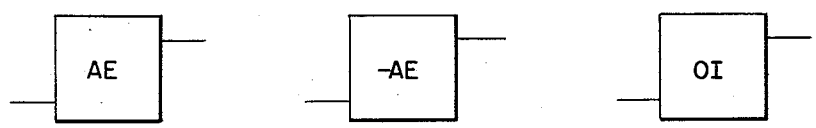
Figure 28N:
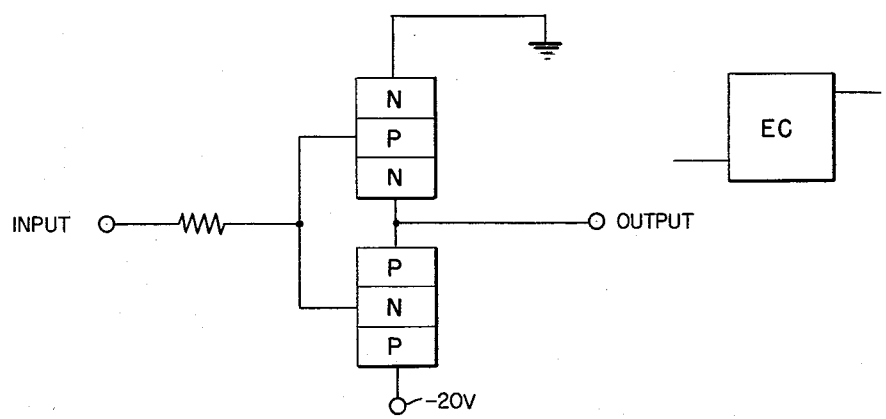
Figure 28O:
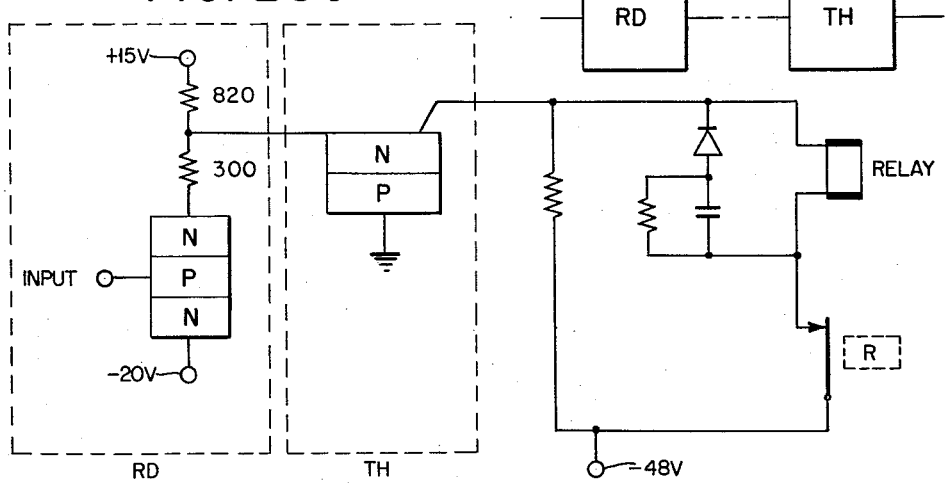
Figure 28P:
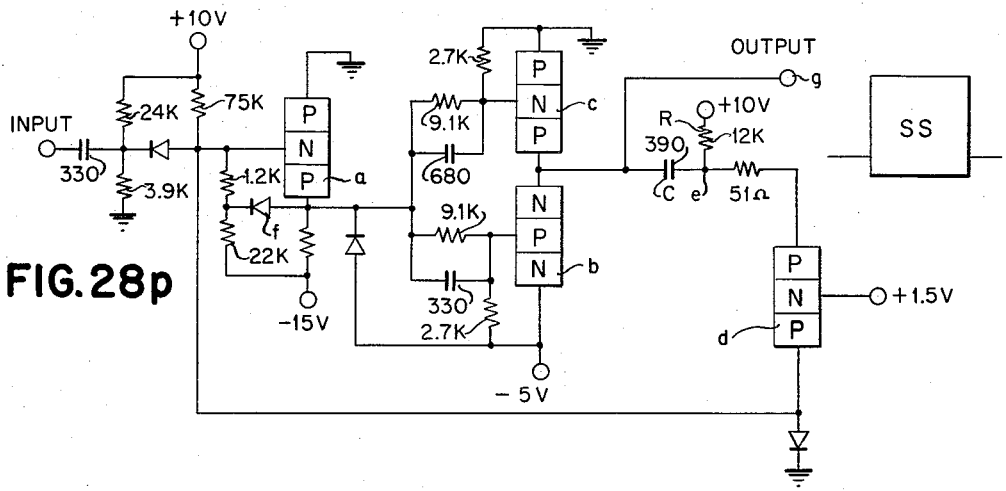
Figure 28Q:
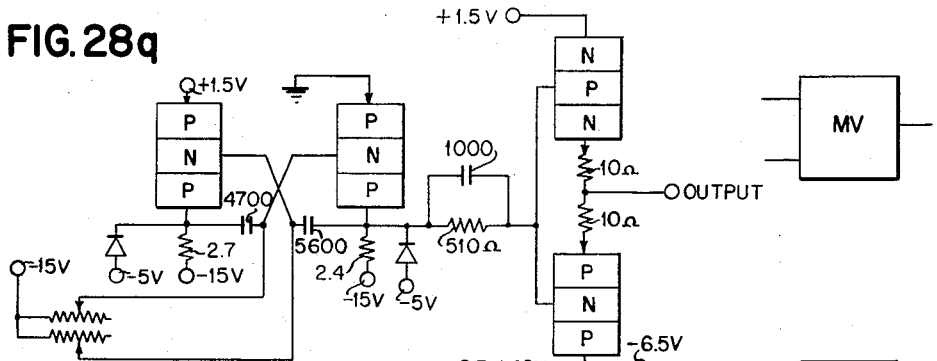
Figure 28R:
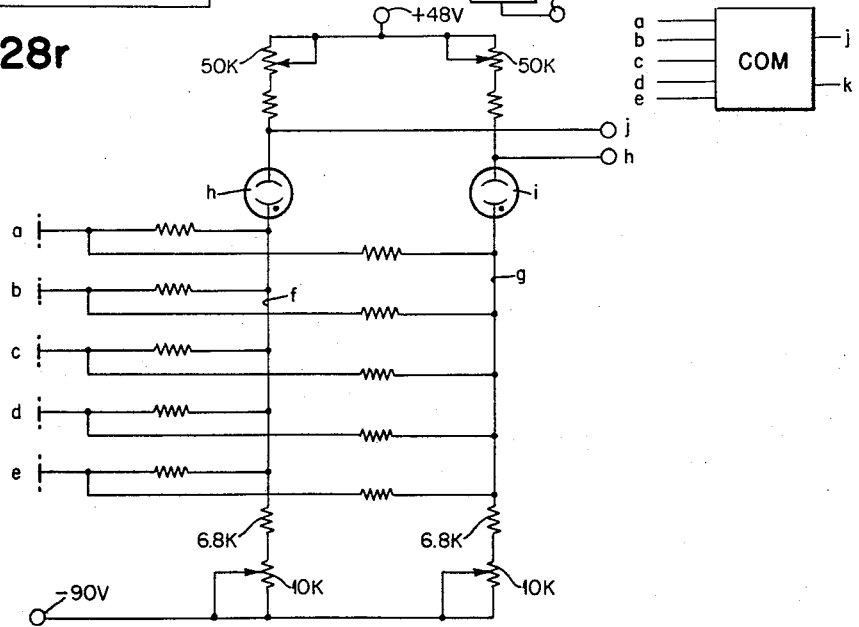

FIGS. 28a–28r are block representations of components of the logical circuit.

General Description

In accordance with the foregoing objects, a group of checks are placed in a hopper of a Document Sorter from which they are fed to a set of transport belts which rotate in a direction to move the bottom check from the check feed unit. The checks are fed from the hopper to the transport belts, in their original order and are stacked upon the preceding checks until a pile of a predetermined height is reached, at which time the pile of checks interrupts a beam of light to a photocell thereby declutching the check feed drive. Checks may be fed from the hopper while others are being fed from the transport belts. An air jet is provided to help settle each check onto the stack, and the transport belts are joggled to aid in feeding the bottom check from the stack.

The transport belts feed the checks to a check separating station. A number of checks may enter the separator station together, in which event they are separated and the bottom check is advanced first. A detector is provided to stop a first separator drive in the event that two checks enter that separator station together. This detector is deactivated as soon as one of the checks is fed therefrom. From the separator station, checks are fed to a delay station where a check may be held awaiting a signal from a storage medium indicating that the storage medium is ready to accept data from another check. The check is then fed past a reading station and a following check is fed to the delay station. The check passes a reading station, in this case, a magnetic reading station, and the data read is transmitted to an external storage medium. After passing the reading station, the checks are fed toward a stacker unit and are directed by a chute blade selector unit to various pockets of the stacker in accordance with data read in the check. A movable check platform in each stacker pocket is positioned relative to the incoming checks by an air servomechanism. Torque responsive devices are placed at several points in the transport system to detect overloads due to check jams and to stop the machine or units of the machine when such jams occur.

FIGS. 1a and 1b taken together, comprise a front elevation of the Document Sorter with portions broken away. FIGS. 2a and 2b, when taken together, comprise a plan view of the Document Sorter. Referring to FIGS. 1a, 1b, 2a and 2b, the machine is constructed on a base plate 10 (which may actually comprise several plates in a single plane), having a drive system mounted on the rear side thereof as viewed in FIGS. 2a and 2b and having the various document handling units mounted on the front side. Generally, the machine comprises a check feed unit 12 having a check hopper 14, a check loader 16, and a check transport unit 18; a check separator unit 20 comprising a first separator station 20a and a second separator station 20b; a delay unit 26; a check aligning unit 28; a reading unit 30; a chute blade selecting unit 32; and a stacker unit 34 comprising a plurality of pockets 36.

Figure 3:
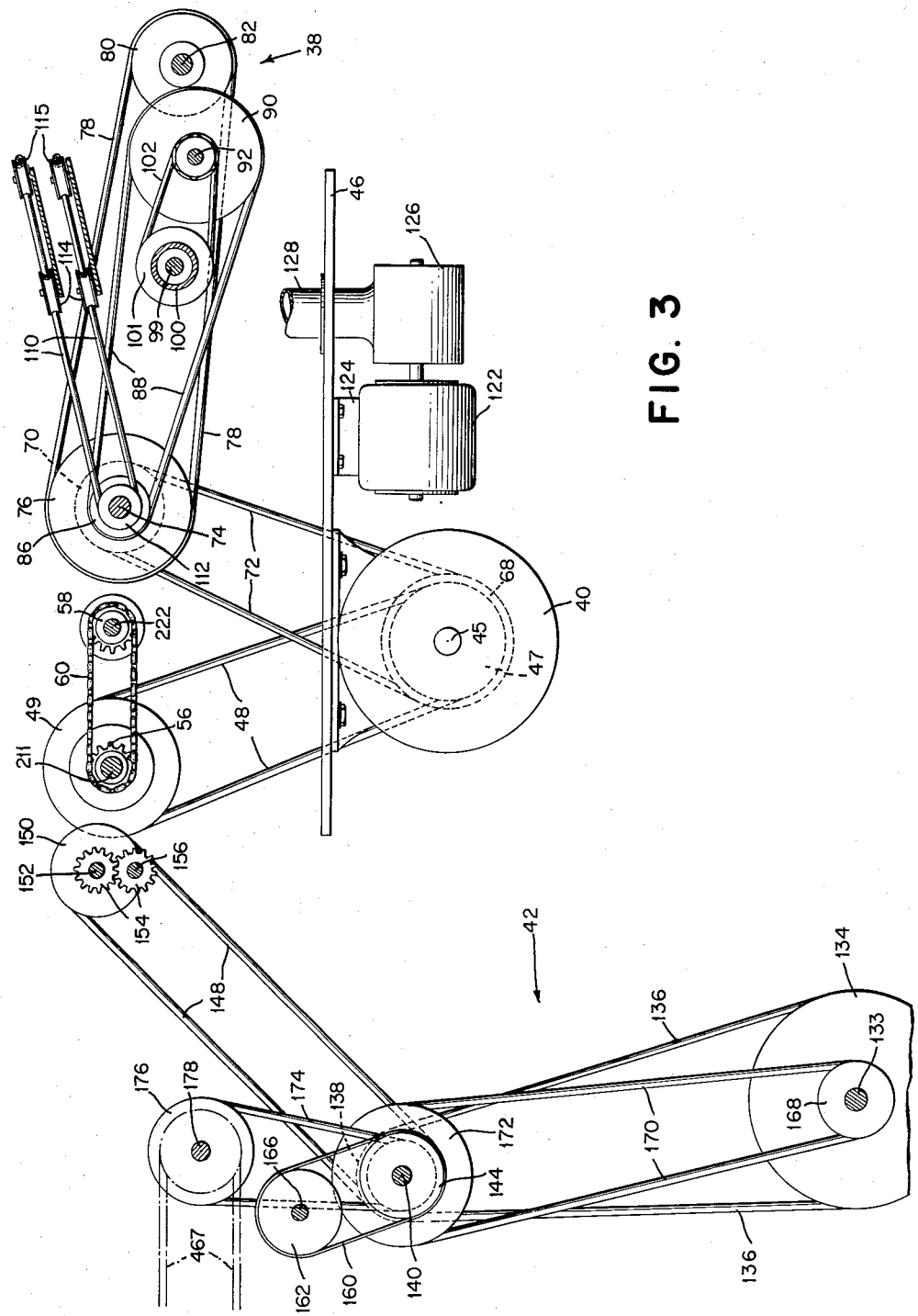
FIG. 3 is a section showing the drive system taken on the line 3—3 in FIG. 2b.
Figure 11:
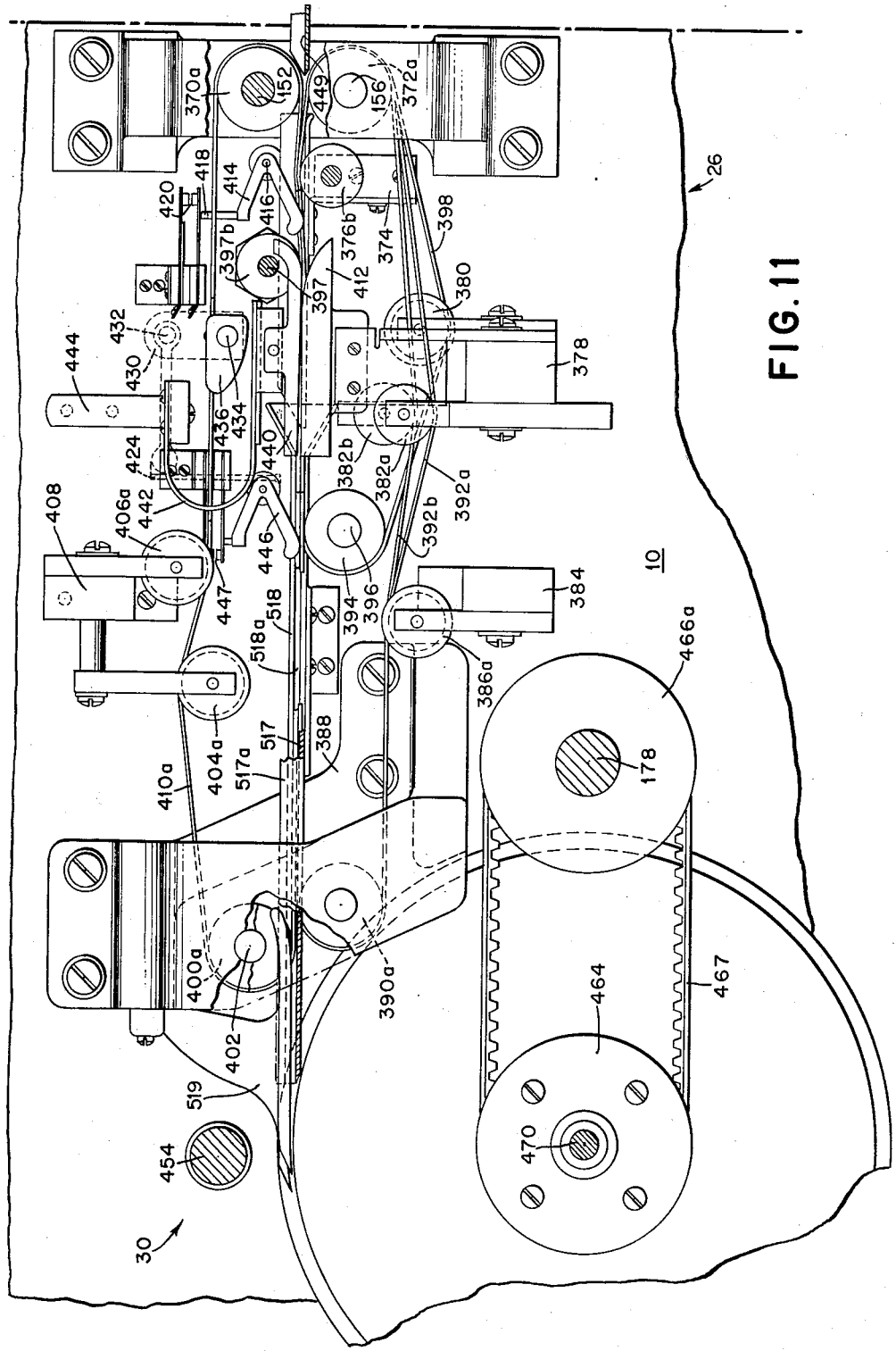
FIG. 11 is an enlarged front elevation of a delay station and check aligner.

Referring to FIG. 3, a drive unit 38 mounted on the rear of a base plate 10, by means of a motor 40, drives the check feed unit 12 and the check separator unit 20. A second drive unit 42, by means of a motor 44 (FIG. 2a), drives the delay unit 26, the aligner unit 28 and the stacker unit 34. Each of the foregoing units is described in detail hereinafter.

Drive Units

The drive units 38 and 42 are shown in FIGS. 2a, 2b and 3. Tension pulleys for the various belts have been omitted for clarity of illustration; however, their use is conventional and would not add materially to the understanding of the machine.

The motor 40 and various parts of the drive mechanism 38 are mounted on a plate 46 fixed to the base plate 10. The constantly rotating motor shaft 45, through a belt 48 and pulley 49 drives a shaft 50 which, under control of an electromagnetic clutch 52 and an electromagnetic brake 54, FIG. 2b, drives the second separator station 20b. Through a cog wheel 56 fixed to the shaft 50, and a drive chain 60, a cog wheel 58 is driven to provide the drive for the first separator station 20a in a manner described hereinafter. An electromagnetic clutch 64 and an electromagnetic brake 66, similar to the clutch 52 and the brake 54, are associated with the driven cog wheel 58 for controlling the first separator station 20a in a manner described hereinafter.

Through a second pulley 68, FIG. 2b, mounted on the motor shaft 45, and a belt 72 and pulley 70, a shaft 74 also is driven by the motor 40. The shaft 74, through a pulley 76 fixed thereto and a belt 78 and pulley 80 fixed to a shaft 82 which is journaled in a bracket 84 fixed to the base plate 10, drives a belt transport system of the check feed unit 12 described hereinafter.

A pulley 86 fixed to the shaft 74, through a belt 88 drives a pulley 90 rotatably mounted on a shaft 92. Through a spring type clutch 94, the pulley drives the shaft 92 carrying a bevel gear 97. The bevel gear 97 through a bevel gear 98 drives the check loader 16 in a manner described hereinafter.

A shaft 99, mounted in a bearing 100 fixed to the base plate 10, carries a pulley 101 and is driven from the pulley 90 which is actually a double pulley accommodating the belt 88 and a belt 102. The shaft 99 operates a pair of belt jogglers 106 and 108 in the belt transport unit 18 which is described hereinafter.

A belt 110, driven by a pulley 112 mounted on the shaft 74 and running on idlers 114 and 115 mounted on a bracket 116 fixed to the base plate 10, and idlers 117, FIG. 1b, mounted on a bracket 118, through a pulley 119, constantly drives a roller 120 in the check loader 16 for a purpose described hereinafter.

An electric motor 122, mounted on the plate 46 by a bracket 124, drives an air blower 126 to blow air through a flexible hose 128 and a cylindrical flange 130, FIG. 2b, to a hood 132 for a purpose described hereinafter.

Referring to FIGS. 2a and 3, motor 44, suitably mounted on the frame of the machine, through a pulley 134 mounted on the motor shaft 133, and a belt 136, drives a pulley 138 fixed to a shaft 140. The shaft 140 also carries pulleys 142 and 144 fixed thereto. The pulley 142, through a belt 148 drives a pulley 150 fixed to a shaft 152. The shaft 152, through meshing gears 154, drives a shaft 156. The shafts 152 and 156 are mounted in a bearing 158, FIG. 2a, bolted to the base plate 10 and comprise the drive for the delay unit 26 described hereinafter.

The pulley 144, through a flat belt 160 and a pulley 162 fixed to a shaft 166, provides the stacker unit transport drive described hereinafter.

A second pulley 168 fixed to the shaft 133, through a belt 170 and a double pulley 172 rotatably mounted on the shaft 140, provides the drive for the drum unit 30. The double pulley 172, through a belt 174, drives a pulley 176 fixed to a shaft 178 rotatably mounted in a bearing 180, FIG. 2a, fixed to the base plate 10. The drum 30 is described hereinafter. A hand wheel 181, FIG. 2a, is engageable with the shaft 140 for manually operating the machine for servicing and for removing check jams.

Jam Detector

Referring to FIGS. 2a, 8a, 8b and 8c, the jam detector 182 is shown. The jam detectors 184 and 186, FIG. 2a, although having slightly different shaped parts or different length shafts, operate on the same principle as the jam detector 182. Therefore, the jam detector 182 will be described and it will be understood that the other two jam detector devices operate in a similar manner.

The jam detector 182 is associated with the stacker transport drive wherein the drive is provided through the belt 160, the pulley 162, and the shaft 166 to a pulley 583 carrying a transport belt 588. The unit 182 is mounted by means of screws 187 and the flange of a bearing 188 to the base plate 10. The pulley 583 is pinned to the shaft 166 by a pin 583a. The drive pulley 162 is rotatably mounted on the shaft 166 and is fixed by pins 189 to a disc 190 also rotatable on the shaft 166. A disc 191 is fixed to the shaft 166 by a pin 192. The disc 190 and the disc 191 are connected by a spring 193 fixed to the disc 190 by a pin 194 and to the disc 191 by a pin 195. A spring member 196, having three fingers 196a, FIG. 8b, spaced about its periphery, is fixed to the disc 191 by screws 197 extending through the ends of the fingers 196a. Three pins 198, mounted at intervals of 120° about the disc 190, extend through cutouts 199 similarly spaced in the disc 191. A stud 200a is mounted on one spring leaf of a pair of electrical contacts 200 mounted adjacent the jam detector unit for actuation in a manner described hereinafter. A cover member 201, having a hole 201a adapted to receive the stud 200a, is mounted on the disc 190, for example by screws not shown, to cover parts of the jam detector unit. The jam detector unit is spaced from the plate 10 by a spacer member 202.

As described hereinbefore, the drive to the transport belt 588 is through the belt 160 and the pulley 162 and through the disc 190 pinned to the pulley 162. The pins 198 mounted on the disc 190 and projecting into the cutouts 199 in the disc 191, normally rest near one side of each of cutouts 199. The drive from the pulley 162 and disc 190 to the disc 191 is through the spring 193. Under normal load conditions the pins 198 rest near the counterclockwise edge of the corresponding cutouts 199 in the disc 191. However, when an excess load is applied to the belt 588 due to any excess of normal torque such as a check jam or a belt jam, the pulley 583 and the shaft 166 are retarded. The disc 191 carrying the spring 196 also is retarded. The effect of this retarding action is to shift the disc 191 counterclockwise relative to the disc 190 thereby causing the pins 198 to bear against the fingers 196a of the spring 196, and moving the spring 196 to the left, as viewed in FIG. 8a. The center portion of the spring 196 moves the stud 200a thereby closing the contacts 200. The contacts associated with the jam detector devices 184 and 186 are designated 184—200 and 186—200 respectively. The effect of closing the contacts 182—200, 184—200 and 186—200 will be described hereinafter.

Clutch and Brake Assemblies

Referring to FIG. 9a, the details of the clutch 52 and a brake 54 are shown. As described hereinbefore, the shaft 50 is driven by the belt 48 through the pulley 49. The shaft is journaled in the bearing 203 fixed to a frame plate 204. The clutch 52 comprises a coil 205 supported in a member 205a fixed to the frame member 204. A disc 206 having a friction surface 207 is fixed to the shaft 50 by a key 208. A disc 209 of magnetizable material is splined by a key 210 to a shaft 211 and is adapted for sliding movement longitudinally of the shaft 211. The disc 206 rotates with the driven shaft 50. When the coil 205 is energized through a pair of lead wires 212, the disc 206 is magnetized and draws the magnetizable disc 209 against the friction surface 207 thereby transmitting the drive from the shaft 50 to the shaft 211.

The brake 54 comprises a coil 213 supported in a member 213a fixed to a frame member 214 and having lead wires 215. A magnetizable disc 216 is fixed to the coil member 213a, 213 by screws 217. The disc 216 carries a friction surface 218. A disc 219, slidably keyed to the shaft 211 by a spline 220, is of magnetizable material. When the coil 213 is energized through the leads 215, the disc 216 is magnetized and attracts the disc 219 thereby quickly stopping the shaft 211.

As described hereinbefore in connection with FIG. 2b, the drive for the clutch 64 and brake 66 is provided through the cog wheel 56 fixed to the shaft 211 and a chain 60 to the cog wheel 58. As shown in FIG. 9b the cog wheel 58 is fixed to a hub 221 rotatably mounted on a shaft 222. The hub 221 has, integral therewith, a disc 223 of magnetizable material. An electric coil 224 having lead wires 225 is supported in a member 224a fixed to a frame member 226. The shaft 222 carries a hub 227 fixed thereto by a setscrew 228. A disc 229 of magnetizable material is slidably and non-rotatably mounted on the hub 227. The disc 223 has a friction surface 230. When the coil 224 is energized through the leads 225, the rotating disc 223 is magnetized and attracts the slidable disc 229 thereby transmitting the drive from the disc 223, through the disc 229, to the shaft 222.

The brake 66 comprises a coil 231 having leads 232 and supported on a magnetizable core 231a mounted on a frame member 233. A hub 234 is fixed to the shaft 222 by a setscrew 235. The hub 234 carries a disc 236 of magnetizable material slidably and non-rotatably mounted on splines thereon. When the coil 231 is energized through the leads 232, the core 231a is magnetized and attracts the magnetizable disc 236. The disc 236 is stopped and, through its connection to the hub 234, brakes the shaft 222.

Spring Clutch

Referring to FIGS. 14a and 14b, the driven pulley 90, as described hereinbefore, is freely rotatable on the shaft 92. Secured to the shaft 92 is a stop cam 237 and extending between pulley 90 and the stop cam is a spring 238 coiled about and spaced from the extended hub of the pulley 90. One end of the spring 238 is fastened to the stop cam 237 and the other end is fastened to a sleeve 239. The sleeve 239 is provided with a stop 239a which engages an armature 240a of a magnet 240, while the cam 237 has a stopping edge 237a engaging against a pivoted lever 241, which is urged toward the armature 240a by a connecting spring 241a. The parts just described constitute a wellknown form of spring clutch and, with the parts in normal position, with both stops 239a and 237a engaging their respective levers, the spring 238 is held in a slightly open position so that the hub of pulley 90 may rotate freely within the spring. Upon energization of magnet 240, the armature 240a releases the stop 239a, whereupon spring 238 tends to close, rocking the sleeve 239 and gripping the hub of the pulley 90 so the spring 238 is driven thereby and through its connection with the stop cam 237, will drive the shaft 92. When the magnet 240 is deenergized before completion of a revolution, the stop 239a reengages the armature 240a to open the spring. The driven parts are then overthrown slightly so the stop 237a reengages the lever 241, preventing reclosure of the coil spring 238.

*Code and Document*

Referring to FIG. 10, a portion of a check bearing coded magnetic markings is illustrated. The particular machine described herein is adapted to handle documents varying in size from 2¾ x 6⁵⁹⁄₆₄ inches to 3½ x 8¾ inches. However, it will be obvious that a machine may be built to handle documents of other sizes without departing from the principles of the invention.

In FIG. 10 it is seen that the digits are represented by three lines of printing. The top line is the numerical interpretation whereas the vertical bars in the two lower tracks are the significant information bits. The marks are read by moving the check in a longitudinal direction, face down and the normal right edge first, over a stationary two track reluctance sensing unit 488, FIG. 18, where a pair of sensing heads 494 are aligned side by side. It will be noted that each digit space on the check is divided into five bit spaces. In the first bit space only of each character, a mark is present in both tracks, aligned vertically. Such a pair of marks which produce simultaneous signals from the sensing heads 494, are denoted coincidence marks and indicate the beginning of a character code. The marks following the coincidence marks represent binary values in the lower or "1" track. The code selected for this machine is a 1, 2, 4, 8 binary code, which reads from right to left as viewed in FIG. 10, since the check C is fed through the machine upside down with the right-hand end of the check, as viewed in FIG. 10, leading. Bits are recorded in the upper or "0" track opposite each empty space in the "1" track. It is thus seen that a bit must always be present in every bit space in one or the other of the two record tracks, but the coincidence marks appear in the first position only. The "0" track is also denoted as a checking track as it may be used to check the accuracy of the code bit track.

Regardless of the physical size of the document, the "0" track is positioned with the bottom of the track 11⁄16 of an inch from the top edge of the document. The bit markes are ⅛ inch high and are spaced ⅛ inch from the bits in the "1" track which are also ⅛ inch high. The read heads 494 are spaced to simultaneously sense both the code bit track and the checking bit track. Since there is always a mark present in either the code track or the checking track, the code is inherently self-timing and can be readily scanned at any fixed or variable speed without encountering difficulty in recognizing blank spaces. Another advantage of the code is that it is a fixed count code since there must always be four significant bits for every digit, exclusive of the coincidence bits.

Examples of information which may be recorded on the check are the Transit Number, in the sample, the digits 1, 2, 3, 4, 5, 6 and 7, at the left-hand end of FIG. 10. The Transit Number will always be seven digits. A Routing Number, comprising four digits, 1, 2, 3 and 4 is indicated in the middle of FIG. 10 and an Account Number, which represents the account number of a particular customer, comprising ten digits 1, 2, 3, 4, 5, 6, 7, 8, 9 and 0, at the right-hand end of the check in FIG. 10. Other information could be recorded on the check but the Transit Number, Routing Number and Account Number are sufficient to illustrate the use of the machine. The Transit Number is used in routing the check back to the issuing bank and the Routing Number designates the routing of a check through the Federal Reserve System. Two or more coincidence marks indicate the end of a record or the end of the data which is to be read for a particular purpose.

*Check Feed Unit*

Referring to FIGS. 1b, 2b, 4 and 5, the check feed unit 12 is shown mounted on the base plate 10. The check hopper 14 is provided having side plates 244 and an end plate 246. The bottom of the hopper comprises a plate 248 carrying four Teflon slides 250 adapted to support checks C placed in the hopper and to provide minimum of friction against the bottom edges of the checks whereby the checks may be gravity fed toward the rear of the hopper. A check follower plate 252 is mounted on a rod 254 and has a handle 256 attached by a bracket 257 for drawing the follower plate away from the checks in the hopper in order that additional checks may be added during operation of the machine. The checks normally are gravity fed by the weight of the pack of checks. However, the follower plate 252 is useful in feeding the last few checks in the hopper and also for retaining the checks on edge. The mounting for the handle 256 actuates the contacts of a switch 259 when the last check is fed from the hopper. The contacts are utilized in a manner described hereinafter in the circuit description.

The foremost checks in the hopper rest against two guide rollers 258 rotatably mounted on a shaft 260 which is journaled in the sidewalls 244 to prevent the checks from sliding, bottom edge first, from the hopper. A shaft 262 journaled in the sidewalls and carrying two rubber covered feed rollers 264, and driven through the bevel gears 98 FIG. 2b, is operable to feed checks one at a time from the hopper 14 to a pair of transport belts 266. The constantly rotating rubber covered shaft 120 journaled in the sidewalls 244 and driven by the belt 110, FIG. 2b, running on idlers 117, as well as the previously described pulleys 112 and 119 and the idlers 114, 115 and 117, aid in feeding checks along a guide member 269 mounted on base plate 10 and containing air holes 270. Air is supplied from the blower 126, FIG. 3, through the hose 128 and the hood 132 which is connected by an airtight rubber seal 272 to the 270 holes in the guide member 269 whereby the air stream aids in settling checks upon the transport belts 266, forming a pile from the bottom of which checks are fed one at a time and assuring that each check settled on top of the previously fed one rather than sliding under it.

A light source L1, shown in FIG. 4, is mounted on the rear side of the base plate 10 and light directed through a hole 276 in the plate 10, forms a beam aligned with a photocell PC1 mounted at the front of the transport belts 266. When checks have been piled to a height sufficient to interrupt the beam of light, the clutch 94 is disengaged to prevent further feeding of checks from the hopper 242 to the transport belts 266 until such time as the pile of checks is reduced below the level of the light beam.

The transport belts 266 are mounted on drive rollers 280, FIGS. 1b and 2b, fixed to the driven shaft 82 and upon idler pulleys 282, 284 and 286 rotatably mounted upon respective studs 288, 290 and 292 fixed in the base plate 10. The pair of joggler units 106 and 108, mounted on the joggler shaft 99, each comprise a member 294 having rollers 296 rotatably mounted on each of four studs 298. It is obvious that, for each rotation of the shaft 99, each of the four rollers 296 will raise and lower the belts 266 once, thereby jostling the checks on the transport belts and aiding in the separating and feeding thereof.

*Check Separator Unit*

Referring to FIGS. 1b, 2b, 6 and 7, the check separator unit 20 is illustrated. The check separator unit comprises a first station 20a and a second station 20b. The drive for the separator unit, as described hereinbefore, is the shafts 211 and 222. The shaft 211 is driven through the electromagnetic clutch 52 in the manner described hereinbefore and may be braked by the electromagnetic brake 54. A pair of flat surfaced, cork covered pulleys 300a and 300b, best shown in FIGS. 6 and 7, fastened to the shaft 211 at the station 20b, drive belts 302a and 302b respectively, which extend over idler pulleys 304a and 304b rotatably mounted on the shaft 222 at the separator station 20a and around idler pulleys 306a and 306b which provide tension adjustment for the belts 302a and 302b. A rubber friction wheel 308 is fixed to the shaft 211 between the pulleys 300a and 300b and a similar friction wheel 310 is fixed to the shaft 222 between the idler pulleys 304a and 304b.

A pressure unit generally designated 311 is associated with the separator station 20b and includes three stationary belts 312a, 312b and 312c. The center belt 312b is thicker than the outer belts 312a and 312c. The outer belts cooperate with the idler pulleys 300a and 300b, whereas the center belt cooperates with the friction wheel 308. Each of the belts 312 is mounted on a holder 313 which is supported on a stud 314, mounted on an arm 315 which is rotatable for adjustment of the belts 312 with respect to the rollers 300a, 300b and 308. The arm 315 may be locked to a plate 316 by a slot 317 and a screw 318. A downwardly extending tongue portion 319 of each holder 313 has mounted thereon a stud 320 rotatably mounting two rollers 322, one on each side of the tongue 319. A slotted bracket 324, adjustably fixed to each member 313 by a screw 326, carries a rod 328 which bears against the inner surface of the belts 312 for taking up slack in the belts which are fixed at each end by screws 330 and clamp plates 332. Leaf springs 334 fixed to the holders 313 by the screws 330 and the clamp plates 332 press against the inner surfaces of the belts 312 and tend to keep them under tension at all times.

It will be noted that the belts 312 wrap slightly around and bear against the wheel 308 and the belts 302a and 302b where they run over the pulleys 300a and 300b. A similar assembly 333, having belts 335a, 335b, and 335c, cooperates with the drive pulleys 304a and 304b and the rubber friction wheel 310. The stationary belt unit 311 is mounted on the plate 316 by the stud 314 and by the arm 315 and the associated screw 318. The unit 333 is similarly mounted on the plate 316 by a stud 336, an arm 337 and screw 337a. The plate 316 contains three slots 339 by which it is held to the base plate 10 by screws 340. A pair of knobs 342, mounted on the plate 316, carry spring biased detent pins adapted for engaging holes in the base plate 10 to hold the plate 316 in the operative position shown in FIG. 6. At times, it may be desirable to raise the plate 316 and the two pressure units 311 and 333 in order to facilitate servicing or removal of check jams. To accomplish this, the detents 342 are drawn away from the plate 316 against the spring tension. The plate may then be raised to a position in which it will be held by the spring pressure of the detent pins against the plate 316. Upon completion of servicing the pressure unit is lowered and the detents engage the holes (not shown) in the base plate 10.

A double feed detector plate 344 is pivotally mounted on an arm 346 which is adjustably mounted by a bolt 348 to a bracket 350 adjustably mounted on the plate 316 by a screw 352 and a slot 354. A wire 356 fixed to the right end of the detector plate 344 engages a wire 358 attached to the toggle of an electric switch 360. The plate 344 is adapted to be raised by the buckling action of a check, as will be hereinafter described, whereby the switch 360 is opened to disengage the clutch 64 and apply the brake 66 whereby the roller 310 is stopped.

As checks are fed from the bottom of the stack of checks on the transport belts 266, they are forced up an inclined guide 362 fixed to the base plate 10 by screws 364. A light source L2 is mounted above the guide 362 and light directed through a hole 326a in the guide forms a beam aligned with a photocell PC2. This light beam is interrupted by checks passing up the guide 362. An important feature of the device is the arrangement whereby checks, as they are forced up the inclined guide 362 before reaching the first separating station, tend to separate with the top checks sliding back down due to their own weight and the vibration of the transport belts 266, thus providing an initial fanning action. In the event two or more checks are fed together, the normal action is that all checks except the bottom check will be stopped when their leading edges abut the lower surfaces of the belts 335a, 335b and 335c. The leading edge of the bottom check will be fed into the bite between the belt 335b and the friction roller 310 slightly before the same leading edge encounters the bite between the belts 335a and 335c and the moving belts 302a and 302b, where the latter belts pass over the pulleys 304a and 304b. Thus, a greater frictional driving force is exerted against the lower surface of the bottom check by the roller 310 and belts 302a and 302b than the retarding frictional force exerted against the top surface of the bottom check by the belts 335, and the bottom check will be fed through the first separator station 20a. The check passes under the detector plate 344 and on to the second separator station 20b.

In the event of some misoperation at the station 20a which might occur due to some abnormal attraction between two checks, two checks might be fed together to the second separator station 20b. Here, the leading edge of the top check will be stopped by the stationary belts 312a, 312b and 312c and the bottom check will be fed by the friction roller 308 and belts 302a and 302b. It will be noted that, for a short interval of time, the bottom check will be fed by both the friction rollers 308 at the station 20b and the friction roller 310 at the station 20a. When the trailing edge of the bottom check leaves the friction roller 310 at station 20a, this friction roller will attempt to drive the top check which, as mentioned before, has its leading edge stopped by the belts 312a, 312b and 312c in a manner similar to the operation of station 20a. With the leading edge of the top check held by the belts 312, and the check being driven by the friction roller 310, and belts 304a and 304b, this top check will be forced to buckle upwardly, thus lifting the detector plate 344 and causing operation of the switch 360. The operation of the switch 360 causes deenergization of the electromagnetic clutch 64 and energization of the electromagnetic brake 66 in order quickly to stop rotation of the friction roller 310. When the trailing edge of the bottom check feeds past the friction roller 308 of the separator station 20b, the friction roller 308 will then feed the top check and the buckle will be removed therefrom, permitting the detector 344 to return to normal position thus restoring the switch 360 to its normal position which will again permit rotation of the friction roller 310. As a check passes through the separator station 20b, it is directed down an inclined guide 366, which is mounted on the base plate 10 by a screw 368, toward the delay unit 26.

*Delay Station*

The delay unit 26 is illustrated in FIGS. 1a, 2a, 11, 12 and 13. As described hereinbefore, the delay unit drive is provided through the shafts 152 and 156. The lower shaft 156 carries three pulleys 372a, 372b and 372c. The upper shaft 152 carries two pulleys 370a and 370b opposite the respective pulleys 372a and 372b. A bracket 374 rotatably mounts two flat idler pulleys 376a and 376b. A bracket 378, also fixed to the base plate 10, rotatably supports idler pulleys 380, 382a and 382b. A bracket 384 rotatably supports idler pulleys 386a and 386b. A bracket 388 rotatably supports idler pulleys 390a and 390b. A flat belt 392a is mounted on the driven pulley 372a and the idler pulleys 382a, 386a, 390a and 376a. A similar belt 392b is mounted on the driven roller 372b and the idler rollers 382b, 386b, 390b and 376b. An idler pulley 394 is rotatably mounted on a stud 396 fixed to the base plate 10. A flat belt 398 is mounted on the driven roller 372c and the idler pulleys 380 and 394. A pair of idler pulleys 397a and 397b are rotatably mounted on a stud 397 fixed to the base plate 10, and cooperate with the belts 392a and 392b for feeding checks through the delay unit. A pair of idler rollers 400a and 400b are rotatably mounted on a stud 402 fixed to the bracket 388. Only the roller 400a is shown in FIG. 12, whereas the roller 400b is broken away to illustrate the lower belt drive 392b. Two pairs of rollers 404a and 404b, and 406a and 406b, are rotatably mounted on a bracket 408 fixed to the base plate 10. A flat belt 410a is mounted on the driven pulley 370a and idler pulleys 397a, 400a, 404a and 406a. A similar belt 410b is mounted on the driven pulley 370b and the idler pulleys 397b, 400b, 404b and 406b.

A shoe 412 is mounted on the bracket 378 between the belts 392a and 392b, the top surface of the shoe 412 being in the plane of the belts 392a and 392b. A card lever 414 is pivotally mounted in the base plate 10 by a stud 416 and is positioned to be operated by a check passing between the belts 392a and 392b and the belts 410a and 410b. When the card lever 414 is operated, through an extension 418 is closes a pair of electrical contacts 420. The contacts 420 complete a circuit to de-energize an electromagnet 422C (422 Clamp) mounted on the rear side of the base plate 10 and adapted to attract an armature 424, FIGS. 12 and 13, having its lower end pivotally supported by a bracket 448 and having its upper end pivotally connected at a point 428 to one end of an arm 426. The opposite end of the arm 426 is pivoted to an arm 430 at a point 432. The opposite end of the arm 430 is fixed to a shaft 434 journaled in bearings 435 fixed to the base plate 10 and extending through the front side of the plate 10. A finger 436 is fixed to the front end of the shaft 434. When the electromagnet 422C is energized pulling the arm 426 and rocking the arm 430 and the shaft 434, the finger 436 is rotated in a counterclockwise direction with the shaft 434 thereby bearing against a member 438 fixed to a clamp plate 440. The counterclockwise rotation of the finger 436 bearing on the member 438 depresses the clamp plate 440 against the shoe 412 thereby pinching a check between the shoe 412 and the clamp plate 440 and preventing the rotating belts 392 and 410 from advancing the check. The member 438 and clamp plate 440 are mounted by a piece of spring steel 442 fixed to a bracket 444 which is fixed to the base plate 10. The spring 442 normally retains the clamp plate 440 out of contact with a check resting on the belts 392a and 392b and 398.

A second electromagnet 422R (Release), mounted with the electromagnet 422C on a bracket 448, which is fixed to base plate 10, is actuated in a manner described hereinafter positively to pivot the shaft 434 in a clockwise direction thereby relieving the pressure of the clamp plate 440 on a check. A second card lever 446, similar to the card lever 414, detects a check when the leading edge passes thereunder and operates contacts 447 for a purpose described hereinafter. When a check passes from the check separator unit 20 to the delay unit 26, it passes over a plate 449, FIGS. 11 and 12, having flanges 449a and 449b. A full size check nearly fills the space between the flanges whereas a smaller check is positioned somewhere between the flanges.

Check Aligner and Reader

The belts 398, 392a, 392b, 410a and 410b feed the checks into the check aligner unit 28 for alignment preparatory to feeding past magntic read unit 30. For ease of understanding, the read heads and the drum will be described before the check aligner. The check aligner is shown in the machine in FIGS. 1a, 2a and 11. Details of the drum are shown in FIGS. 16, 17 and 18. Referring to FIG. 17, the drum components are mounted between the plate 10 and a plate 452 which is spaced from the plate 10 by bars 454 and 456. There are two rotating drum portions 458 and 460 each driven by its own pulley 462 and 464 respectively, from a pair of pulleys 466a and 466b, FIG. 12, on the common driven shaft 178, by belts 467 and 468. The rear drum portion 458 is mounted for rotation on ball bearings 469 which are mounted on a stationary shaft 470 having a hole 471 drilled concentric with the axis partially through the shaft. The front drum portion 460 is mounted for rotation on ball bearings 472 which in turn are supported by the stationary shaft 470. The pulleys 462 and 464 are fixed by screws 474 anw 476 to their respective drum components 458 and 460.

The stationary drum assembly 478, FIG. 17, is mounted on rubber shock absorbers 480 which, in turn, are fastened to the stationary shaft 470. Referring to FIG. 18, the sensing drum assembly 478 is made in two parts 482 and 484. The portion 482 is fastened to the outer surfaces of the shock mounts 480 and thus can be considered a permanent part of the machine. The other portion 484 is fixed to the portion 482 by screws 486. The reason for the two piece construction is that the portion 484 carries a magnetic sensing head assembly 488 and its associated amplifiers 490 which needs to be removed from the machine for adjustment. The portion 484 can be removed from the portion 482 by removing the screws 486.

The magnetic heads 494 are contained in a block 496, FIG. 18, and are positioned to sense respectively the zero or checking bit track and one, or code bit track. Reference can be made to FIG. 10, which shows these bit tracks as they appear on the check, and to the description hereinbefore. The particular heads used are not considered a part of this invention and a general description should suffice. The heads are of laminated construction. A thin brass shim separates the laminations at the top and the laminations are spaced apart at the bottom by permanent magnets. The permanent magnets provide the normal flux through the magnetic path. This flux is increased when a magnetic bit mark on the check passes the gap in the laminations formed by the brass shim. The increase in flux induces a voltage in the coils which are wound on each lamination bundle. An opposite voltage is induced when the flux decays. These induced voltages may be utilized in the conventional manner to store or otherwise utilize the information represented thereby.

The head unit 488 is mounted on three studs 500, threaded into the portion 484. Electrical connections from the head are made to a connector 498. An electrical connector 502 which mates with the connector 498, is connected by wires 504 to the amplifier assembly 490. Another group of wires 506 extend from the amplifier unit 490 to an electrical connector 508 which is fastened to the portion 484. The connector 508 joins with a mating connector 509 mounted on a block 510 which is fastened to the portion 482 by screws 511. Wires 512 extend from the connector 509 through a slot 513 into the hole 471 in the hollow stationary shaft 470. In FIG. 18, a wire 514, secured under the head of a screw 515 acts as a ground wire for the head assembly 478 which is necessary because the head assembly 478 is supported by the rubber shock mounts 480.

Referring now to FIG. 1a, as the checks are fed through the check separator unit 20 and the delay unit 26, the top edges of the checks are not aligned. This is mainly due to differences in the width of checks which must be accommodated by the machine and to the fact that the checks in the hopper need not be neatly stacked with edges aligned. In the delay station a check C passes between a guide flange 516a, FIG. 15, of a guide member 516 and a flange 517a of a guide member 517. The check will fill more or less of the space between the guide flanges 516a and 517a depending on the dimensions of the check. As the check progresses, it encounters the rear wall of a horizontal groove 518a in a prealigning guide 518, shown in FIG. 15a. The rear wall directs the check toward the front of the machine with its top edge paralleling the wall 518a as shown in FIG. 15b. As the check advances at an angle toward the front of the machine, the leading edge is directed under a guide 519 mounted on the bracket 388, FIG. 11. The guide 519 directs the check under a flange 578b of the bracket 578, FIG. 16. The leading edge of the check encounters a first pair of skewed aligning rollers 526a and 526b, also shown in FIG. 16. The roller 526a is a driven roller mounted on a shaft 528 rotatably mounted in a bracket 530 fixed to the plate 452, FIGS. 1a and 2a, which is mounted on the base plate 10 by the rods 454 and 456. The roller 526b cooperates with the roller 526a and is rotatably mounted on a bracket 538 also fixed to the plate 452. The rollers 526a and 526b act to crowd the check toward the rear of the machine as illustrated in FIG. 15c. The check thus pivots about a point 540 along the top edge of the check. This pivoting and crowding action continues and is increased when the leading edge of the check is fed into the bite of a second pair of aligning rollers 542a and 542b. The roller 542a is the driven roller and is mounted on a shaft 544 which is rotatably mounted in a bracket 546 fixed to the plate 452. The roller 542b cooperates with the roller 542a and is rotatably mounted on a bracket 548 fixed to the bracket 546 fixed to the plate 452. The two pair of aligning rollers thus act to force the top edge of the check against a flange 458a on the drum portion 458, FIG. 17. The check does not buckle under the crowding action of the aligning rollers since it has added stiffness due to being bent in a curve around the drum unit 30. Referring to FIG. 1a, the drive for the aligning rollers 526a, 526b, 542a and 542b, is a pulley 550 fixed to the driven shaft 178. A belt 552 driven by pulley 550 drives a compound pulley 554 rotatably mounted on a shaft 556. An idler 558, FIG. 1a, is rotatably mounted on the plate 452 by a stud 560. An idler 562 is rotatably mounted on a stud 564 fixed to the plate 452. The shaft 528 mounts a pulley 565 and similarly, the shaft 544 mounts a pulley 566. A belt 570 running over the driven pulley 554 and the idlers 558 and 562 provides the drive for the pulleys 555 and 556 and the aligning rollers 526a and 542a.

A flat belt 571, best shown in FIG. 16, is mounted on three idler pulleys 572 rotatably mounted on studs 573 fixed to the base plate 10. The belt 571 cooperates with the drum section 460, FIG. 17, for driving a check around the drum toward the stacker unit 34. A flexible reed 574, FIG. 18, is mounted on a bracket 575 which is fixed to the brace 456. The reed 574 cooperates with the drum 478, FIGS. 17 and 18, to hold a check in close proximity to the magnetic heads 494 for reading data on the check.

As a check is aligned with the flange 458a it encounters a card lever 576, FIG. 18, pivoted on a pin 577 journaled in a bracket 578 fixed to the base plate 10 by two rods 578a. The pin 577 carries a lever 576a which is adapted to close a pair of contacts 576b, also mounted on the bracket 578 for a purpose described hereinafter. The card lever 576 is positioned approximately three inches ahead of the gap of the read heads 494.

Referring to FIG. 16, another card lever 579, similar to the card lever 576 is positioned adjacent the read heads 494a and 494b to actuate a pair of contacts 579a, the purpose of which is described hereinafter. The lever 579 and the contacts 579a are supported on the bar 456 by a bracket 580. A member 581 mounted on the bar 456 serves as a backing member to aid a check in operating the card lever 579. The upper portion of the member 581 is shown only in dotted outline in FIG. 17.

*Stacker Transport*

Referring to FIG. 3, the driven shaft 166 provides the drive for the transport system for conveying checks from the drum unit 30 to the stacker 34. A drive pulley 583, FIGS. 1a, 19, 20 and 21, is fixed to the shaft 166. Fifteen idler pulleys 584, are horizontally aligned with the driven pulley 583 and rotatably mounted on studs 586 fixed in the base plate 10 and positioned thereon by means of spacer sleeves 603. A flat transport belt 588 is mounted on the driven pulley 583 and the idler pulleys 584 and provides transporting means to the stacker unit 34. Opposite each idler pulley 584 is a pressure roller 590 rotatably mounted on a stud 592 fixed in a bracket 594 which is suspended by means of a leaf spring 596 and bolts 598 to a member 690 shown in FIGS. 1a and 19 and to members 691 shown in FIGS. 1b and 23 and described hereinafter. A member 599 shown in FIG. 1a extends into FIG. 1b, where it comprises only the lower flange 599a best shown in FIG. 20. Two rollers 600, FIGS. 1a, 19, 20 and 21, mounted on brackets 601 fixed to a bar 602 which is mounted on the frame of the machine, are adjustable by mounting screws 601a to take up any slack which may exist in the belt 588. A roller 604, FIG. 1b, biased by a spring 605 is mounted in contact with the belt 588 to provide proper tension.

A card lever 606 is mounted in advance of the chute blade selector unit 32 and operates a pair of contacts 607 which act as a timer for the chute blade selector unit 32. A similar card lever 608 is mounted near the unit 32, as shown in FIG. 1a, and operates contacts 610 to restore the unit 32. The function of these card levers and the associated contacts is described hereinafter in the circuit description.

A check fed under the belt 588 from the belt 571 is advanced under a particular one of twelve chute blades 612 whereby the check is directed to a particular one of twelve pockets 36 associated with the particular chute blade. If none of the chute blades is selected, the check moves over the top of all chute blades and enters the thirteenth or reject pocket.

*Pocket Selector*

Referring to FIGS. 19, 20 and 21, the chute blade selecting mechanism, generally designated 32, extends through a hole in the base plate 10 and is fixed thereto by brackets 613 and screws 613a. As a check enters under the belt 588, the front edge of the check remains on the line formed by the belt 588 and the idlers 590. The rear edge of the check is guided up an inclined plane 614 and along a line formed by the lower extremities of a plurality of guide fingers 616 which form part of a plate 618 pivoted at 620, FIG. 20, and mounted on a bracket 622 which is fixed to the bar 602.

The check passes over the tops of twelve gates 624, pivotally mounted on the ends of the twelve chute blades 612. When the check encounters a raised gate such as the one designated 624a in FIG. 19, the check is guided under the associated chute blade 612 and is directed to the associated pocket 36 as will be hereinafter described.

The means for raising the gates 624 is the selector mechanism 32 which includes twelve selectively operable electromagnets 626 and associated linkages.

The unit 32 is enclosed in a rectangular case 628 having sidewalls 630 and 632 held in place by bracket 634. An upper bar 636 and a lower bar 638 are welded to the case 628 by respective flanges 640 and 642. The bar 636 mounts an upper row of six of the electromagnets 626. The lower bar 638 mounts the remaining six electromagnets 626. The purpose of the two rows of magnets is to permit a compact selector unit. While the linkages associated with the upper magnets and the lower magnets will differ slightly, a description of one will suffice for all.

Referring to FIG. 20, each electromagnet 626 is mounted on a bracket 644 which pivotally mounts an armature 646. When the electromagnet 626 is energized, the armature 646 is pivoted about its pivot point 648 thereby raising the left end of the armature 646. The armature is biased downwardly by a spring 650 connected to a bracket 652 also mounted on the bar 636. A leaf spring 654 is mounted on the armature 646 by a screw 656. The free end of the leaf spring 654 engages a link 658 which is guided through holes in a pair of brackets 660 and 662 which are fixed to a bar 664 mounted to the case 628 by flanges 666 using two screws. The link 658 extends through a third guide member 668 and terminates in a loop which engages one end of a crank 670. An offset portion of the crank 670, best shown in FIG. 21, is rotatably mounted between a pair of blocks 672 and 674. The left end of the crank 670, as viewed in FIG. 20, engages a corresponding gate 624 at its leading edge. When the electromagnet 626 is energized and the armature 646 is raised, the link 658 is pulled upwardly thereby rotating the ends of the crank 670 in a crockwise direction, as viewed in FIG. 19, thereby raising the left end of the associated gate 624. The link 658 is mounted to the armature 646 through the spring 654 in order to allow some play for adjustment and also to prevent damage to the working parts in the event a jam occurs. When a gate 624 is actuated, as in the case of the gate 624a, the leading edge or left-hand edge, as viewed in FIG. 19, is elevated above the line described at the lower extremities of the fingers 616 whereby a check arriving at the raised gate is forced to bend downwardly under the associated chute blade 612.

The reason for hinging the member 618 is to allow it to be raised for the clearing of check jams. A guide member 676 is located at the entrance to the transport belt 588 to guide checks thereunder (see FIG. 21). The member 676 carries two studs 678 and is mounted below slot 680 in a bracket 682 by clips 684 engaging the studs 678. The bracket 682 is mounted by screws 686. The guide 676 is slidable below bracket 682 to facilitate clearance of check jams.

Check Stacker

Referring to FIGS. 1a, 1b and 19, when a check is fed past the selector unit 32 and under a selected chute blade 612, it advances toward the stacker pockets designated from left to right in FIG. 1 as 36–9, 36–8, 36–7, 36–6, 36–5, 36–4, 36–3, 36–2, 36–1, 36–0, 36–SS (Sort Suppress), 36–MCS (Multiple Column Selection) and 36–R (Reject), to be directed into a particular pocket corresponding to the particular chute blade 612 which was selected. FIG. 22 shows a sectional side elevation of the stacker unit, whereas FIG. 23 shows a plan view with successive portions broken away as you progress to the right. Referring to FIG. 1a, a plate 690 extends from the drum unit 30 past the selection unit 32 and terminates, in FIGS. 1b and 23, in a turned down portion 690a in the first pocket 36–9, which aids in rotating a check 90° as well as inverting the check, whereby the check is deposited on a platform 692. The succeeding pockets have members 691 similar to the turned down end 690a of the member 690 which are fixed to a frame member 693 by nuts and bolts 694 as illustrated in FIGS. 22 and 23. The plate 690, shown in FIG. 1a, has a turned down flange which adds strength to the plate and has holes, not shown in FIG. 1a, through which the rollers 590 project to aid the belt 588 in transporting the checks. As described hereinbefore, the member 599 shown in FIG. 1a has an I-section for added strength which is reduced to the lower crossbar of the I-section as it progresses to the right as shown in the sectional view, FIG. 22, where the reduced section is designated 599a. A curved guide member 695 best seen in FIGS. 22 and 23, is mounted by means of brackets 696 and 698 to the base plate 10. Each chute blade 612, has a bifurcated end comprising a portion 612a and a portion 612b. The portion 612b of each chute blade 612 is inserted through a hole 700 in the associated guide member 691. As a check is advanced toward the stacker pockets 36, the rear edge of the check is beneath a selected chute blade 612 which terminates at the pocket to which a check is being directed. As the check reaches the pocket, the leading edge is deflected by the end 612a of the chute blade into an opening between the members 690a and 695 or, in pockets after the first pocket, between members 691 and 695. The check is curved downwardly by action of the members 690a—691 and 695 and toward the front of the machine whereby it is inverted and rotated 90° and is deposited on the platform 692. As shown in FIG. 23, each member 691 contains a pair of holes 706 through which the pressure rollers 590 cooperate with the belt 588.

Stacker Platform Servomechanism

Referring to FIGS. 1b and 23, and particularly to FIGS. 22 and 24a, 24b, 24c, 24d and 24e, the details of the stacker platform servomechanism are shown. As checks are fed into a particular pocket 36, it is desirable that the checks remain in the order in which they enter the pocket. Therefore, it is desirable to assure that a following check does not enter underneath a preceding check as it is fed into the pocket. In order to insure this action, the platform 692 is maintained in close relation to the members 690a—691 and 695. The stacker servomechanism is adapted to maintain the platform 692 in that relation or in such a relation that the uppermost check on the platform will be closely adjacent the members 690a—691 and 695. To this end a lever 710 is positioned to be actuated by a check entering between the lever 710 and the platform 692 or between the lever 710 and the uppermost check on the platform. When the lever 710 is raised by one or more checks entering the pocket, the servomechanism is actuated to lower the platform a corresponding amount. When the checks are removed from the platform 692, the lever 710 is permitted to drop, thereby actuating the servomechanism to raise the platform 692 to the described position. A shaft 712, supporting the platform 692, mounts a piston 714 mounted in a cylinder 716 (see FIG. 22). A spring 718 is mounted on the shaft 712 to cushion the platform 692 in its lowest position. A spring 720 is mounted on the shaft 712 to bias the piston 714 downwardly. A port 722 is provided in the bottom of the cylinder 716 connected with an air hose 724. The air hose 724 leads to a valve generally designated 726. An air hose 728 leads from the valve 726 to a tube 730 connected to any suitable air pressure supply (not shown). Referring to FIGS. 24a through 26e, the valve 726 is mounted by a bolt 732 on a bracket 734 suitably mounted on the frame of the machine. The valve 726 comprises a stationary cylindrical member 736 having a reduced hub portion 738 loosely mounting a sleeve 740. The sleeve 740 is held in position by a washer 742 and a screw 744. The sleeve 740 mounts the lever 710 by snapping a looped end of the lever 710 into a groove 746. A turned over end 710a engages a hole 740a in the sleeve 740. A pair of radially extending nipples 748 and 750 connect respectively with holes 752 and 754 extending lengthwise of the cylinder 736 to a point midway on the turned down hub portion 738 where the holes 752 and 754 turn at right angles and extend radially to the outer surface of the turned down hub portion. The tube 728 connects the air supply tube 730 with the nipple 748 whereas the tube 724 connects the port 722 of the cylinder 716 with the nipple 750. A cavity 756 formed on the inner surface of the sleeve 740 in alignment with the holes 752 and 754 is adapted, in one position of the sleeve 740, FIG. 24b, to cover the hole 752; in another position of the sleeve 740, FIG. 24d, to be out of alignment with both holes 752 and 754; and in a third position of the sleeve 740, FIG. 24e, to connect the holes 752 and 754. An exhaust port 758 is drilled in the sleeve 740 and is adapted, in one position of the sleeve 740, FIG. 24d, to be in alignment with the holes 752 and to connect the hole 754 with the atmosphere. In the other positions of the sleeve 740, FIGS. 24b and 24e, port 758 is out of alignment with the hole 754. In operation of the servomechanism, the lever 710 is normally in contact either with the platform 692 or with the uppermost check on the platform, as illustrated in FIG. 22. When additional checks are fed under the lever 710, the lever 710 is rotated in a clockwise direction, to the position 710a, FIG. 22, moving the sleeve 740 to the position of FIG. 24d in which position the exhaust port 758 connects with the hole 754 thereby exhausting air from the cylinder 716 through the port 722, the tube 724, the nipple 750, the hole 754 and the exhaust port 758 to the atmosphere. Exhausting air from the cylinder 716 permits the spring 720 to lower the piston 714 thereby lowering the platforms 692 and causing the lever 710 to rotate in a counterclockwise direction until the exhaust port 758 is no longer in registration with the hole 754. Assuming there are checks in the stacker pocket and they are removed therefrom, the lever 710 is allowed to fall, rotating the sleeve 740 in a counterclockwise direction to the position illustrated in FIG. 24e, in which position the cavity 756 in sleeve 740 connects the holes 752 and 754 thus supplying air from the tube 730 through the tube 728, the nipple 748, the hole 752 through the cavity 756 into the hole 754, through the nipple 750, the hose 724 and the port 722 into the cylinder 716 thereby raising the piston 714 and the platform 692 against the action of the spring 720. The upward movement of the piston 714 and the platform 692 will continue until the platform 692 engages the lever 710 moving it upwardly whereby the sleeve 740 is rotated to the position of FIG. 24b, at which time the supply of air from the hole 754 through the cavity 756 to the hole 752 is cut off. This latter position is the normal position of the valve 726. Referring to FIG. 22, a raised position of the platform 692 with several checks thereon is illustrated. In dotted outline, two additional positions of the platform 692 are illustrated. When the platform is lowered to the middle position by the feeding of checks into the pocket, the platform engages a lever 760 fixed to a rod 762 which is pivotally mounted on the frame of the machine. The rod 762 also carries a mercury type switch 764 which is adapted to close electrical contacts when moved to the dotted position 764a when the lever 760 is moved to the dotted position 760a by the platform in the lowermost illustrated position. The rod 762 and the associated lever 760 and switch 764 are normally maintained in the full line position by a spring 766. Eleven of the thirteen pockets 36 have a lever 760, all of which are commonly mounted on the rod 762. The switch 764 is utilized in a manner described hereinafter in the circuit description. The pockets designated 36–0 and 36–1 have individual switches operating on the same principle as the lever 760 to operate contact designated 768–0 and 768–1 for an Alternate Pocket Selection operation. The use of the switches 768–0 and 768–1 also will be described hereinafter.

*Circuit Description*

Figure 25D:
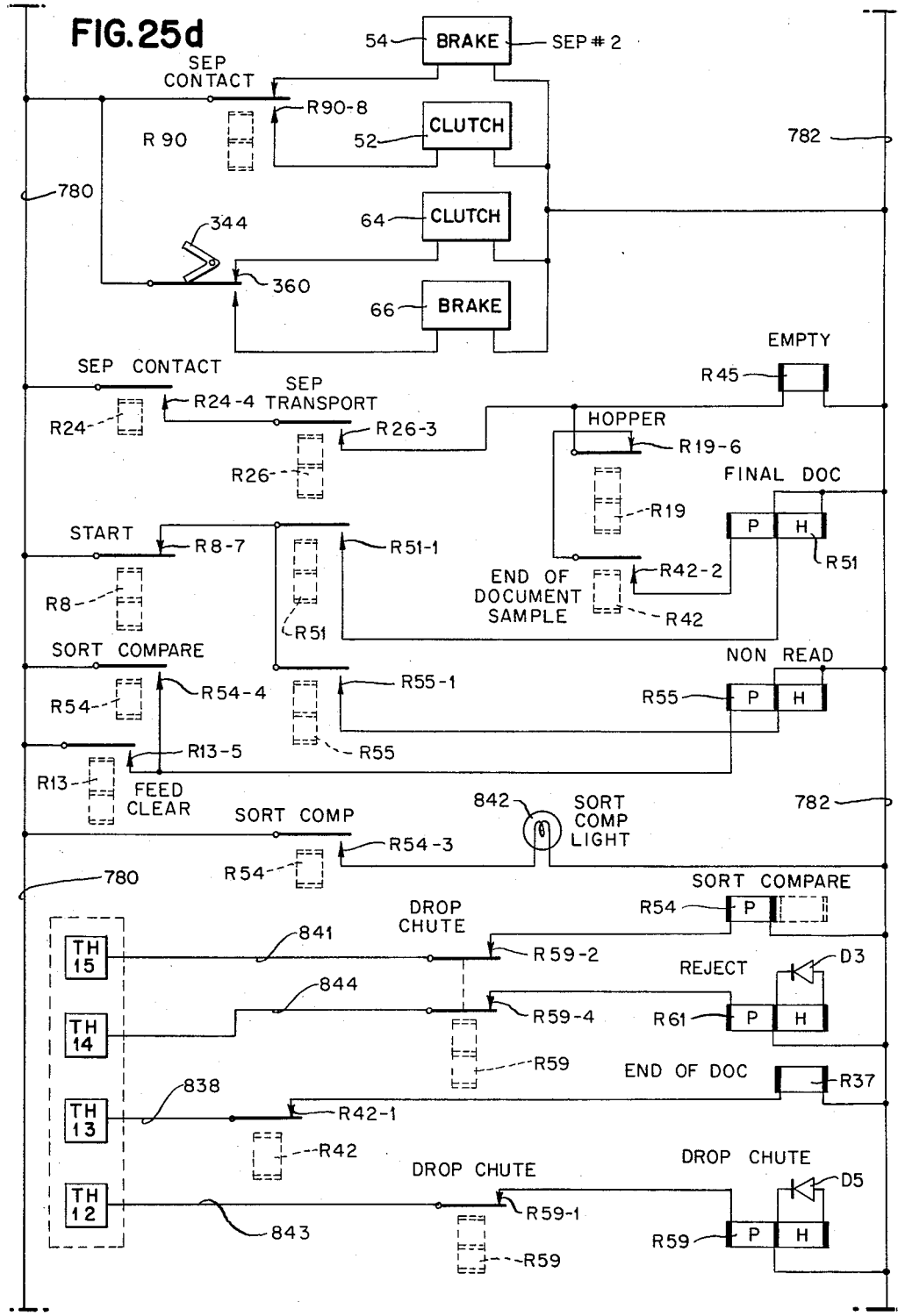

Referring to FIG. 26a, the arrangement of FIGS. 25a, b, c, d, e, f, g and h is shown whereby they form a complete wiring diagram for electrical control of the mechanical operation of the machine. FIG. 26b shows the arrangement of FIGS. 25j, 25k, 25l, 25m, 25n, 25o, 25p, 25q, 25r and 25s comprising the transistor logic section of the circuit. FIG. 27a is a block representation of the transistor logic section of the circuit. The general arrangement of the wiring schematic shown in FIGS. 25a through 25h, comprises a 0 potential line 780 arranged along the left-hand side of each sheet, and a minus 48 volt line 782 arranged along the right-hand edge of the sheet. The various circuits are completed between the 0 potential and the minus 48 volt lines by closing various switches and relay contacts. In the upper portion of FIG. 25a, a 120 volt A.C. supply for two lines 783 and 784 is provided for operating the various motors in the machine. Three synchronous motors designated Start Delay Timer No. 1, Runout Timer No. 2 and Separator Timer No. 3, are provided to permit various increments of delay for purposes described hereinafter. These synchronous motors, when started, run at a predetermined speed and therefore, by placing cams on their shafts, contacts in a stationary location may be operated a specified time after the starting of the motor, depending upon the angle at which an operating lobe of a cam is mounted on the shaft, with respect to the starting point.

To start the machine, a Power ON switch 786 is manually operated to complete a circuit from the line 780 through a Power OFF switch 790, Power ON switch 786, and a magnet 788 to the —48 volt line. The magnet 788 operates closing contacts 788A, 788B, 788C and 788D. The contact 788A then provides a hold circuit from the line 780 through OFF switch 790, the contact 788A and the contact magnet 788 to the —48 volt line which circuit is held until such time as the power OFF switch 790 is manually operated to break the circuit. A circuit is completed from the line 783 through the contact 788B and the coils of a blower motor 791, which is not shown in the mechanical drawings but is provided for cooling the various circuit components.

In parallel with the motor 791, a circuit is completed through relay contacts R808–1, when relay R808 is energized as described hereinafter, through the transport motor 44 to the line 784 and through the Start Delay Timer No. 1 motor to the line 784. Another parallel circuit is completed, when a relay R156 is energized, as described hereinafter, through the normally open contacts R156–1 of the relay R156, through the Separator Timer No. 3. Another circuit is from the contacts R156–1, through normally open contacts R3–7, normally closed contacts R2–7 and a Runout Timer No. 2. The Start Delay Timer No. 1 provides a one second delay, the Runout Timer No. 2 provides a two second delay and the Separator Timer No. 3 also provides a two second delay, all for purposes described hereinafter. Other circuits are completed from the line 780 through the contacts 788c, and through the motor 122 to the line 784. The motor 122, as described hereinbefore, drives the blower for settling checks on the transport belts 266. In parallel with the motor 122, other circuits are completed to a compressor motor 792, not shown in the mechanical drawings, but referred to in the mechanical description as a source for providing compressed air for the stacker pockets platforms. Another parallel circuit is completed when a relay R812 is energized, through normally open contacts R812–1 and the motor 40 which provides the drive for the check feed units.

Contacts 788D close to connect the line 782 to the —48 volt supply. When the circuit through the contact 788D is completed, another circuit is then completed, in FIG. 25b, from the line 780 through a line 794, the normal contacts R155–3 of a time delay relay R155, through a coil 796 wound around the operating contact of the relay points R155–2, through a line 797 to the —48 volt line 782. The operating point of the relay R155, about which the coil 796 is wound, is of bimetallic construction and, when heated, closes the normally open contacts R155–2. At the time of transfer, a circuit is completed from the line 780 through a line 795 and the contacts R155–2, through the coil of relay R155 to the line 782, thereby energizing the relay R155 and transferring additional relay contacts, as well as holding the thermally transferred contacts R155–2. The heating period of the bimetallic contacts provides a time delay during which the power supply may settle down to a steady state. At the same time that the circuit is completed through the coil 796, a parallel circuit is completed through a diode D4 and through the hold coil of a relay R69 to the line 782. Relay R69 closes its various contacts and a hold circuit is provided from the line 780 through contacts R1–5 normally closed, contacts R69–1 normally open, now closed, and through the hold coil of R69 to the line 782.

A circuit also is completed through the now closed contacts R155–1, in FIG. 25a, and a line 802, through normally closed contacts R2–3, in FIG. 25b, normally closed contacts R3–5, normally closed contacts R54–5, normally closed contacts R66–2 and the now closed contacts R69–4 and a READY light 803 to the line 782. The light 803 indicates that the machine is ready for operation.

The machine is now ready for operation and may be started by momentarily depressing a START button 798, in FIG. 25a, thereby completing a circuit from the line 780, through the contacts R155–1, now closed, contacts R17–2, normally closed, through the START switch 798 and the pick coil of a relay R8 to the line 782. The relay R8 is designated STRAT relay. A hold circuit is now completed from the line 780, in FIG. 25a, through a closed, Immediate Stop, manually operable switch 800, through normally closed contacts R51–2 and R90–6, and now closed contacts R2–2, through normally open, now closed contacts R8–1 and the hold coil of relay R8 to the line 782.

Referring to FIGS. 25a and 25b, a circuit is now completed from the line 780 through the Immediate Stop contacts 800 and a line 804, through normally closed contacts R3–2, the now closed contacts R69–2, now closed contacts R8–3 and the coil of a relay R1 to the line 782. The relay R1 is energized thereby transferring its various contacts throughout the circuit.

Referring to FIG. 25c, another circuit is now completed from the line 790, through normally closed contacts R66–4, normally closed contacts R54–2, normally closed contacts R3–3, normally closed contacts R74–1, normally closed contacts R77–1, normally closed contacts R51–5, and the normally open, now closed, contacts R1–3, through the now closed START contacts R8–8 and the coil of a relay R2 to the line 782. The relay R2 is energized transferring its vairous points and providing a hold circuit through the contacts R2–1 which bypass the START contacts R8–8 when the latter contacts open.

Another circiut is completed from the line 780 through the Immediate Stop switch 800, FIG. 25a, through the line 804 and the now closed contacts R1–2, through Runout Timer No. 2 contacts 806, through the now closed contacts R8–2 and a relay R808 to the line 782. A hold circuit to relay R808 is provided through contacts R808–2 bypassing the contacts R8–2 when they open.

Another circuit is completed from the contacts 806, through the contacts R8–2 (later held through contacts R808–2) and through the normal contacts 810 of the START Delay Timer No. 1, through the coil of a Jam Bypass relay R7, to the line 782. When the relay R808 is energized it transfers its contacts R808–1 in FIG. 25a, completing the circuit to the motor 44, as described hereinbefore, and starting the Delay Station transport, the Drum Aligner, and the Stacker transport. The Jam Bypass relay R7 is energized at this time to close contacts R7–2, FIG. 25b, to provide an auxiliary hold circuit to relay R69 during acceleration of the transport system since the load of acceleration may be sufficient to operate the contacts 182—200, 184—200, 186—200 FIG. 25b, of the Jam Detector devices 182, 184 and 186 thereby breaking the normal hold circuit to relay R69.

The START Delay Timer No. 1, after a one second delay, transfers the contacts 810, completing a circuit through a relay R812 to the line 782. The relay R812 closes its contacts R812 –1, FIG. 25a, completing a circuit for the drive motor 40, thereby starting the Separator drive as well as the transport belts 266 and the drive to the hopper.

When the relay R2 is energized, a circuit is completed to the run relay R17, in FIG. 25b, as follows: From the line 780, FIG. 25a, through the contacts R155–1, the line 802, now transferred contacts R2–3, through the hopper contacts R19–3, which are closed due to relay R19 being energized when the hopper contains checks, through now closed contacts R8–4 and the pick coil of relay R17 to the line 782. The R17 contacts transfer and a hold circuit is provided from the lines 802 through the transferred contacts R2–3, and the now closed contacts R17–1 and the hold coil of relay R17 to the line 782. Contacts R2–2, FIG. 25a, open and drop out R8.

When the machine was started, the Separator Transport indicating photocell PC-2 controlling a phototransistor PT2, FIG. 25c, and FIG. 6, was not blocked from the light L2 by a check and, therefore, when R17 is energized, a circuit is completed through contacts R17–6, FIG. 25c, and the coil of a relay R26, transferring all R26 contacts. Similarly, a check was not present in the Separator Station to operate the card lever 809 and open contacts 810; therefore a relay R24 is energized through the normal contacts.

A circuit is then completed from the line 780, FIG. 25c, through contacts R24–7, now closed, and the pick coil of relay R94 to the line 782.

Figure 25E:
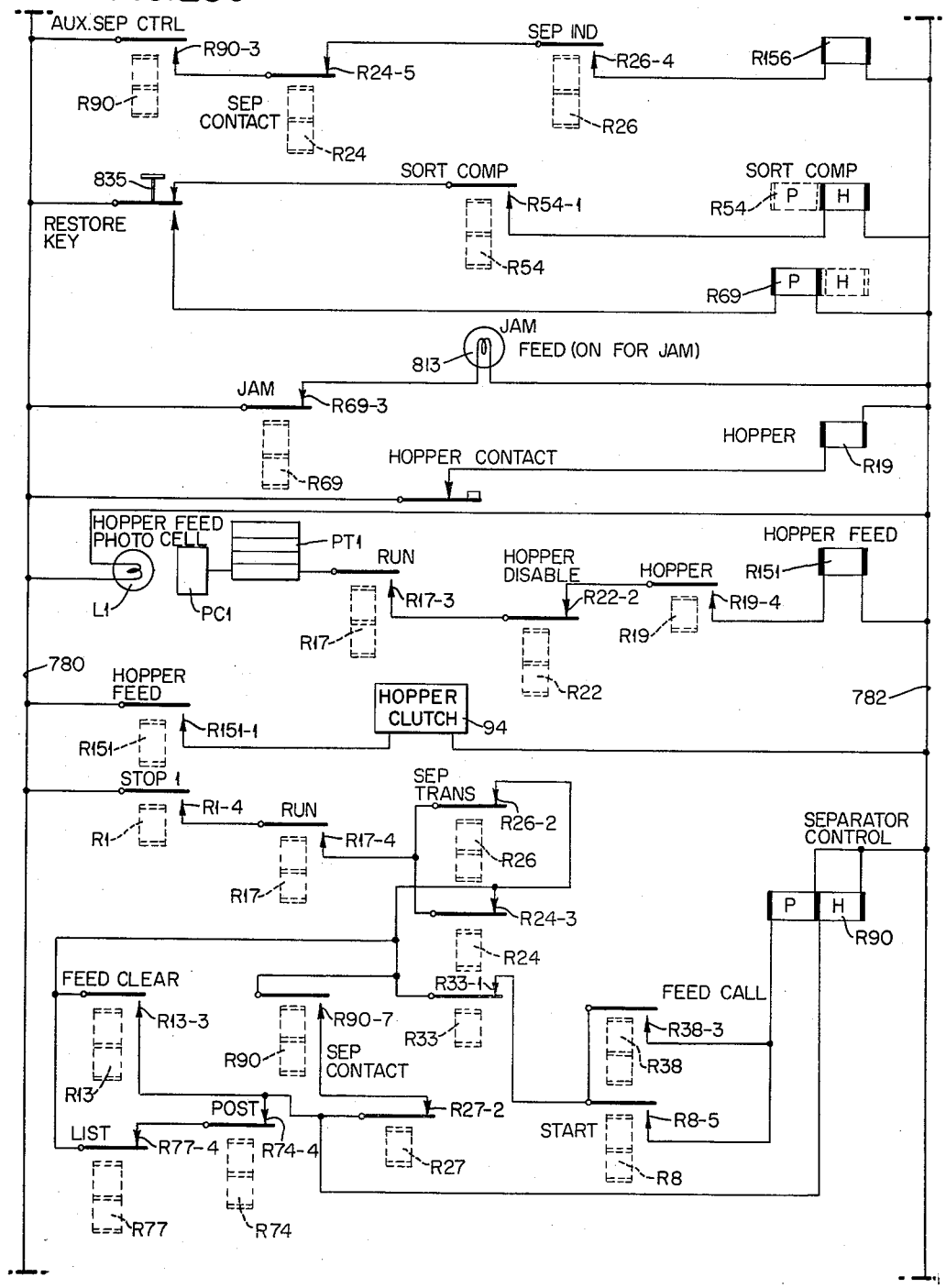

When relay R17 is energized a circuit is completed, in FIG. 25e, from the phototransistor PT1, actuated due to the beam of light from the light L1 to the photocell PC1, FIG. 4, through contacts R17–3, R22–2, R19–4 and the coil of a relay R151 to the line 782. Contacts R151–1 close, completing a circuit from line 780, FIG. 25e, through the coil of the hopper clutch 94, FIGS. 2b, 14a and 14b, to the line 782, feeding cards from the hopper 14 to the transport belts 266. The belts 266 are running and advance checks to the Separator Station, thereby blocking the photocell PC2 and dropping out relay R26.

Relay R17 picks up through contacts R2–3 faster than relay R8 drops out due to opening contacts R2–2, in FIG. 25a. A circuit is then completed from the line 780, FIG. 25e, through contacts R1–4, R17–4, R24–3 transferred, R33–1, R8–5 and the pick coil of relay R90 to the line 782. Shortly thereafter, contacts R8–5 open, but before they open, the hold coil of R90 is energized through the transfer of contacts R90–7 and the normally closed contacts R27–2.

When the machine is operating as a Sorter only, contacts R77–4 and R74–4 are closed providing a circuit to the hold coil of R90 which remains energized and provides a higher speed operation since there is no need to holds checks in the Delay Station and wait for a Feed Call, as described hereinafter.

If a POST operation or a LIST operation is to be combined with the SORT operation, a corresponding relay R74 or R77, in FIG. 25f, is energized by plugging from the line 780 to either the POST hub 815 or the LIST hub 816, through the corresponding relay R74 or R77 to the line 782. If a SORT operation is to be combined with POST or LIST or is to be performed alone, a plugwire is inserted, in FIG. 25f, joining the line 780 through a SORT hub 817 and a SORT relay R81 to the line 782. When Sorting is not to be performed, the latter plugwire is inserted in the lead hub 818 which is designated Alternate Pocket Selection, described hereinafter.

Referring to FIG. 25f, when relay R8 is energized, a circuit is completed from the line 780, through the normally closed contacts R33–2, the now closed contacts R8–6 and the pick coil of a relay R153 to the line 782. The relay R153 is held through the contacts R31–1 normally closed, the now closed contacts R153–1 and to hold coil of relay R153 to the line 782. Through the contacts R153–2, the clamp magnet 422C is deenergized, whereas the release magnet 422R is energized. When a check is advanced to the Delay Station and operates the card lever 414, the contacts 420 close to complete a circuit through contacts R33–3, in FIG. 25c, and a relay R31 to the line 782. Contacts R31–1, in FIG. 25f, break the hold circuit to R153, deenergizing R153 and activating 422C to clamp the check in the Delay Station.

Before being clamped, the check advances far enough to operate the card lever 446 and close the contacts 447, FIG. 25f, completing a circuit from the line 780, through the contacts 447, and, in parallel through a relay R33 and through contacts R84–2 and a relay R27. Through contacts R27–1, a relay R84 is energized and, in FIG. 25e, contacts R27–2 open, dropping out the relay R90 and stopping the Separator drive. A hold circuit, for relay R84 is provided through contacts R84–1. Contacts R33–1 open, however, the pick circuit for R90 had already been opened at R8–5 when R90 picked up. Contacts R33–2, FIG. 25f, open but the pick circuit for R153 is already open at R8–6. Contacts R33–3, FIG. 25c, drop out relay R31. During a Feed Call or Feed Clear operation, described hereinafter, the contacts R38–2 or R13–4 pick up relay R153 to release a check from the Delay Station.

A circuit is completed from the lines 780, FIG. 25c, through the transferred contacts R90–1 and, depending upon whether a POST operation with R74 energized or in a LIST operation with R77 energized is in progress, through the transferred contact R74–1, in a POST operation, and the normal contact R77–1 through the contacts R51–5, R1–3 and R2–1 to the relay R2 providing a hold circuit therefor; or in a LIST operation, through the transferred contacts R77–1 and thence on to the relay R2.

Referring to FIG. 25e, a relay R156 is provided to close contacts R156–1 in FIG. 25a, to start the Separator Timer No. 3. The relay R156 is energized when relay R24 is deenergized due to a check under a card lever 809 in the Separator station, FIG. 6, and when the relay R26 is energized due to the absence of a check at the photocell PC2 and when R90 is energized thereby causing the Separator to run. This is a safety device to stop the Separator drive when checks are exhausted from the transport belts 266 since the friction surfaces in the Separator unit wear out very rapidly if they run when checks are not present in the Separator. The pick circuit for relay R156 is from the line 780 in FIG. 25e, through the contacts R90–3, R24–5 and the contacts R26–4, through the coil of the relay R156 to the line 782. The relay contacts R156–1 in FIG. 25a, then complete a circuit to the Separator Timer No. 3 which commences rotating and will be effective after a period of two seconds to open the contacts 814, in FIG. 25b, and drop out relay R69. However, it is more likely that a check will arrive at the first Separator station thereby blocking the light from the photocell PC2, causing the relay R26 to be deenergized and opening the contacts R26–4 whereby the relay R156 is deenergized before the two second lapse of time and the contacts R156–1 open stopping the Separator Timer No. 3. Also, the circuit may be broken by the energizing of relay R24 and the opening of contacts R24–5 when a check leaves the Separator station. When the check arrives at the card lever 446, the relay contacts R27–2 then open and stop the Separator drive.

When R69 is dropped out, the contacts R69–2, in FIG. 25b open, thereby breaking the hold circuit to relay R1 which in turn opens its contacts R1–3, in FIG. 25c, thereby dropping out relay R2. Dropping out the relays R1 and R2 brings the machine to a stop as follows. Contacts R1–2, in FIG. 25b, open dropping relay R808 and R812 and deenergizing motors 40 and 44. Contacts R1–4, FIG. 25e, drop out relay R90.

Contacts R90–4, when closed, complete a hold circuit, in FIG. 25c, from the line 780 through the contacts R90–4 and contacts R94–1 through the hold coils of relay R94 to the line 782. The relay R94 was picked through contacts R24–7 as described hereinbefore. Contacts R90–8, in FIG. 25d, transfer, breaking the circuit to the Separator station brake 54 and energizing the clutch 52 whereby the second Separator station 20b is driven. It will be recalled that the clutch 64 for the first Separator station 20a is normally engaged and will be driven with a second Separator station unless the double feed contact 360 has been operated by a check buckling under the double feed contact lever 344.

In the event a jam occurs at any one of the Jam Detectors 182, 184 or 186, the corresponding contacts 182—200, 184—200 or 186—200 of those Jam Detector devices, shown in FIG. 25b, will be operated breaking the hold circuit to relay R69 thereby dropping relays R1 and R2 and stopping the machine as described hereinbefore and closing the contacts R69–3, FIG. 25e, thereby turning ON a light 813.

There are three general functions to be performed by this machine. One of the functions is a SORT function wherein checks are sorted into various pockets in accordance with data read in a selected position on the check. The SORT operation may be performed alone or may be performed in conjunction with a POST operation or a LIST operation. In a POST operation the information read on a check is fed into a storage unit or directly into some other piece of equipment, for example the "IBM Type 650" for use by that machine in various operations. In a LIST operation the information read in the check is fed through a buffer into a printing machine, for example, the "IBM Type 419," wherein the information can be printed. The POST operation and the LIST operation may be performed with or without the SORT operation. If sorting is not desired, the Alternate Pocket Selection (APS) feature is advantageous inasmuch as it provides two pockets into which checks may be fed. They are fed, in order, into a first pocket, 36–0, until that pocket is filled, at which time a Pocket Stop contact 768–0 is operated transferring the chute blade controls, as will be hereinafter more fully described, whereby the checks are then fed into the adjacent pocket 36–1. When the pocket 36–0 is emptied of checks it is then ready to accept checks as an overflow from the pocket 36–1. This type of overflow operation allows continuous operation of the machine whereas, without the Alternate Pocket Selection feature, when one pocket becomes filled, the machine shuts OFF.

Referring to FIG. 25g, the twelve sort magnets 626 are shown and designated by suffixes 0–9, SS, and MCS. For a normal SORT operation, signals are fed from the transistor logic, to be described hereinafter, to the thyratrons shown in the dotted outline box designated 820 which indicates that these thyratrons also are shown in the transistor logic, FIG. 25l. The magnets 626–2 through 626–9 are connected directly from thyratrons TH2 through TH9 in the box 820, through coils of the respective magnets 626 to a common line 823. The magnets 626–0 and 626–1 are also associated with the Alternate Pocket Selection feature and the connections thereto are through contacts of the SORT magnet R81, FIG. 25f, which is energized when the SORT operation is desired. At that time a circuit is completed from the corresponding thyratrons TH0 and TH1 (also shown in the transistor logic, FIG. 25l), through the respective contacts R81–11 and R81–12 to the selector magnets 626–0 and 626–1 and then to the common line 823. When the Alternate Pocket Selection feature is used, the jumper wire is not plugged to the hub 817 in FIG. 25f, but instead is plugged to the dead APS hub 818. The relay R81 is then deenergized and a circuit is complete from the line 780, in FIG. 25g, through the contacts R68–4 (normal or transferred depending upon which pocket is presently being filled) and then through the normal contact R81–11 or R81–12 to the respective magnet 626–0 or 626–1.

Assuming an Alternate Pocket Selection operation is under way and the checks are being fed into the pocket 36–0, the circuit is through the magnet 626–0 thereby actuating chute blade 612–0 and feeding the checks into the pocket 36–0. When the pocket 36–0 is filled to capacity, the 36–0 pocket contacts 768–0, shown in FIG. 25f, are operated, completing a circuit from the line 780 through the contacts 768–0, through the normal contacts R81–2 and the coil of a relay R62 to the lines 782. The relay R62 is energized transferring its contacts. A relay R59, shown in FIG. 25d is energized as the leading edge of check reaches the card lever 608 operating the contacts 610, FIG. 25n, and generating a signal to fire a thyratron TH12, as described hereinafter in the transistor logic description, to energize the relay R59 in FIG. 25d. When R59 is energized, its contacts R59–1 open deenergizing R59 and extinguishing TH12. However, the hold coil of relay R59 is shorted on itself through a diode D5 which extends the dropout time sufficiently for the purposes required. Contacts R59–3, in FIG. 25f, complete a circuit from the line 780 through the contacts R59–3, through the transferred contacts R62–2 and the normally closed contacts R65–1 through the coils of a latch pick relay R68 to the line 782. The relay R68 is of the type which latches in the actuated position and may be unlatched only by first deenergizing the pick coil and then by energizing a trip coil. The select circuit in FIG. 25g is now from the line 780 through the transferred contacts R68–4 through the normal contacts R81–12 to the select magnet 626–1 thereby causing the checks to be fed into the pocket 36–1. An "o" pocket light 826, shown in FIG. 25g, is turned ON to indicate that the pocket 36–0 is filled. The circuit extends from the line 780 through the transferred contacts R68–2, through the transferred contacts R62–3 and the "o" pocket light 826 to the line 782. This is a visual indication to the machine operator not only that the pocket 36–0 is full, but that it was filled prior to the filling of the pocket 36–1, in the event both become full and the machine shuts OFF as will now be described. If the checks are left in the pocket 36–0 and the pocket 36–1 becomes filled, the "1" pocket contacts 768–1, shown in FIG. 25f, will be closed and a circuit completed from the line 780 through the contacts 768–1, through the normal contact R81–3 and the coil of the relay R65 to the line 782. A parallel circuit is complete from line 780, through contacts 768–1, R81–3 normally closed, R62–1 now closed, and the coil of a Pocket Stop relay R66. The contacts R66–4, in FIG. 25c, open breaking the hold circuit to relay R2, contacts R2–6, FIG. 25b, open breaking the hold circuit to relay R1. With relays R1 and R2 deenergized the machine is brought to a halt as described hereinbefore. The operator must then empty the pocket 36–0 since it was filled first and its indication Light is ON. At this time the contacts 768–0, in FIG. 25f, open dropping out relay R62. The contacts R72–2 return to normal and a circuit is then complete from the line 780, in FIG. 25f, through the contacts R66–3, through the normal contacts R62–2, through the transferred contacts R65–2, the latched contacts R68–1 and the latch trip coil of relays R68 to the line 782 whereby the latch relay R68 is unlatched and its contacts return to normal. The "1" Pocket Light 828, in FIG. 25g, is turned ON through a circuit from the line 780, through the normal contacts R68–2, the transferred contacts R65–3 and the light 828 to the line 782. The machine may now be started by depressing the Start Button 798 and cards will be fed in the pocket 36–0. If the operator had emptied the pocket 36–0 before the pocket 36–1, became filled, the contacts R62–1, FIG. 25f, would open, the Pocket Stop relay R66 would not have been energized and the machine would have continued to run as long as the operator kept one of the pockets 36–0 or 36–1 emptied.

Referring to FIG. 25f, the contacts 764, operated by any one of the remaining pockets becoming filled, is shown in a circuit which will energize the relay R66 and stop the machine as described hereinbefore. The common line 823, shown in FIG. 25g, is connected through a series of relay contacts to the line 782. The first circuit is through normally closed contacts R41–4, the normally closed contacts R54–6, the normally closed contacts R61–4 and R59–6 to the line 782. The operation of any of these contacts, prior to the actual feeding of a check into a selected chute blade will suppress the SORT operation. For example, one of the magnets 626–0 through 626–9 may have been selected; however, in the transistor logic section of the Wiring Diagram, FIG. 25p, a comparison may have indicated that the particular check meets the requirements for Multiple Column Selection in which event a pulse is fed to the thyratron TH-MCS thereby energizing the relay R41 and transferring the contacts R41–4. The circuit from the selected magnets 626 then ends at the now open contact R41–4 and the circuit is from the line 780, through the Multiple Column Select magnet 626–MCS, through the now closed contacts R41–4, The contacts R54–6, R61–4 and R59–6 to the line 782.

If it is desired to suppress sorting, a jumper 830 is inserted in the Sort Suppress hubs in FIG. 25f, completing a circuit from the line 780 through the contacts R81–1 and through the Sort Suppress magnet R78 to the line 782. The contacts R78–4, in FIG. 25g, then close, and at the time the check reaches the card lever 608 and operates the contacts 610, the relay R59 is operated, completing a circuit from the line 780 through a line 832, through the magnet 626–SS, through the closed contacts R78–4, the normal contacts R41–4, the contacts R54–6, R61–4 and R59–6 to the line 782.

Referring to FIG. 25l, ten hubs 831 comprising a conditioning input to ten relay drivers RD0 through RD9, are normally connected by jumpers 832 to grounded hubs 833. For suppressing a particular digit, for example digit five, one end of the jumper 832, corresponding to relay driver RD5, is transferred from the hub 833 to a hub 834, also shown in FIG. 25f, which is connected through contacts R78–3 to the −48 volt line 782. Connecting the hub 831 to the −48 volt line 782 inhibits the actuation of RD5 when a signal arrives on the second input line to RD5. Similarly other digits may be suppressed. The details of the Sort Suppress operation are shown in the transistor logic portion of the circuit, FIG. 25l, and will be described hereinafter. It will suffice to say that the gate 624–SS for the chute blade 612–SS remains raised during the Sort Suppress operation and, if the selection of a particular digit is suppressed, all checks having the suppressed digit in the SORT column pass the pocket into which they normally would be deposited and are fed into the Sort Suppress pocket 36–SS.

Referring to FIG. 25d, a Sort Compare relay R54 is shown which is controlled by a signal from the transistor logic, FIG. 25r, indicating an error may have occurred due to more than one magnet 626 being energized. This is described in the transistor logic hereinafter. When the leading edge of a check reaches the card lever 608, the contacts R59–2 operate, opening the circuit through the relay R54 deenergizing R54 and extinguishing the thyratron TH15. Similarly, a Reject magnet R61 is energized by signals from the transistor, FIG. 25r, described hereinafter and is dropped out when contacts R59–4 open, also extinguishing the thyratron TH14. A hold circuit is provided for R54, in FIG. 25e, through a Restore Key 835 and contacts R54–0 and the hold coil of relay R54 to the line 782. Drop out of R61 is delayed by shorting the hold coil in the same manner as with relay R59, hereinbefore described. In the event the Sort Compare relay R54 or the Reject relay R61 is energized, the contacts R54–6 or R61–4, in FIG. 25g, are opened, breaking the circuit for the select magnets and the check is fed to the thirteenth pocket 36-REJECT.

*Immediate Stop*

If it is desired for any reason to stop the machine immediately, the Immediate Stop key 800, in FIG. 25a, may be manually operated to drop out relays R1 and R2 and stop the machine.

If a Sort Compare error or a jam has stopped the machine, it is desired that the operator be conscious of the error and to take appropriate action before starting the machine. The JAM light 813, in FIG. 25e, is on when R69 drops out and stops the machine. To start the machine, the operator must depress a Restore Key 835, shown in FIG. 25e, to break the hold circuit to the Sort Compare magnet R54 and to energize relay R69.

*Feed Call*

A "Feed Call" light 836 is shown, in FIG. 25h, which is turned ON at any time the buffer 868 (870) FIG. 27a signals with a Feed Call signal that it is ready to accept information from the next check. The Feed Call signal comes into the transistor circuit, FIG. 25r, on a line 837, actuating a relay driver RD19 and a thyratron TH19 and produces a Feed Call signal on a line 971, through the normally closed contacts R154–2 and the coil of a Feed Call relay R35, in FIG. 25h, to the line 782.

Contacts R35–1, in FIG. 25h, close, completing a circuit from the line 780, through the contacts R35–1 and the Feed Call light 836 to the line 782. A parallel circuit from the contacts R35–1 is completed through contacts R17–5, R7–1 and the pick coil of a relay R38. Another parallel circuit is then completed from the contacts R35–1, through contacts R38–4 and the pick coil of a Feed Call Interlock relay R154. A hold circuit for R154 is provided through contacts R42–4 and R154–1. Contacts R38–1, in FIG. 25c, provide a hold circuit for R38 from the line 780, through contacts R90–1 and R38–1 and the hold coil of relay R38 to the line 782.

Contacts R38–2, in FIG. 25f, close completing a circuit from the line 780, through contacts R38–2, now closed, and the pick coil of a relay R153 to the line 782. Contacts R153–1 close, providing a hold circuit from line 780, through contacts R31–1 and R153–1 and the hold coil of R153 to the line 782. Contacts R153–2 transfer, dropping out the clamp magnet 422C and energizing the release magnet 422R, to release a check from the Delay station 20. The check at the Delay station is advanced and the card levers 414 and 446 return to normal. When the check leaves card lever 446, the contacts 447 open, dropping out relay R33 and complete a circuit from line 780, in FIG. 25e, through contacts R1–4, R17–4, R26–2 (or R24–3), R33–1 and R38–3 through the pick coil of R90 to the line 782. As described hereinbefore, contacts R90–8, in FIG. 25d, transfer engaging the Check Separator drive clutch 52 and deenergizing the brake 54, whereby another check is fed to the Delay Station where it is clamped when card lever contacts 447 energize R33 which opens its contacts R33–3, in FIG. 25c, to energize R31 and drop the hold circuit to R153.

Feed Clear

In a POST or LIST operation, the operator may have placed the wrong group of checks in the hopper and started the machine. The operator will remove the checks from the hopper and then must feed the checks in the transport system to the pocket 36-REJECT. Having removed the checks from the hopper, the contacts 259, in FIG. 25e, are open and the relay R19 is deenergized. The operator depresses the START key 798, in FIG. 25a, to start the machine.

When the last check passes photocell PC2 at the first Separator Station, the relay R26 is energized. When the last check passes the card lever 809 in the Separator Station, the relay R24 is energized and relay R45 is energized by a circuit from the line 780, in FIG. 25d, through contacts R24–4 and R26–3 and the relay R45 to the line 782. Either a LIST or POST operation is in progress, and either the contacts R77–2 or R74–2, in FIG. 25a, are closed. A circuit is completed to the Feed Clear relay R13, in FIG. 25a, as follows: From the line 780, through contacts R155–1, R17–2, START contacts 798, contacts R19–2, R45–1, R77–2 (or R74–2) and the pick coil of R13 to the line 782.

Contacts R13–1, in FIG. 25a, close to provide a hold circuit through the hold coil of relay R13. Contacts R13–2 are open to prevent use of the END OF FILE key 840 before the FEED CLEAR operation has been completed. Contacts R13–3, FIG. 25e, close to bypass contacts R90–7 and R27–2 to hold relay R90 for a high speed feed out of the remaining checks. Contacts R13–4, FIG. 25f, complete a circuit to hold the relay R153 energized during the high speed feed out of checks in the FEED CLEAR operation. Contacts R13–5, FIG. 25d, complete a circuit through the pick coil of a NON-READ relay R55. Contacts R55–1, FIG. 25d, provide a hold circuit for relay R55. Contacts R55–3, FIG. 25h, prevent the energizing of relay R30 which would terminate the RESET 1 signal and permit reading of data. RESET 1 is described in detail hereinafter. Contacts R30–2, FIG. 25h, complete a circuit through the coil of a conventional item counter which counts the number of checks passing the card lever 576. Contacts R13–6, FIG. 25c, provide a hold circuit to relay R2 during the FEED CLEAR operation when R19–1 is open.

Final Document

A FINAL DOCUMENT relay R51 is energized to indicate that the last document of a group of documents has been read. Referring to FIG. 25d, the pick circuit for R51 includes contacts R24–4, R26–3, R31–2, R19–6 and R42–2. The relay R42–2 is energized at the end of each document in the manner described hereinafter, however, the relay R51 must be energized only for the last document. When the last check is exhausted from the hopper, the contacts 259 open and R19 drops out closing the contacts R19–6. When the last check passes photocell PC2, the relay R26 is energized closing contacts R26–3. When the last check passes the card lever contacts 809, the relay R24 is energized closing the contacts R24–4. When the last check actuates contacts 420 at the Delay station relay R31 picks up, opening its contacts R31–2; however, when the check actuates contacts 447, also in the Delay station, the relay R33 is energized, dropping out relay R31. Since this is the last check, relay R31 will not be energized again and the contacts R31–2 remain closed. When the END OF DOCUMENT relays R37 and R42 are energized at the end of the last check, as described hereinafter, the circuit is completed through the contacts R42–2 and the coil of relay R51 to the line 782. A hold circuit is provided from the line 780, through contacts R8–7 and R51–1 and the hold coil of relay R51 to the line 782. This circuit holds until relay R8 is energized during the next START operation. Contacts R51–2, FIG. 25a, open the hold circuits to R8, R13 and R14 at the end of the last document. Contacts R51–5, FIG. 25c, open to drop out relay R2 and stop the machine. Contacts R51–3, FIG. 25g, in an Alternate Pocket Select operation energize the latch trip relay R68–LT to unlatch R68.

End of Document

The END OF DOCUMENT signal referred to as energizing relay R37 is generated in the transistor logic by a check leaving the card lever 579, FIG. 25n, and, is fed through a line 991 to actuate a relay driver RD13 and a thyratron TH13, FIGS. 25o and 25d to generate the END OF DOCUMENT signal on a line 838. The signal on the line 838 is fed through contacts R42–1, in FIG. 25d, and through the coil of an END OF DOCUMENT relay R37 to the line 782.

Contacts R37–2, FIG. 25c, transfer completing a circuit through a second END OF DOCUMENT relay R42. Contacts R42–2, FIG. 25d, close completing the circuit for energizing the FINAL DOCUMENT relay R51, as described hereinbefore. Contacts R42–1, FIG. 25d, open and deenergize relay R37. Contacts R42–4, FIG. 25h, open the hold circuit for the FEED CALL INTERLOCK relay R154. The END OF DOCUMENT signal is generated at the end of each document by card lever 579, as described, and functions to drop out R154 and as a result thereof, to drop out R35 and R38.

End of File

The conditions for END OF FILE operation are:
(1) Either a LIST or POST operation is in progress.
(2) The hopper has run empty and the machine has stopped.
(3) All checks in the check group have been run through the machine except those remaining in the transport system.
(4) The remaining checks must be processed in the normal manner, wherein checks are delayed at the Delay station, read by the read heads, etc.

Under the foregoing conditions, the operator depresses the END OF FILE key 840, in FIG. 25a. Either a LIST operation or a POST operation and a circuit is completed, in FIG. 25a, from the line 780, through the contacts R155–1, R17–2, R74–3 (or R77–3), R13–2, in parallel through contacts 840a, diode D2 and the coil of R8 to the line 782, and through contacts 840b and the coil of an END OF FILE relay R14 to the line 782. The contacts of relay R8 start the machine, as described hereinbefore, and establish a hold circuit for R8 through contacts R8–1. R8 then drops out as described hereinbefore. Contacts R14–1 provide a hold circuit for R14. R14 hold circuit is dropped out when the FINAL DOCUMENT relay R51 is energized and the contacts R51–2, FIG. 25a, open, as described hereinbefore.

Contacts R14–3, FIG. 25a, close, turning on an END OF FILE light 841a. Contacts R14–4, FIG. 2g, close and complete a circuit through the HOPPER DISABLE relay R22. This occurs when the last check is fed from the hopper and the relay R19 is deenergized. A hold circuit is provided for R22 through normally closed contacts R51–3 and contacts R22–1, FIG. 25g, until the FINAL DOCUMENT relay R51 is energized. Contacts R14–5, FIG. 25c, complete a hold circuit for STOP relay R2, bypassing contacts R19–1 which are open due to the hopper being empty. Contacts R14–5 also bypass the series contacts R74–1 and R77–1, one of which is transferred since either a LIST or a POST operation is in progress. The hold circuit through contacts R14–5 is dropped out when R51 is energized and opens its contacts R51–2 in FIG. 25a.

It will be noted that, in the END OF FILE operation, as contrasted to the FEED CLEAR operation, the NON-READ relay R55 is not energized and the data on the checks is read.

Sort Compare

When an error occurs because none of the select magnets 626 is energized, in a SORT operation, or because more than one magnet is energized, it is desired to reject the check for further manual handling and to suppress reading of data. A SORT COMPARE signal is generated in the transistor logic, as described hereinafter, in the transistor logic to actuate a thyratron TH15, in FIG. 25r, also shown in FIG. 25d. The output of TH15 is fed through a line 841 and normally closed contacts R59–2 and the pick coil of a SORT COMPARE relay R54 to the line 782. Contacts R54–1, FIG. 25e, complete a hold circuit through an R54 hold coil. Contacts R54–3, FIG. 25d, turn ON a SORT COMPARE light 842. Contacts 54–4 complete a circuit to energize the NON-READ relay R55 which then performs the NON-READ functions described hereinbefore in the FEED CLEAR operation. Contacts R54–2, FIG. 25c, open the hold circuit to R2 thereby stopping the machine. Contacts R54–6, FIG. 25g, open the select magnet circuit so the checks are fed to the pocket 36–REJECT. Contacts R54–5, in FIG. 25b, prevent the READY light 803 from going ON until the RESTORE key 335 has been activated to energize R69. The light 803 indicates that the machine may be re-started by depressing the START key 798 in FIG. 25a.

Referring to FIG. 25c, in a LIST or a POST operation, when the Pocket Stop contacts R66–4, the SORT COMPARE contacts R54–2 or the STOP 3 contacts R3–3 are open breaking the normal hold circuit to relay R2, a Permissive Stop condition is created in which the machine cycle is completed to process the check being transported. At this time, a hold circuit is provided in one of the following ways.

(1) From the line 780, through contacts R90–1 transferred, R77–1 transferred, R51–5, R1–3, R2–1 and relay R2 to the line 782.

(2) From the line 780, through contacts R90–1 transferred, R74–1 transferred, R77–1 normally closed, R51–5, R1–3, R2–1 and relay R2 to the line 782.

When the leading edge of a check reaches the card lever 608, the contacts 610, FIG. 25n, operate, in a manner described hereinafter, to generate a signal from a thyratron TH12 to a line 843, and through contacts R59–1, FIG. 25d, and the pick coil of the relay R59, to the line 782. Contacts R59–1 open the circuit to R59, but the R59 hold coil is shorted through a diode D5 and extends the dropout time. Contacts R59–2 open the circuit to R54 and extinguish thyratron TH15. Contacts R59–6, FIG. 25g, open the select magnet circuit to permit the selected chute blade gate 624 to drop when the check has reached a predetermined point.

Reject

It may be desirable, for a number of reasons to feed a check to the pocket 36–REJECT. Usually this is due to an error in reading or storing data in the circuit of the machine or in the buffer 868 (870) described hereinafter. When it is desired to reject a check, a REJECT signal is generated in the circuit. FIG. 25m, as described hereinafter, which actuates a thyratron TH14, shown in FIGS. 25d and 25r, to emit a signal on a line 844 which is fed through contacts R59–4 and the pick coil of a REJECT relay R61, FIG. 25d, to the line 782. Contacts R61–4, FIG. 25g, open the select magnet circuit and cause the check to feed into the pocket 36–REJECT.

General Logic Description

Referring to FIG. 27a, a block diagram of the machine, primarily the transistor logic for handling data read from a check, is illustrated.

The input is from the read heads 494, which are further designated 494–0 and 494–1 respectively according to the "0" or "1" track which is read thereby, to the amplifier 499. The amplifiers 490 generate signals at levels to which the rest of the circuitry can respond. In this embodiment, there are 0 to −5 volt signals. The two individual tracks are amplified independently and are fed to a skew gate-signal generator 850 which is adapted to permit a skewed check to be properly read. In the skew gate-signal generator 850 a test is made to identify decimal characters recorded in a 1, 2, 4, 8 code. Each character is preceded by a mark in both the "0" track and the "1" track which is designated a coincidence mark. Since the check, a portion of which is shown in FIG. 10, is read face down and right-hand edge first, as viewed in FIG. 10, the right-hand character is read first. In FIG. 10 this character is the digit "1" and is preceded by a coincidence or a zero and one mark designated (0·1), as is each character. The skew gate 850 is designed primarily to sense these coincidence marks at the beginning of each character and to separate them from the succeeding four pulses which identify the particular character.

The "1" or code track on the check identifies the character in a 1, 2, 4, 8 code. The "0" or checking track contains the complement of the code. The presence of a code mark is designated as 1, 2, 4 or 8 according to its spacing following the coincidence mark, whereas the absence of the corresponding code mark is designated not 1 ($\bar{1}$), not 2 ($\bar{2}$), not 4 ($\bar{4}$) or not 8($\bar{8}$).

The code for the digits zero through nine is as follows:

|   | "1" track | "0" track |
|---|---|---|
| 0 | $\bar{1}$ $\bar{2}$ $\bar{4}$ $\bar{8}$ | 1 2 4 8 |
| 1 | 1 $\bar{2}$ $\bar{4}$ $\bar{8}$ | $\bar{1}$ 2 4 8 |
| 2 | $\bar{1}$ 2 $\bar{4}$ $\bar{8}$ | 1 $\bar{2}$ 4 8 |
| 3 | 1 2 $\bar{4}$ $\bar{8}$ | $\bar{1}$ $\bar{2}$ 4 8 |
| 4 | $\bar{1}$ $\bar{2}$ 4 $\bar{8}$ | 1 2 $\bar{4}$ 8 |
| 5 | 1 $\bar{2}$ 4 $\bar{8}$ | $\bar{1}$ 2 $\bar{4}$ 8 |
| 6 | $\bar{1}$ 2 4 $\bar{8}$ | 1 $\bar{2}$ $\bar{4}$ 8 |
| 7 | 1 2 4 $\bar{8}$ | $\bar{1}$ $\bar{2}$ $\bar{4}$ 8 |
| 8 | $\bar{1}$ $\bar{2}$ $\bar{4}$ 8 | 1 2 4 $\bar{8}$ |
| 9 | 1 $\bar{2}$ $\bar{4}$ 8 | $\bar{1}$ 2 4 $\bar{8}$ |

In the skew gate 850, the individual signals are generated based on the presence or absence of the code marks on the check.

The output signals from the skew gate 850 emerge on lines as follows: line 852 representing zero and not one (0·$\bar{1}$); 854 representing one and not zero (1·$\bar{0}$); 856 representing zero and one (0·1); and on line 858 representing zero and not one or one and not zero (0·$\bar{1}$+1·$\bar{0}$) or (0+1). The preceding symbols, e.g. 0·$\bar{1}$, are used hereinafter as just defined.

The sensed information is fed to a Sort Register 859 for use in sorting the check to a desired pocket 36. The signals 0·$\bar{1}$; 0·$\bar{1}$+1·$\bar{0}$; 0·1; and 1·$\bar{0}$ are fed through respective lines 860, 862, 864 and 866 to a buffer for use in another machine. A buffer 868 is used in conjunction with the Posting operation in the "IBM" PROCESSING MACHINE, Type 650 whereas a buffer 870 is used in conjunction with the Listing operation in the "IBM" NUMERICAL ACCOUNTING MACHINE, Type 419.

The 0·1 signals and the 0+1 signals are fed through respective lines 872 and 874 to a Bit Count unit 876 and an Error Detect unit 877.

The 0·1 output of the Bit Count unit 876 is fed through a line 878 to a Character Register unit 879. One output from the unit 879 is through a line 880 to the Error Detect unit 877; another output is through a line 881 to gate information from the lines 852, 854 and 858 into the Sort Register 859. Five "word" lines 882-1 (Word 1), 882-2 (Word 2), 882-3 (Word 3), 882-4 (Word 4), and 882-5 (Word 5) feed information to the buffer 868 (870) as do ten digit lines 887-1 through 887-10 and a Column 1 line 888. Error signals are fed from the buffer 868 (870) to the Error Detect unit 877 through a line 889.

Readout lines 890-1, 890-$\bar{1}$, 890-2, 890-$\bar{2}$, 890-4, 890-$\bar{4}$, 890-8 and 890-$\bar{8}$ and lines 892-1, 892-$\bar{1}$, 892-2, 892-$\bar{2}$, 892-4, 892-$\bar{4}$, 892-8, 892-$\bar{8}$ connect the Sort Register 859 with a Decode matrix 893. An Invalid Character line 894 connects the Decode Matrix with the Error Detect unit 877. Lines 895-0, 895-1, 895-2, 895-3, 895-4, 895-5, 895-6, 895-7, 895-8, 895-9, connect the Decode Matrix with the select magnets 626-0 through 626-9.

Other connections between various units of the machine are described in the detailed description hereinafter.

The Bit Count unit 876 operates to detect errors due, for example, to the loss of a character bit and also, through the line 878, to advance the Character Register 879, one use of which is to gate a selected character into the Sort Register 859 and another use is to feed information by "word" and "digit" to the buffer 868 (870). As described hereinbefore, thirty-seven characters are printed in the usual check and comprise generally four words of ten characters each. Since the fourth word would comprise only seven characters and a core buffer unit in the buffer 868 (870) requires forty characters, means are provided for generating three additional characters.

The Decode Matrix 893 receives the coded data through the eight lines 890 and receives checking data through the eight lines 892. The matrix 893 translates the code to actuate one of the select magnets 626-0 through 626-9 and also to feed a signal to the Error Detect unit 877 through the line 894 when an invalid character stands in the Sort Register 859.

A feature of the code is that each character is preceded by a coincidence mark (0·1). The buffer 868 (870) uses the coincidence mark to generate a signal indicating that a character has been received; therefore, the first coincidence mark would create a false signal. For purposes which will become clear hereinafter, the first coincidence mark (0·1) creates a special identity for Column 1 which is designated Col. 1 and has been described as line 888, in FIG. 27a. The machine utilizes the Column 1 signal to designate that the first character is about to be read, whereas the buffer 868 (870) utilizes the second coincidence mark, the output of which is reflected in the digit hubs DH1. Therefore, it is necessary, in selecting a character for sorting, to designate it by a count which is one less than the actual character position. For example, if the character number 27 is desired Word 3, Digit 7 (W3, D7) it is called for in the plug wiring as Word 3, Digit 6 (W3, D6).

*Circuit Description*

Figure 25J:
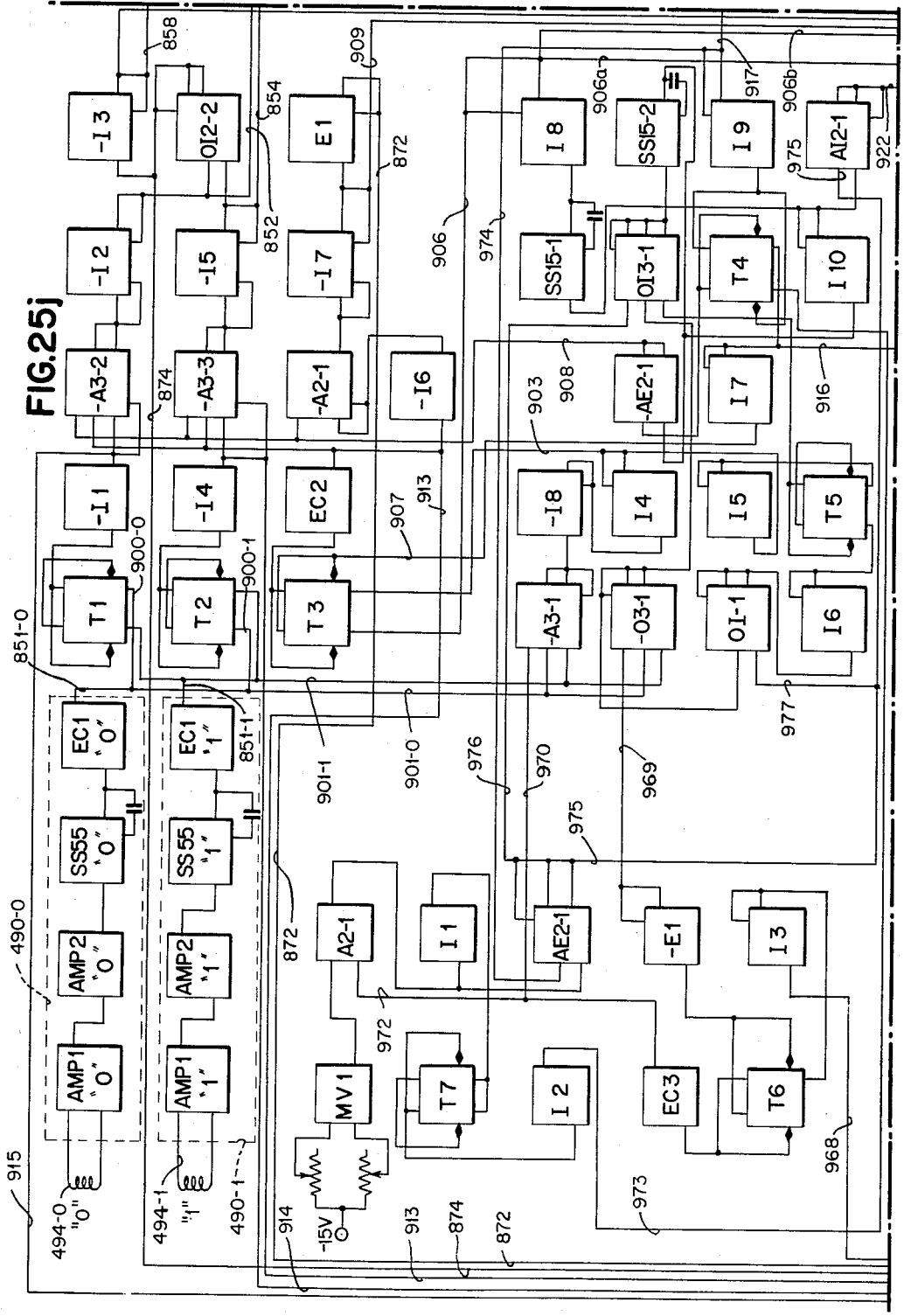

Referring to FIG. 25j, the input to the transistor logic section of wiring diagram is through the read heads 494-0 and 494-1 from the respective "zero" and "one" tracks of the check. The input, for example from the head 494-"0," is through an amplifier unit 490-"0" comprising two stages of amplification, amplifiers Amp. 1-"0" and Amp. 2-"0," a single shot multivibrator SS55-"0" adapted to emit a pulse of 55 microsecond duration into a complementary emitter follower EC1-"0," producing a negative output on the line 850-0. A similar amplifier 490-1 is provided to amplify the output from a read head 494-"1" producing a negative signal on the line 851-1.

The signal from the line 851-0 is fed to a line 900-0 and to a line 901-0. The output from the line 851-1 is fed to a line 900-1 and a line 901-1. The line 900-0 is the input to a trigger T1 which is turned ON each time a code bit is read in the "zero" track. Similarly, the output from the line 900-1 is the input to a trigger T2 which is turned ON each time a code bit is read in the "one" track. The input to the trigger T1 is fed to the opposite side of the trigger T2 and the input to the trigger T2 is fed to the opposite side of the trigger T1 whereby one trigger being turned ON turns the other trigger OFF if it is ON. This is necessary since the code bits in the "zero" track are complementary to the code bits in the "one" track and, when a bit is present in the "one" track, it should not be present in the "zero" track. This system of cross-coupling eliminates the need for resetting the triggers T1 and T2 after each code bit is read.

The lines 901-0 and 901-1 feed into a three-input negative AND circuit —A3-1 which is the input to a coincidence circuit comprising —A3-1, and inverter —I8 and an inverter I4. The output of this coincidence circuit is a negative pulse which is fed through a line 903 to the right-hand side of a coincidence trigger T3, thereby turning the trigger T3 ON. An output to the line 903 is achieved only when a coincidence mark, comprising both a "zero" and "one" code bit, is detected on the check, thereby assuring that trigger T3 turns ON only when a coincidence mark is read.

The end or positive going portion of the negative signal from the coincidence circuit is fed to an inverter I5; the output of which is fed to the right-hand side of a Sample Control trigger T5, turning the trigger T5 ON. The output of the trigger T5 is fed to a Sample Pulse unit comprising an OR-INVERTER OI3-1 and a single shot multivibrator SS15-2 which emits a fifteen microsecond negative output to a negative AND-Emitter Follower unit —AE2-1. The unit —AE2-1 is controlled, in a manner described hereinafter, to emit a signal only when a coincidence mark is read.

At times other than coincidence time, for example in the reading of a bit in the "one" track or in the "zero" track only, a Sample pulse is created on a line 908 by a negative OR unit —O3-1, which emits a negative pulse to the unit OI3-1, each time a negative signal is received on one of the lines 901-0 or 901-1 but not the other, thereby actuating the single shot SS15-2 and emitting the previously described negative signal to the unit —AE2-1. In other words, the Sample pulse is created for each bit of information on the check as well as for the coincidence mark.

The output from the single shot SS15-2 to the unit —AE2-1 also is fed to an inverter I10, the output of which is fed to an AND-INVERTER unit AI2-1 and also to a single shot multivibrator SS15–1. The fifteen microsecond output of SS15–1 is inverted by an inverter I8 which emits a Delay Sample pulse on a line 906 which is fed to the left side of the coincidence trigger T3 thereby turning T3 OFF. The Delay Sample signal also is fed through a line 906a to AE2–3, in FIG. 25m, and through a line 906b and a complementary emitter follower EC21 to a Delay Sample line 906c in FIG. 25o which leads into the buffer 868 (870).

When trigger T3 is turned OFF, the OFF output goes positive emitting a signal through a line 907 to an inverter I7 the output of which is fed to the ON input of a trigger T4 which is designated the UNBLANK trigger. The output signal from I7 turns trigger T4 ON. The output of T4, when ON, is ANDed with the output of SS15–2 to produce the SAMPLE pulse on line 908. Thus, T4 serves to exclude extraneous signals due to noise when code bits are not being read. The trigger T4 remains ON until the End of Document mark is sensed and is then turned OFF in a manner described hereinafter. The sample pulse on line 908 is fed to negative AND units —A3–2, and —A2–1 which are part of the output circuitry of the triggers T1, T2, and T3.

When trigger T1 is ON, the output of the succeeding inverter —I1 is negative, feeding into the unit —AE3–2. Similarly, the output of —I4 is negative when trigger T2 is ON and is fed into the unit —A3–3. The negative signals from —I1 and —I4 are ANDed with the Sample pulse on the line 908 to produce an output from the respective units —A3–2 or —A3–3. However, when a coincidence signal is read and T3 is turned ON, the output of the complementary emitter follower EC2, actuated by trigger T3 is positive and is fed to the units —A3–2 and —A3–3 thereby inhibiting those units during coincidence. The output of EC2 also is fed to a line 913 for purposes described hereinafter. When the trigger T3 is turned OFF by the Delay Sample pulse on line 906, the output of T3 is negative, producing a negative output from EC2 thereby actuating the inverter —I6 which is ANDed with the Sample pulse on the line 908, producing an output from the negative AND unit —A2–1. The negative output of —A2–1 is inverted by inverter —I7 and is fed into an emitter follower E1 which produces a positive 0·1 pulse on the line 872 to be used in a manner described hereinafter. The output of —I7 also is fed through a line 909 to a complementary emitter follower EC25, in FIG. 25o, the output of which is a positive signal on the 0·1 line 864 to the buffer 868 (870).

Following the sensing of the coincidence mark, either the line 901–1 or the line 901–0 will receive a negative pulse, and as described hereinbefore, this single input to the unit —O3–1 produces a negative output to the OR-INVERTER OI3–1 thereby creating the negative signal to the unit —AE2–1 which is ANDed with the negative condition of the trigger T4, effected by turning the latter trigger ON when coincidence trigger T3 went OFF, and permitting the Sample pulse on line 908. Therefore, each time a code bit is read, the unit —AE2–1 emits a Sample pulse on the line 908 thereby reading out the condition of the triggers T1 and T2 and producing a positive output from the inverter —I2 or —I5 corresponding to one of the triggers T1 and T2 whichever is ON. The output from the inverter —I2, when trigger T1 is ON, is a positive 0·$\overline{1}$ signal on the line 852. The output of the unit —I5, when trigger T2 is ON, is a positive 1·$\overline{0}$ signal on the line 854. The outputs on the inverters —I2 and —I5 are fed to an OR-INVERTER unit OI2–2 the output of which is the line 874 which is pulsed each time a "0" bit or a "1" bit is read. The signal on the line 874 is designated 0 and $\overline{1}$ and $\overline{0}(0\cdot\overline{1}+1\cdot\overline{0})$. This is a negative signal.

*Bit Count Register*

Referring to FIG. 25m, the Bit Count Register 876 is shown comprising triggers T16, T17, T18, T19 and T20 corresponding respectively to the coincidence bit, the "1" bit, the "2" bit, the "4" bit and the "8" bit of a character. The coincidence trigger T16 is turned ON through a line 916, by the output of the inverter 17, in FIG. 25j, which also turns ON the UNBLANK trigger T4 when the coincidence trigger T3 turns OFF. Trigger T16, being ON, conditions trigger T17, the "1" bit indicator so that it may be turned ON by a negative pulse on the line 874 which, as described hereinbefore, carries a negative 0+1 signal as the output of the emitter follower E1, in FIG. 25j, which is operated for each character bit after the coincidence bit. During coincidence, while the trigger T3 is ON, the output of the complementary emitter follower EC2 is positive, thereby blocking the negative AND units —A3–2 and —A3–3. At the time each character bit, following the coincidence bit, is read, the output of the complementary emitter follower EC2 is negative thereby gating signals through either —A3–2 or —A3–3 according to the reading of a bit in the zero or one track of a check. The first 0+1 signal on the line 874 turns T16 OFF when it turns T17 ON. Trigger T17, in the ON state, conditions T18; T18 in the ON state conditions T19; and T19 in the ON state conditions T20. The BIT COUNT register is advanced by each 0+1 pulse on the line 874. The ON or OFF state of triggers T17 through T20 are reflected in corresponding inverters —I10 through —I13. When one of the triggers T17, T18, T19 or T20 is ON, this condition is reflected as a positive potential impressed on a corresponding line 955–1, 955–2, 955–4 or 955–8. The signals on the latter lines are utilized as described hereinafter in the Multiple Column Select (MCS) description.

When the UNBLANK trigger T4 turns ON by turning T3 OFF, the positive potential applied to the input of inverter I9 causes I9 to emit a negative signal on a line 917 is applied through a line 918, in FIG. 25q, to the Column 1 trigger T30, turning T30 ON. The negative signal also is applied through a line 919, in FIG. 25q, to the Word 1 (W1) trigger T41, turning T41 ON. Trigger T30 turning ON, emits a positive signal to a complementary emitter follower EC4, the positive output of which is fed through a line 920 to an OR circuit O2–16. The output of O2–16 conditions a trigger T31 whereby a negative input thereto turns T31 ON. T31 is the first of ten triggers T31 through T40 comprising a Digit Register which is part of the Character Register 879. Each trigger T31 through T40 is coupled to the next succeeding trigger whereby any ON trigger conditions the following trigger to be turned ON by a negative input on a line 924 or 925.

As described, the trigger T30 is turned ON due to sensing the first coincidence mark. Each succeeding coincidence mark must operate to turn ON a next succeeding one of the triggers T31–T40. This operation is effected by a Ring Drive signal on the 878 which is generated as follows:

Referring to FIG. 25m, a three-input AND-inverter AI3–1 is shown, the first input coming on a line 923 from a negative emitter follower —E3, in FIG. 25m, which in turn is driven by the trigger T20 in the BIT COUNT register 876 representing the "8" bit of the character code. The signal on the line 923 is positive when the trigger T20 is ON. When the trigger T20 is OFF, the signal imposed on the line 923 is negative. When positive, this signal is ANDed with the positive 0·1 signal of the line 872 associated with the coincidence trigger in FIG. 25j. These two signals also are ANDed with the OFF output of the coincidence controlled trigger T16 in the BIT COUNT register. T16 is not turned ON until T3 is turned OFF. Thus, at normal coincidence all inputs to AI3–1 are positive, and AI3–1 emits a negative signal to AI2–2. Any negative signal to either input of AI2–2 will give a positive output. Each 0·1 impuse which finds the BIT COUNT T16 OFF and T20 ON is emitted from AI2–2 on line 878. This line is fed to inverters I25 and I26, in FIG. 25q, and is the Ring Drive referred to hereinbefore. The alternate input to AI2–2 from line 922 is positive and dormant during normal check reading and does not affect the operation as long as the input line 975 to AI2–1 remains negative. The negative output of the inverter I25 is fed through the line 924 and provides the input to turn ON a trigger T36, T37, T38, T39 and T40 of the corresponding digits D6, D7, D8, D9 and D10 if the preceding trigger is ON thereby conditioning the succeeding trigger when the signal is received on the line 924. The output of the inverter I26 is fed through a line 925 to turn OFF the Column 1 trigger T30 if it is ON and to turn ON a trigger T31, T32, T33, T34 or T35 corresponding to the digits D1, D2, D3, D4 and D5, if it is conditioned by a preceding trigger being ON. Any trigger having been turned ON by a previous negative output on the line 924 or the line 925 will be turned OFF by the succeeding negative pulse.

The outputs of the OFF side of the Digit triggers T31 through T40 are reflected in negative inverters —I36 through I45 which, in turn, feed to corresponding parallel connected Digit hubs DH10 through DH10 of Words 1, 2, 3 and 4 and to hubs DH1, DH2 and DH3 of Word 5, through lines 926–1, 926–2, 926–3, 926–4, 926–5, 926–6, 926–7, 926–8, 926–9 and 926–10. The lines 926 also extend through FIG. 25r to the Digit complementary emitter followers EC5 through EC14, in FIG. 25o, and thence to the Digit terminals D1 through D10 and through the lines 887–1 through 887–10 for connection with the buffer 868 (870).

Referring to FIG. 25q, five triggers T41, T42, T43, T44 and T45 comprise the Word Registers for words W1, W2, W3, W4 and W5 respectively. Trigger T41 is turned ON, as described hereinbefore, by the output signal from I9, in FIG. 25j, to the line 917. T41 conditions T42 to turn ON when a negative signal is received on a line 927. T42, when ON conditions T43; T43 when ON, conditions T44, and T44, when ON conditions T45. The signal on the line 927 turns ON a conditioned trigger T42, T43, T44 or T45 and turns OFF the conditioning trigger T41, T42, T43, T44 or T45. The signal on the line 927 is derived each time the digit 10 trigger T40 goes OFF, a negative signal is impressed on a line 928 and inverted at —I46 and again at I27 and is impressed as a negative signal on the line 927 to advance the Word Register.

The outputs of the Word Register triggers T41, T42, T43, T44 and T45 are reflected in respective negative inverters —I48, —I49, —I50, —I51 and —I52 which are connected to lines generally designated 929 which lead to respective Word hubs WH1, WH2, WH3, WH4 and WH5, in FIG. 25q, and also across FIG. 25r, through the complementary emitter followers EC16, EC17, EC18, EC19 and EC20 to the Word lines 882–1, 882–2, 882–3, 882–4 and 882–5, leading to the buffer 868 (870).

At digit 10 time during Words 1, 2 and 3 (which actually represent characters 11, 21 and 31 respectively due to the inhibiting of the first coincidence mark as described hereinbefore), an AND unit A2–14 is actuated as follows: When trigger T44 is OFF, the output of an inverter —I53, associated therewith, is positive and, through lines 930 and 930a effects a positive output from —AE2. The other input to —AE2, 931, is normally negative during a POST operation, as described hereinafter. The positive output of —AE is fed to the AND unit A2–14 where it is ANDed, through the Digit 10 line 926–10 and a line 926a, with the output of —I45 which is positive when trigger T40 is ON. The output of A2–14 is positive and is fed through a line 932 to the OR unit O2–16. The output of O2–16 conditions the Digit 1 trigger T31 to be turned ON by the next Ring Drive signal. Following Digit 10, each succeeding Ring Drive pulse turns ON Digit 1 until Word 4 is Turned ON. Digit 1 is then prevented from turning ON by a negative signal on lines 930 and 930a from —I53.

*Sort Register and Decode Matrix*

Referring to FIG. 25k, the Sort Register 859 and part of the Decode Matrix 893 are shown. The remainder of the Decode Matrix is shown in FIG. 25l. As described hereinbefore in the general description, the "zero" or checking track data for a selected character is stored in the Sort Register 859 comprising triggers T8, T9, T10 and T11 corresponding respectively to code bits "8," "4," "2" and "1." Similarly, a register is provided for the "one" track data comprising triggers T12, T13, T14 and T15 corresponding respectively to code bits "8," "4," "2" and "1." With a valid character in the Sort Register 859, pairs of triggers T8 and T12, T9 and T13, T10 and T14, and T11 and T15 are in opposite states, one trigger of each pair being ON and the other being OFF.

These are shifting type registers and data are fed into triggers T8 and T12 and subsequently stepped on down by the 0+1 signals on the line 858, emitted from the inverter —I3 in FIG. 25j. The positive potential 0·$\bar{1}$ signals on the line 852, in FIG. 25j, are fed to the negative emitter —E6, in FIG. 25k. A positive gating signal on the line 881 from the Character Register 879 is fed to a diode D2. D2 and —E6 together comprise an AND circuit the output of which is positive when both inputs are positive. The postive output is fed to an inverter I18 and through a line 933–1 to the ON side of trigger T12, whereby trigger T12 is turned ON. The same signal is fed to the OFF side of trigger T8 which must be OFF when trigger T12 is ON. Similarly, the positive 1·$\bar{0}$ signal on line 854 is ANDed through an emitter follower —E5 with the positive gating signal from the line 881 to a diode D1. The positive output is fed to an inverter I17 the output of which is fed through a line 933–0 to the ON side of trigger T8 and to the OFF side of trigger T12.

Subsequent signals on the lines 852 or 854, coupled with the gating signal on the line 881, operate on the triggers T8 and T12 to store data in the Sort Register. The positive 0+1 signals on the line 858, described hereinbefore, are fed to an AND-EMITTER FOLLOWER AE2–16 where they are ANDed with the gating signal on the line 881, the output being fed through an inverter I16, commonly connected to the triggers T9, T10 and T11 of the "zero" Sort Register and to triggers T13, T14 and T15 of the "one" Sort Register. Assuming trigger T8 is ON, a stepping output from the inverter I16 then turns trigger T9 ON, since T9 is conditioned by cross-coupling to the ON trigger T8. Similarly, when trigger T9 is ON it conditions trigger T10 whereby the stepping output of inverter I16 turns trigger T10 ON and, assuming that trigger T8 is not ON also, trigger T9 is turned OFF. The status of the triggers T8, T9, T10, T11, T12, T13, T14 and T15 are reflected through the lines 890–1, 890–$\bar{1}$, 890–2, 890–$\bar{2}$, 890–4, 890–$\bar{4}$, 890–8, 890–$\bar{8}$, 892–1, 892–$\bar{1}$, 892–2, 892–$\bar{2}$, 892–4, 892–$\bar{4}$, 892–8, and 892–$\bar{8}$, and negative inverters —I18, —I19, —I20, —I21, —I22, —I23, —I24 and —I25. For example when trigger T12 is ON the right-hand output is positive and the output of the corresponding inverter —I19 is negative. However, negative inverter —I18, connected to the opposite side of trigger T12, is actuated producing a positive output to an OR unit O2–9. At the time trigger T12 is ON, trigger T8 should be OFF, therefore the right-hand output trigger T8 should be negative and the output of inverter —I27 should be positive while the left-hand output of T8 should be positive and the output of inverter —I26 should be negative. Since both inputs to O2–9 are positive, the output is positive. Since both inputs to O2–8 are negative, the output is negative. The output of the unit O2–8 is fed to a line 935–8 and, when negative indicates the storage of a valid "8" bit in the "one" Sort Register. Similarly, the output of O2–9 is fed to a line designated 936–$\bar{8}$ and is positive, indicating the lack of an "8" bit in the "zero" Sort Register. The outputs of O2–10 and O2–11 feed respectively to lines 935–4 and 936–4̄ which, when respectively negative and positive, indicate a valid "4" bit in the "one" Sort Register and the lack of a "4" bit in the "zero" Sort Register. Similarly, the output lines from O2–12, O2–13, O2–14 and O2–15 are designated 935–2, 936–2̄, 935–1 and 936–1̄ respectively. The signal on the line 935–8, 935–4, 935–2 or 935–1 is negative when a valid character bit is stored in the Sort Register; at the same time the corresponding line 936–8̄, 936–4̄, 936–2̄ or 936–1̄ must be positive.

Referring to FIG. 25l, the line 935–1 feeds to an inverter —I54 the output of which is positive when a valid "1" bit is stored in the "one" Sort Register. The line 936–1̄ feeds into an inverter —I55, the output of which is negative when a "1" bit is stored in the "one" Sort Register, or conversely when a "1" bit is not stored in the "zero" Sort Register. The line 935–8 feeds into an inverter —I56, the output of which is positive when a valid "8" bit is stored in the "one" Sort Register.

Lines 936–2̄, 936–4̄ and 936–8̄ provide the three inputs to an OR-INVERTER OI3–2. These lines, as described, are the 2̄, 4̄ and 8̄ lines and their respective inputs to OI3–2 are positive when there is a "2" bit, a "4" bit or an "8" bit in the "one" Sort Register. When one or two or three inputs to OI3–2 are positive, the output is negative. When all three inputs are negative, the output is positive. Therefore the output of OI3–2 is positive when the Sort Register stores the digit "zero" or the digit "one." The output is negative when the Sort Register stores any other digit "two" through "nine." Therefore, a positive output OI3–2 designates a 2̄ and 4̄ and 8̄ condition.

The lines 935–4 and 936–2 feed into an OR-INVERTER OI2–4. The line 935–4 is negative when a "4" bit is stored in the "one" Sort Register. The line 936–2 is positive when a "2" bit is stored in the "one" Sort Register. The output of OI2–4 is negative when the "one" Sort Register contains a "2" bit and not a "4" bit; a "2" bit and a "4" bit; or neither a "2" bit nor a "4" bit. The output of OI2–4 is positive when the "one" Sort Register contains a "4" bit and not a "2" bit.

The lines 935–2 and 936–4̄ are the inputs to an OR-INVERTER OI2–5. The output of OI2–5 is negative when the "one" Sort Register stores a "2" bit and a "4" bit and not a "2" bit; or neither a "2" bit nor a "4" bit. The output of OI2–5 is positive when a "2" bit and not a "4" bit are stored in the "one" Sort Register.

The lines 935–2 and 935–4 feed into an OR-INVERTER OI2–6. The output of OI2–6 is positive when a "2" bit and a "4" bit are stored in the "one" Sort Register. The output of OI2–6 is negative when the "one" Sort Register contains a "2" bit and not a "4" bit; a "4" bit and not a "2" bit; or neither a "2" bit nor a "4" bit.

The outputs of the inverter —I54, —I55 and —I56 and the OR-INVERTERS OI3–2, OI2–4, OI2–5 and OI2–6 are combined in AND circuits, each made up of an AND circuit and a —E emitter follower. One such circuit comprising A2–3 an —E7 is designated A2–3/—E7. The other such AND circuits are similarly designated according to their basic components.

The output of OI3–2 may be described as normally negative and therefore inhibiting a short positive pulse on a line 937 from effecting a positive output from A2–3 which operates in conjunction with —E7 as a single AND circuit. The normal condition is defined as the condition where at least one of the bits "2", "4" or "8" is stored in the "one" Sort Register. With any one of the foregoing bits in the "one" Sort Register, the possibility of the character being the digit Zero is eliminated. When none of the bits "2", "4" or "8" is stored in the "one" Sort Register the character may be the digit "zero" or the digit "one" and the output of OI3–2 is positive. The positive output of A2–3 is ANDed and the 1̄, one output of emitter —E7 to produce a positive zero-indicating signal to relay driver RD–0 which actuates thyratron TH0 to impress a positive signal on the line 895–0. If the digit stored had been "one" instead of "zero", the output of —I55 would be negative and would inhibit the positive output to RD–0.

In a unit A2–4/—E8, the 2̄ and 4̄ and 8̄ output of OI3–2 is combined with the 1 output of —I54 to produce a positive one-indicating signal on the line 895–1.

In the unit A2–5/—E9, the positive output from OI2–5, when the Sort Register stores a "2" bit and not a "4" bit, is ANDed with the positive signal on the line 937 to effect a positive output from A2–5 which is ANDed with the positive not "1" signal to —E9 to produce, through RD–2 and TH2, a positive, two-indicating signal on the line 895–2.

The "2" and "4̄" output of OI2–5 is ANDed in A2–6/—E10 with the "1" output of —I54 to produce a positive three-indicating signal on the line 895–3.

In the unit A2–7/—E11, the positive output of OI2–4, when the "one" Sort Register stores a "4" bit and not a "2" bit, is ANDed with the signal on the line 937 and with the not "1" output of —I55, to produce a positive four-indicating signal on the line 895–4.

The "4" and not "2" output of OI2–4 is ANDed in the unit A2–8/—E12 with the signal on the line 937 and the "1̄" output of —I54 to produce a five-indicating signal on the line 895–5.

In the unit A2–9/—E13 the positive output of OI2–6, when the "one" Sort Register stores a "2" bit and a "4" bit, is ANDed with the signal on the line 937 and with the not "1" output of —I55, to produce a six-indicating signal on the line 895–6.

The "2" and "4" bit output of OI2–6 is ANDed in the unit A2–10/—E14 with the "1" output of —I54 to produce a seven-indicating signal on the line 895–7.

In the unit A2–11/E15, the positive output of —I56 is ANDed with the not "1" output of —I56 to produce an eight-indicating signal on the line 895–8.

The "8" output of —I56 is ANDed, in A2–12/—E16 with the "1" output of —I54 to produce a positive, nine-indicating signal on the line 895–9.

In the foregoing manner, the digit stored in the Sort Register is decoded from the 1, 2, 4, 8 code to a signal on a single line connected to a corresponding select magnet 626.

*Invalid Character Check*

It is also desirable to have an indication of when an invalid character exists in the Sort Register even though the pairs of triggers are properly complemented so the error is not detected by circuitry described hereinafter. Such an invalid character is any character totaling more than nine by combination of the bits "1", "2", "4" and "8". An OR circuit O3–3 has three inputs which are provided as follows: One input is the 2 and 4̄ output of OI2–5; the second input to O3–3 is the 2 and 4 output of OI2–6; and the third input to O3–3 is the 2̄ and 4 output of OI2–4. A positive output from OI2–4 indicates a "4" bit and not a "2" bit in the "one" Sort Register. A positive output from OI2–5 indicates a "2" bit and not a "4" bit in the "one" Sort Register. A positive output from OI2–6 indicates a "2" bit and a "4" bit in the "one" Sort Register. Any one of three foregoing conditions above or in combination with one or both of the other two conditions causes the output of O3–3 to be positive. This output comprises one of two inputs to a negative AND-INVERTER AI2–17. The second input is the output of —I56 which, when positive, indicates an "8" bit in the "one" Sort Register. The output of AI2–17 therefore, is positive except when the Sort Register contains an "8" bit in combination with a "2" bit, a "4" bit, or both a "2" bit and a "4" bit. When such an invalid combination is detected, a negative signal is placed on the line 894 which is fed across FIG. 25n, to an invalid character detection circuit, described hereinafter.

The outputs from O2-8 and O2-9, in addition to being fed to lines 935-8 and 936-8, respectively, are fed to two inputs to an AND-INVERTER AI2-12, producing a positive output when the triggers T8 and T12 are properly complemented. Similarly, O2-10 and O2-11 feed into a unit AI2-13; O2-12 and O2-13 feed into a unit AI2-14; and O2-14 and O2-15 feed into a unit AI2-15. The normally positive outputs from AI2-12, AI2-13, AI2-14 and AI2-15 comprise the four inputs to an AND circuit A4-1, the output of which is a positive signal on a line 934. When an error condition exists wherein a pair of triggers, for example, T8 and T12 are both ON or are both OFF, the output of O2-8 and O2-9 are both positive and the output of the corresponding unit AI2-13 is negative and the negative error signal is impressed on the line 934 and is fed to the ERROR circuit, in FIG. 25m, described hereinafter.

The particular character which is gated into the Sort Register, by a signal on the line 881, is controlled by plug-wiring in FIG. 25q, where a particular word hub WH1, WH2, WH3, WH4 or WH5, for example WH4 is plugged by a jumper wire (not shown) to a terminal 938 of an AND-EMITTER FOLLOWER AE2-18; whereas a selected digit hub DH1 through DH10, for example DH7, corresponding to WH4, is plugged by a jumper wire (not shown) to the other input terminal 939 of the unit AE2-18. When the selected character is reached in the reading of the check the corresponding word hubs are positively biased and the unit AE2-18 emits a positive signal through the line 881 which is ANDed, as described hereinbefore, with the signals on the lines 852 and 854, thereby gating the selected character into the Sort Register.

*Multiple Column Select*

Figure 25P:
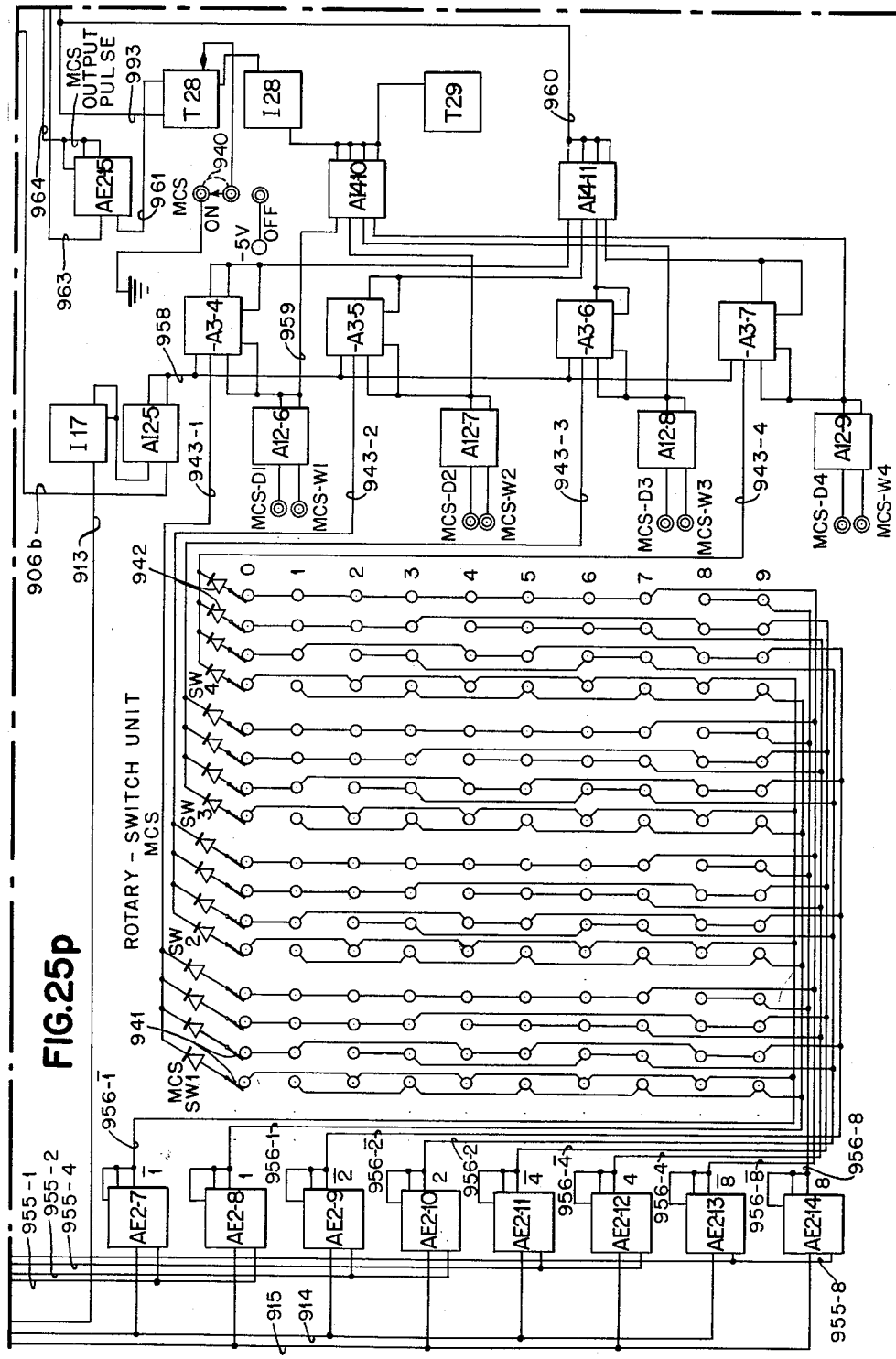

Referring to FIG. 25p, the Multiple Column Select (MCS) circuit is shown. To perform the MCS function, a jumper wire 940 is plugged from a hub 940a to an MCS-ON hub. When the function is not desired, the jumper 940 is plugged to an MCS-OFF hub. Four-digit Multiple Column Select is provided and comprises four Multiple Column Select switches SW1, SW2, SW3 and SW4. Each switch has four wipers 941 connected through individual diodes 942 to a common line. The wipers are manually positioned for selecting digits. For example, assume that all checks having digits 4, 3, 2 and 0 in selected columns (not necessarily adjacent columns) are to be sorted into the Multiple Column Select pocket 36-MCS. Each switch comprises eight lines numbered respectively from left to right as 1, $\bar{1}$, 2, $\bar{2}$, 4, $\bar{4}$, 8, $\bar{8}$. The switch SW1 is moved to the 4 position shown as a dotted block in FIG. 25p, where it contacts the lines $\bar{1}$, $\bar{2}$, 4 and $\bar{8}$. The switch SW2 is moved to the 3 position where it contacts the lines 1, 2, $\bar{4}$ and $\bar{8}$. The switch SW3 is moved to the 2 position where it contacts the lines $\bar{1}$, 2, $\bar{4}$, $\bar{8}$. The switch SW4 is moved to the 0 position where it contacts the lines $\bar{1}$, $\bar{2}$, $\bar{4}$ and $\bar{8}$. The contacts 941 of switch SW1 are connected to a common line 943-1. The contacts 941 of switch SW2 are connected to a common line 943-2; the contacts 941 of switch SW3 are connected to a common line 943-3; and the contacts 941 of switch SW4 are connected to a common line 943-4 Eight AND-EMITTER FOLLOWER units designated AE2-7, AE2-8, AE2-9, AE2-10, AE2-11, AE2-12, AE2-13 and AE2-14 comprise the inputs to the Multiple Column Select unit. The unit AE2-7 is the $\bar{1}$ input; AE2-8 is the 1 input; AE2-9 is the $\bar{2}$ input; AE2-10 is the 2 input; AE2-11 is the $\bar{4}$ input; AE2-12 is the 4 input; AE2-13 is the $\bar{8}$ input and AE2-14 is the 8 input. Each input is connected to the correspondingly designated lines of each of the four switches. For example, the 8 input AE2-14 is connected to the 8 line of SW1, to the 8 line of SW2, to the 8 line of SW3 and to the 8 line of SW4. Each of the units AE2-7 through AE2-14 has two input terminals. The line 915, which is the output of the inverter −I1 following trigger T1 in FIG. 25j, which indicates zero bits, is one input to the 1 unit AE2-8, the 2 unit AE2-10, the 4 unit AE2-12 and 8 unit AE2-14. When the trigger T1 is OFF as is the case when there is a code bit in the "one" track and none in the "zero" track, the line 915 is positively biased. The line 914 leading from the negative inverter −I4, which reflects the condition of the "one" trigger T2, is one input to the units AE2-7 corresponding to $\bar{1}$, AE2-9 corresponding to $\bar{2}$, AE2-11 corresponding to $\bar{4}$, and AE2-13 corresponding to $\bar{8}$. The line 914 is positively biased when the trigger T2 is OFF which is a "not" indication, i.e., a bit is not read in the "one" track but is read in the "zero" track.

The signal on the line 955-1, described hereinbefore, is ANDed in the AND-EMITTER FOLLOWER AE2-7, in FIG. 25p, with a signal on the line 914 to provide a $\bar{1}$ output on a line 956-$\bar{1}$. The signal on the line 955-1 is ANDed at AE2-8 with the signal on the line 915 to provide a 1 output on a line 956-1. Obviously a signal will appear on either the line 956-$\bar{1}$ as the output of AE2-7 or on the line 956-1 as the output of AE2-8 but not on both since the line 915 corresponds to the condition 1·$\bar{0}$, whereas the line 914 corresponds to the condition 0·$\bar{1}$. Similarly, the signal on the line 955-2 is ANDed with the lines 914 and 915 at AE2-9 and AE2-10 to produce a $\bar{2}$ signal on a line 956-2. The signal on the line 955-4 is ANDed with 914 and 915 at AE2-11 and AE2-12 to give a $\bar{4}$ signal on a line 956-$\bar{4}$ or a 4 signal on a line 956-4. The signal on the line 955-8 is ANDed with 914 and 915 at AE2-13 and AE2-14 to give an $\bar{8}$ signal on a line 956-$\bar{8}$ or an 8 signal on a line 956-8. Consequently, for each character read, a signal appears on the $\bar{1}$ or the 1 line, on the $\bar{2}$ or the 2 line, on the $\bar{4}$ or the 4 line, and on the $\bar{8}$ or the 8 line. The signals on the lines 956 are positive signals.

The particular characters selected for the Multiple Column Select operation are selected by plugging to the Word hubs WH1 through WH5 and the Digit hubs D1 through D10, in FIG. 25q. For each character selected, the Word hub and a Digit hub corresponding to the selected character are plugged to the hubs for the first character to be selected. The Digit and Word hubs corresponding to the first MCS Digit are plugged to terminals MCS-D1 and MCS-W1 which are inputs to an AND-INVERTER unit AI2-6 in FIG. 25p. Similarly, the Digit and Word hubs corresponding to the second MCS Digit are plugged to hubs MCS-D2 and MCS-W2 which are the inputs to a unit AI2-7. The Digit and Word hubs corresponding to the third MCS Digit are plugged to hubs MCS-D3 and MCS-W3 which are inputs to a unit AI2-8. The Digit and Word hubs corresponding to the fourth MCS Digit are plugged to the hubs MCS-D4 and MCS-W4, which are the inputs to a unit AI2-9. The Word and Digit hubs in FIG. 25q are negative except at the time when the corresponding Word or Digit is read on the check. Therefore, both the Digit and Word inputs to the units AI2-6 through AI2-9 normally are negative and the outputs normally positive.

As long as either input to a unit AI2-6 through AI2-9 is negative, the output thereof is positive. When a selected Digit position is reached, the Word and Digit hubs both go positive and the output of the corresponding unit AI2-6 through AI2-9 goes negative. When the first selected Digit position is reached and the output of the unit AI2-6 goes negative, the negative output is fed through a line 959 to a similar unit AI4-1 effecting a positive output therefrom to what is normally the right-hand output of a trigger T29 and to an inverter I28. The positive input to the trigger T29 pulls T29 ON. Normally the triggers in this machine are driven ON by negative signals. The trigger T29 remains ON until reset by RESET 2, described hereinafter. RESET 2 occurs after each check has been decoded into the Sort magnets.

The positive input to I28 effects a negative output which turns ON a trigger T28 which is designated the MCS trigger.

The 0·1 line 913 from the complementary emitter follower EC2, in FIG. 25j, provides a positive signal to an inverter —I17, in FIG. 25p, during the reading of a coincidence mark at the start of a character. During reading of the four character bits following the coincidence signal, the signal on line 913 is negative and is inverted at inverter —I17. The positive output of —I17 is fed to an AND-INVERTER AI2–5 where it is ANDed with the negative Delay Sample signal from I8, in FIG. 25j, through the line 906b. With the positive output of —I17 impressed on —I12–5, the negative Delay Sample signals are gated through to a line 958. The line 958 is a common input too for negative AND circuits —A3–4, —A3–5, —A3–6 and —A3–7. During the sensing of a coincidence mark, the line 913 is positively biased to produce a negative output from the inverter —I17 to the AND-INVERTER AI2–5 to inhibit the negative Delay Sample signal from creating a negative signal on the line 958 as both inputs to AI2–5 must be positive to produce a negative output. During reading of the four code bits of a character, the positive going end of the Delay Sample signal ANDed with the positive output of —I17 produces a negative signal on the line 958.

The output of AI2–6 which actuated AI2–10 to turn triggers T28 and T29 ON, also is fed to a three-way negative AND circuit —A3–4. The line 958 also is negative and, if the third and last input, line 943–1, is positive, as it will be at the four intervals of time during the reading of the selected character position, if the desired Digit is recorded therein, the unit —A3–4 will continue to conduct and the output thereof will remain positive. However, if the character being read is not the desired character, at least one of the four signals on the line 943–1 will be absent and the output of —A3–4 will go negative.

If a Digit other than the desired Digit is in the selected first position, the negative output of —A3–4 is fed to an AND-INVERTER AI2–11, the output of which is positive when any or all of the inputs are negative. The output of AI2–11 goes positive and is fed through a line 960 to what is normally the left-hand output of the trigger T28, thereby turning T28 OFF. If a matching condition is detected between any or all of the remaining desired Digits, the resulting positive output of AI2–10 is ineffective to turn T28 back ON, since T29 remains ON and nullifies any subsequent positive input to I18.

Similarly the second, third and fourth selected positions are plugged to AI2–7, AI2–8 and AI2–9 respectively and if Digits are read in each selected positive matching the Digit set up in the corresponding MCS switches, the MCS trigger T28 remains ON.

Assuming the Digits set in the switches SW1, SW2, SW3 and SW4 were read in the proper positions on the check, the trigger T28 is ON and impresses a positive signal through a line 961 to one input and an AND-EMITTER FOLLOWER AE2–15. When the check actuates card lever 606, in FIG. 25n, a positive signal is fed, through a line 962, to an inverter I23 and through a single shot multivibrator and an inverter I24 impresses a positive signal on a line 963 which is the second input to AE2–15. AE2–15 emits a positive signal to a line 964 actuating a relay driver RD-MCS and a thyratron TH-MCS which delivers a positive signal to a line 965 to energize the magnet 626-MCS, in FIG. 25g, as described hereinbefore.

Digit Generator

In a POST operation, as described hereinbefore, the buffer 868 must be filled to its forty character capacity. The check normally contains only thirty-seven Digits; therefore, it is necessary to generate signals to simulate the additional three Digits. These signals are converted in the buffer 868 to generate coded signals indicative of Digits 8 to fill the buffer.

Digit thirty-seven is followed, as shown in FIG. 10, by two or more coincidence marks which comprise END OF RECORD (EOR) mark, which may be followed by a Seven-Digit check number. The EOR mark actuates circuitry, in FIGS. 25m and 25j, to generate the foregoing signals and also to check for an error described hereinafter.

End of Record

Referring to FIG. 25m, the output of an AND unit AE2–2 is fed to a line 966 and is designated END OF RECORD. The signal is generated as follows: The trigger T16, FIG. 25m, is turned ON by a negative signal emitted to the line 916 from I7, in FIG. 25j, when the coincidence trigger T3 turns OFF. The resultant negative output from T16 effects a positive output from the inverter —I9 to a unit AE2–2. A positive pulse is reflected on the line 872 if the next information sensed is a 0·1. Normally the trigger T16 is turned OFF by the negative 0+1 signal on the line 874 from OI2–2, in FIG. 25j, which immediately follows the sensing of the coincidence mark; however, when the next sensed mark also is a coincidence mark, rather than a "zero" or a "one," the trigger T16 remains ON. When the second consecutive coincidence mark is sensed, the trigger T3 goes ON and the positive signal on the line 872 effects a positive END OF RECORD output from AE2–2, through the line 966 to an AND-EMITTER FOLLOWER AE2–5. The positive output from AE2–2 is fed to an OR-INVERTER OI2–3, the positive output of which is fed through a line 968 to an inverter I3, in FIG. 25j, where it is inverted and fed to a trigger T6, turning T6 ON.

A negative output from the OFF side of T6 effects a negative output on a line 969 from an emitter follower —E1 to the unit —O3–1 to inhibit any output signals from —O3–1 due to signals from the amplifiers 490–"0" and 490–"1". This is necessary since some checks are printed with a seven Digit check number following the thirty-seventh Digit and the coincidence mark.

A coincident positive signal from the ON side of T6 produces a positive output from a complementary emitter follower EC3 which has a dual function: (a) To inhibit, through a line 970, any output signals from —A3–1, FIG. 25j, in response to signals from the amplifiers 490–"0" and 490–"1"; (b) To condition, through a line 972 an AND circuit A2–1 to pass signals from a free running multivibrator MV1. As a precautionary measure, to assure that the first used signal from MV1 is a full length signal, the first output signal from A2–1 is inverted at an inverter I1 to turn a trigger T7 ON.

The second signal from A2–1 turns T7 OFF and the resultant positive output I2 is fed through lines 973 to turn the UNBLANK trigger T4 OFF.

With T4 OFF, the output of I9 is positive and is fed through a line 974 as one input of an AND-EMITTER FOLLOWER AE2–1, in FIG. 25j. Thus conditioned, AE2–1 passes to lines 975 and 976, the MV1 signals which are gated through A2–1 to AE2–1. The latter signals are fed through the line 975 and a line 977 to OI–1, and then I6 where they are twice inverted and fed to the SAMPLE CONTROL trigger T5 to turn it OFF. The signals from AE2–1 are fed through the line 976 to OI3–1 to actuate OI3–1 and SS15–2. An output from —AE2–1 is inhibited because T4 is OFF. The output of SS15–2 is inverted at I10 to be ANDed with the output of AE2–1 at AI2–1 and also to actuate SS15–1 and I8 to generate DELAY SAMPLE signals on the lines 906, 906a and 906b.

The first generated signal from AI2–1 is fed to AI2–2 to create Ring Drive on line 878 to advance the Digit Register, FIG. 25q, to turn ON T38. The next two Ring Drive signals turn ON T39 and T40. In this manner Word 4 Digit 8, Word 4 Digit 9 and Word 4 Digit 10 character representing signals are delivered to the buffer through the lines 887–9, 887–10 and 882–4, in FIG. 25o.

Simulated End of Record Signal

If the Bit Count or the Character Register count is erroneous and the EOR signal on the line 966 is not generated, it is desired that MV1 be turned ON when the Character Register registers Character 38. When a Word 4 trigger T44 and the Digit 8 trigger T38 go ON, negative signals are emitted on the Digit 8 line 926–8 and the Word 4 line 929–4 to an AND-EMITTER FOLLOWER AE2–6, in FIG. 25m. During a POST operation, the relay R74, FIG. 25f, is energized, as described hereinbefore, and a line 967 is raised, through transferred contacts R74–6, from —5 volts to 0 volts. This connection raises the input to a diode D9 to 0 volts whereby D9 conducts. D9 and AE2–6 together perform an AND function. When both inputs to AE2–6 are positive and the input to D9 is positive, the combined output is positive and a negative pulse is emitted from OI2–3 to the line 968 to gate through the signals from MV1, as described hereinbefore.

Check Number Verification

If the usual thirty-seven digits are followed by a seven digit check number, the tenth digit positions will have a digit recorded therein. The tenth digit position therefore, is tested to determine whether the EOR mark after Digit thirty-seven shall be permitted to initiate the generation of signals by MV1. It is desirable to inhibit the MV1 signals in a LIST operation since the seven digit check number is read and stored in the buffer 870. During a LIST operation, R74 is deenergized and the line 967 is at a —5 volt level and maintains one input to an OR circuit O3–2 at a —5 volt level.

At the start of Digit 10 time, the Word 1 trigger T41 and the Digit 9 trigger T39 are ON, effecting a negative output from —I47 which is fed through a line 979 to O3–2 and from —I57 through a line 978 to O3–2. All three inputs to O3–2 are then negative and the output tends to go negative; however, the outputs of an inverter —I16 and O3–2 are common connected to act as an AND circuit. If a positive 0+1 pulse is received by —I16, on the line 854, at the time the output of O3–2 is negative, the coincident negative output of —I16 and O3–2 is inverted at —I15 and the positive output of —I15 is applied to a trigger T25 to pull T25 to an ON state. In the ON state, the negative output from the OFF side of T25, applied to the circuit AE2–5 is effective to inhibit the EOR signal on the line 966 from actuating OI2–3 and gating through the MV1 signals. When the Word 5 trigger T45 turns ON, a positive pulse is fed through a line 971, is inverted at I15 and applied to turn T25 OFF.

Error Detection

If the digit stored in the Sort Register, from the digit position selected for sorting, is indicated to be in error by a negative signal on the line 934, FIG. 25k, as described hereinbefore, it is desired to turn ON an ERROR 2 trigger T23 and a REJECTED DOCUMENT trigger T24. Similarly, if an invalid character is indicated by a negative signal on the line 894, FIG. 25l, as described hereinbefore, triggers T23 and T24 are turned ON.

The negative shift of the output of the character gate AE2–18, when the selected digit trigger goes OFF with the reading of the next digit, is fed through the lines 881 and 880 to an inverter —I14, in FIG. 25m, inverted therein and inverted again at I12 and fed to a trigger T21 which turns ON. The positive output of T21 is ANDed in a unit AI2–3 with the 0·1 signal on the 872. The negative output at AI2–3 is fed to two OR circuits O2–2 and O2–3.

If a pair of triggers in the Sort Register are not properly complemented, a negative signal on the line 934 is fed through an emitter follower E2, FIG. 25m, to O2–2 where it is combined with the negative output of AI2–3, producing a negative output to AI2–4. The positive output of AI2–4 is fed to the ERROR 2 trigger T23, pulling T23 ON. Any time T23 is turned ON, a positive output from the ON side, actuates I13 to turn the REJECTED DOCUMENT trigger T24 ON.

If the line 894 is negative due to detection of an invalid character in the Sort Register as described hereinbefore, it is combined in O2–3 with the output of AI2–3 to actuate AI2–4 and consequently, T23 and T24. The positive output from the ON side of T24 is fed to a line 980 for purposes described hereinafter. When T24 is reset, as described hereinafter, the positive output from the OFF side is fed through a line 980a and through a complementary emitter follower EC15, through a line 980b to the buffer 868 for a purpose described hereinafter. The positive output of T23 is fed to a DIGIT CHECK line 981 to actuate a complementary emitter follower EC26 to produce a positive signal on a line 982 which, in the buffer 868, operates upon a circuit which normally generates digits "eight" for the core buffer digits 38, 39 and 40, and converts the "eights" to "nines."

The trigger T21 is reset by a signal generated by card lever 606 as described hereinafter.

An ERROR 2 trigger T23 also may be driven ON by a negative output from an OR-INVERTER OI4–1 which may be actuated by positive signals from any one of four sources and stays on a short time to indicate to the buffer 868, through the lines 981 and 982, that the digit in the buffer register is erroneous. T24 is turned ON and left ON to store the error indication until RESET 2 time, described hereinafter.

(1) If an error is detected in the buffer 868 (870) a positive signal is sent back on the line 889, in FIG. 25o, to OI4–1 in FIG. 25m. This positive signal effects a negative output from OI4–1 to turn T23 ON. The generating of the error signal in the buffer is described hereinafter in the buffer description.

(2) From a unit A2–2, in FIG. 25m, which compares the last read digit position with the END OF RECORD mark to assure that the circuit has read and counted thirty-seven characters when the END OF RECORD mark is read.

(3) From a unit AE2–4, in FIG. 25n, which checks to assure that the BIT COUNT trigger T20 is ON when the 0·1 signal is generated.

(4) Through the ERROR 1 trigger T22, in FIG. 25n, which reflects the condition of more than one BIT COUNT trigger ON at one time.

Digit Thirty-Seven vs. End of Record Check

If the count in the Digit Register is correct, the END OF RECORD pulse on the line 966 should coincide with the ON state of the Word 4 and Digit 7 triggers. At Character 37 time a Digit 7 line 984 and the Word 4 line 930, FIG. 25q, corresponding respectively to Digit 7 and Word 4, are negative and are fed to an OR circuit O2–1 in FIG. 25m. When both inputs to O2–1 are negative, the output is negative thereby effecting a negative output from —E2 to A2–2. At times other than Character 37 time, the output of O2–1 is positive. The positive EOR signal on the line 966, described hereinbefore, also is fed to A2–2. If both inputs to A2–2 are positive, the output is positive. If the EOR signal is generated at Character 37 time, the positive EOR signal is ANDed with a negative signal from E2 and is ineffective. However, if it is not, Character 37 time, the positive EOR signal is ANDed with a positive output from E2 and a positive signal is emitted from A2–2 to OI4–1 to turn T23 ON.

Bit Count Check

When the 0·1 signal arrives on the line 872, in FIG.

25m, the "8" bit trigger T20 should be ON. The negative output of T20 is ANDed at AE2–4 with the positive 0·1 signal. The output of AE2–4 to the line 985 is negative. If T20 is OFF when the 0·1 signal arrives, AE2–4 emits a positive signal which actuates OI4–1 and turns T23 ON.

The BIT COUNT register also is checked to determine whether the "8" bit trigger T20 is ON at the same time that the "1" bit trigger T17, or the "2" bit trigger T18 or the "4" bit trigger T19 is ON. This would indicate failure of T20 to go OFF when trigger T17 went ON.

The outputs of O3–1 and —E3 are ANDed with the positive DELAY SAMPLE signal on the line 906a. When T17, T18 and T19 are OFF, all three inputs to O3–1 are negative and the output is negative. If any one of the three triggers is ON, the output of O3–1 is positive. When T20 is ON, the output of —E3 is positive. If T17, T18 and T19 are OFF and T20 is ON, the output of AE2–3 is negative and is ineffective to turn T22 ON. When one or more of the triggers T17, T18 and T19 are ON and T20 is ON, the output of AE2–3 is positive and T22 is turned ON. An inverter I14 and an emitter follower —E4 functions together as a two-input AND circuit. T22 being ON applies a positive signal to —E4. The next 0·1 pulse on the line 872 is inverted at AI3–1 and is fed, as a negative signal through a line 987 to I14 where it is inverted. The negative input to I14 ANDed with the positive input to —E4 produces a positive pulse on a line 986 which produces a negative output from OI14–1 to turn T23 ON. The negative going trailing edge of the 0·1 pulse shifts the line 986 negative and turns T22 OFF.

*Sort Compare*

Referring to FIG. 25s, a SORT COMPARE circuit is shown for determining if none of the sort magnets 626 is energized and to determine if more than one sort magnet is energized. Two components COM 1 (Compare 1) and COM 2 (Compare 2) provide the inputs to the SORT COMPARE circuit. The units COM 1 and COM 2 are shown in detail in FIG. 28r and are described in the component description.

The five input terminals of COM 1 are connected to the output lines 895–0, 895–1, 895–2, 895–3 and 895–4 from thyratrons TH0, TH1, TH2, TH3 and TH4 respectively. The five input terminals of COM 2 are connected to the output line 895–5, 895–6, 895–7, 895–8, and 895–9 from the thyratrons TH5, TH6, TH7, TH8, and TH9.

As described in the component description hereinafter, with reference to FIG. 28r, the components COM 1 and COM 2 are graduated in such a manner that the output terminals are raised in increments as successive numbers of the five inputs are pulsed. The upper output terminal of each unit COM 1 and COM 2 is raised above a predetermined value when two inputs are pulsed. The lower output terminal of each unit COM 1 and COM 2 is raised above a predetermined value when one input is pulsed.

The upper output terminal of COM 1 is connected to an NPN type inverter I30 which is conditioned to be actuated when that terminal is raised above the predetermined value achieved by two or more inputs to COM 1. Therefore I30 is actuated and produces a negative error indicating output to one input terminal of a three-input AND-INVERTER AI18, when two or more of the inputs to COM 1 are pulsed. Similarly, an inverter I31 is actuated and feeds a negative error indicating signal to the same input terminal of AI18 when two or more of the inputs to COM 2 are pulsed. A negative input to any terminal of AI18 effects a positive output on a line 1100.

The lower output terminal of COM 1 is connected to an NPN type inverter I32 which is conditioned to be actuated when that terminal is raised above the predetermined value achieved by one input to COM 1. Therefore, I32 is actuated and produces a negative output to an emitter follower —E17 when one or more inputs to COM 1 are pulsed. Similarly, an inverter I33 is actuated and feeds a negative signal to an emitter follower —E18 when one or more of the inputs to COM 2 are pulsed.

The circuit including —E17 and —E18 is designed to indicate if none of the inputs to either COM 1 or COM 2 is pulsed. The outputs of —E17 and —E18 are negative when an input of the associated units COM 1 or COM 2 is pulsed. If the corresponding unit is not pulsed on at least one line, the output of —E17 or —E18 corresponding thereto is positive. The outputs of —E17 and —E18 are fed to an AND circuit A3–1 which requires three positive inputs to derive a positive output. A positive output indicates an error. If neither unit COM 1 nor COM 2 is pulsed, the corresponding inputs to A3–1 are positive and at RESET 2 time, a positive pulse on a line 1102 to the third input to A3–1 causes A3–1 to emit a positive signal on a line 1103 which is inverted at I34 and fed as a second input to AI18 and is effective to produce an error-indicating positive signal on the line 1100.

The negative signal on the line 1102 is produced as follows: when the card lever 606 closes its contacts 607 a negative signal is emitted on the line 963 and actuates SS2 to produce the RESET 2 signal on the line 995, as described hereinbefore. The positive going trailing end of the output pulse from SS2 is fed through a line 1104, inverted at I35 and fed through a line 1106 to reset the ERROR TEST trigger T21 in FIG. 25m. When T21 is reset the positive output through an emitter follower —E19 is fed through the line 1102 as a gating signal to A3–1, in FIG. 25s.

An output from either —E17 or —E18, but not from both, may indicate a correct condition where only one of the ten inputs to COM 1 and COM 2 is pulsed. If both —E17 and —E18 emit negative signals to a minus AND circuit —A2–2, a negative, error-indicating signal is emitted on a line 1108 as a third input to AI18 causing AI18 to emit a positive signal to AE2–19.

Three error conditions have been described which cause a positive error signal on the line 1100.

(a) A negative output from I30 or from I31 indicating that at least two inputs of a unit COM 1 or COM 2 have been pulsed.

(b) A negative signal from I34 indicating that none of the inputs to either COM 1 or COM 2 have been pulsed.

(c) A negative output from —A2–2 indicating that at least one input to each unit COM 1 and COM 2 has been pulsed.

The positive error-indicating signal on the line 1100 is ANDed at AE2–19 with the positive RESET 2 pulse from the line 995, in FIG. 25n, through a line 1110.

The coincidence of positive inputs to AE2–19 effects a positive output to actuate a relay driver RD15 and a thyratron TH15 to emit a positive signal on the line 841 which is used to energize the Sort Compare relay R54 in FIG. 25d, as described hereinbefore.

*Card Levers*

Referring to FIG. 25n, card levers 606, 608, 576 and 579 are shown. The card lever 576 is located at the read station approximately three inches before the read heads 494–"0" and 494–"1"; the card lever 579 is located adjacent the read head; the card lever 606 is located three inches before the chute blade gates 624; and the card lever 608 is located adjacent the last chute blade gates 624.

For the purpose of this description, assume that one check is under the card lever 579 and has transferred the contacts 579a. A line 987 is connected through the contacts 579a, transferred, to a —5 volt potential. When the check advances to a position where the contacts 579a are released and return to normal, the resultant positive signal on the line 987 in inverted at I20 and applied to turn ON a trigger T26. The positive signal also is fed through a line 988 to actuate a relay driver RD16 and a thyratron TH16 to produce a positive RESET 1 signal on a line 989 which is applied, through connections not shown, to reset triggers T1, T2, T3, T4, T6 and T7 in FIG. 25*j*; triggers T16, T17, T18, T19, T20, T21, T22, T23 and T25 in FIG. 25*m*; and triggers T30, T31, T32, T33, T34, T35, T36, T37, T38, T39, T40, T41, T42, T43, T44 and T45 in FIG. 25*q*. Some of these triggers may be OFF at RESET 1 time but RESET 1 assures that all of them are OFF.

The positive signal on the line 987 also is fed through a line 991 to actuate a relay driver RD13 and a thyratron TH13 to produce an END OF DOCUMENT signal on the line 838 to actuate relay R37 in FIG. 25*d*, for the purposes described hereinbefore.

When the leading edge of a check advances under the card lever 576, the associated contacts 576*b* are transferred raising the potential of a line 992 to 0 volts and effecting a negative output from an inverter 122 to actuate a power transistor PT–1. The output of PT–1 is fed through relay contacts R55–3, in FIG. 25*h*, through the coil of a relay R30 to the line 782. Contacts R30–3, in FIG. 25*r*, opening the RESET 1 line 989 and returning it to the normal −15 volt level thereby ending RESET 1 signal initiated by card lever contacts 579*a*. The positive signal on the line 992 also produces a negative output from an inverter 121 which turns the trigger T26 OFF only if the preceding check has passed card lever 579. If the following check has operated the card lever 576 and applied a negative inhibiting signal, via the inverter 121, to the trigger T26, then the subsequent return of the contacts 579*a* to normal, is ineffective to turn the trigger T26 ON. The trigger T26 being ON, at the time the card lever 606 is operated, indicates an error which is reflected through an inverter I19 and a trigger T27 as a negative input to an AND-EMITTER FOLLOWER AE4–1.

A second input to AE4–1 is the output of the OFF side of the REJECTER DOCUMENT trigger T24, Fig. 25*m*, on the line 980. When T24 is OFF, indicating no error, the output on the line 980 is positive. When T24 is ON, the output is negative.

A third input to AE4–1 is the output of the OFF side of the MCS trigger T28, in FIG. 25*p*, on a line 993. The output of T28 is negative when T28 is ON, indicating that the MCS conditions have been met and the check is to be sorted into the pocket 36–MCS.

The fourth input to AE4–1 is the line 963 which is the output of the inverter I24 which is actuated by the card lever contacts 606 as described hereinbefore. The signal on the line 963, after the contacts 607 transfer, is a positive signal which is passed through AE4–1 if the remaining three inputs thereto also are positive.

A positive output from AE4–1 to a line 994 actuates a relay driver RD18 and a thyratron TH18 to raise the line 937, FIGS. 25*r*, 25*o* and 25*k*, to zero volts and permit the select magnets 626–0 through 626–9 to be energized as described hereinbefore.

If a check actuates the card lever 576 before the preceding check has passed the card lever 579, the trigger T26 remains OFF as described hereinbefore. This indicates that the two checks are traveling too close together and may result in an error; therefore, the first of the two checks must be rejected. The output from T27 to AE4–1 is negative under the described error condition and the positive signal from card lever 606 is not passed to the line 994. The line 937 remains negative and the select magnets may not be actuated because the signals from the decode matrix in FIG. 25*l*, are ineffective to actuate the corresponding relay drivers, and therefore to actuate corresponding selector magnets 626–0 through 626–9. The check then passes on to the pocket 36–REJECT.

Similarly, the negative error signal on the line 980 to the unit AE4–1 inhibits selection into the pockets 36–0 through 36–9.

The negative signal on the line 993, when the MCS trigger T28 is ON, inhibits selection of the magnets 626–0 through 626–9. Select magnet 626–MCS is energized so the check is deposited in pocket 36–MCS.

When the leading edge of a check actuates card lever 606, the resultant output from I24 also is fed to a single shot multivibrator SS2, the negative output of which actuates an inverter −I34 to emit a positive signal on a line 995 to actuate a relay driver RD17 and a thyratron TH17 to produce a positive RESET 2 signal on a line 996 which is applied, through connections not shown, to reset triggers T8, T9, T10, T11, T12, T13, T14 and T15 in FIG. 25*k*; triggers T28 and T29 in FIG. 25*p*; and trigger T27 in FIG. 25*n*.

The output of I24 also is fed to an AND-EMITTER FOLLOWER AE2–17 where it is ANDed with the output of an AND-INVERTER AI2–16. T27 provides one input to AI2–16 and the REJECTED DOCUMENT line 980 provides the other. When the trigger T27 is OFF at the time card lever 606 is actuated, indicating that two checks are too close together, or when the REJECTED DOCUMENT trigger T24 is ON, indicating an error, the output of AI2–16 is positive and is ANDed at AE2–17 with the card lever 606 signal from I24 to create a positive REJECT signal on a line 997 which actuates a relay driver RD14 and a thyratron TH14 to create a positive REJECT signal on the line 844. The reject signal is used to energize the REJECT relay R61 in FIG. 25*d*. If a signal from F occurs prior to a signal from E, an overlap condition between two checks is indicated. T27 has not yet been turned ON and the signal from F through I29 is not emitted through AE4–1 and REJECT line 997 also is pulsed.

When the leading edge of a check actuates the card lever 608, to raise a line 998 to zero volts and actuate a relay driver RD12 and a thyratron TH12, in FIGS. 25*r* and 25*d*, to energize the relay R59. Relay R59 then operates in the manner described hereinbefore.

*Buffer 868*

Referring to FIGS. 27*b* and 27*c*, the buffer 868 used to receive data from the Sorter-Reader, to translate it and feed it to "IBM" type 650 Accounting Machine, is shown in block form.

The lines 887–1 through 887–10, 882–1 through 882–4, 860, 862, 864, 866, 837, 980*b*, 889, 982, and 906*c*, from the Sorter-Reader, FIG. 25*o*, are shown entering a level setting block 1000. In the block 1000, the 0 to −5 volt signals are converted, by conventional means, to voltage levels suitable for the circuits of the buffer 868. The 0·$\bar{1}$, 1·$\bar{0}$ and 0+1 lines 860, 866 and 862, respectively, feed into a Character Register 1002 which, functionally, is the same as the Sort Register 859 shown in FIG. 27*a*. The code bits are fed in serially, as in the Register 859.

From the Character Register 1002, the 1, $\bar{1}$, 2, $\bar{2}$, 4, $\bar{4}$, 8 and $\bar{8}$ signals are fed on lines 1003 into a Code Check unit 1004 to be checked for improper complementing of registers and for invalid characters in a manner similar to the checking in the Sorter-Reader, FIGS. 25*k* and 25*l*. If an error of either type is detected, a signal is sent back to the Sorter-Reader on the line 889 to cause the check originating the erroneous data to be sorted into the pocket 36–REJECT.

In order to add clarity to the buffer description, the same numbers are applied to continuation of lines; for example, the 0·$\bar{1}$ extending from the Sorter-Reader circuits, FIGS. 27*a* and 25*o*, is designated 860 as an input to the voltage level setter 1000 in FIG. 27*b*, and also to the corresponding line emerging from the level setter block 1000 although there is intermediate circuitry between the inputs to and the output from the block 1000. The word lines 882–1, 882–2, 882–3 and 882–4 extend through the level setting circuit 1000 as inputs to a Word Driver circuit 1006. The digit lines 887–1 through 887–

10 extend through the level setting circuit 1000 as inputs to a Digit Driver circuit 1008. The lines 1003 from the Character Register 1002 branch into lines 1010 and feed into an Inverse Translator circuit 1012 where the 1, 2, 4, 8, $\bar{1}$, $\bar{2}$, $\bar{4}$, and $\bar{8}$ code is translated to a $\bar{0}$, $\bar{1}$, $\bar{2}$, $\bar{3}$ and $\bar{6}$ code on lines 1014. The lines 1014 feed into an Inhibit Driver circuit 1016. The output on lines 1018 inhibits the storage of bits not required in the character being stored in a Core Buffer 1020, when a selected Digit Driver output on a line 1022 and a selected Word Driver output on a line 1024 tend to store data in all bit positions of a character corresponding to the particular word and digit line. The selected word line 1024 pulses fifty cores corresponding to ten, five-bit characters; the selected digit line 1022 pulses five of the same fifty cores; the five cores would all be magnetized if none of the inhibit lines 1018 were pulsed. The "IBM 650" recognized two-out-of-five code and three of the inhibit lines 1018 are pulsed whereby three of the five cores are not magnetized, whereas the remaining two are magnetized.

The read and then write system is used in filling the buffer 1020. A character is read into the Character Register 1002 and a selected digit line 887 and a selected word line 882 are conditioned. At the end of the reading of a character, the coincidence mark following the character is sensed and the 0·1 signal on the line 864 gates through the next Delay Sample signal from the line 906c. The fall of this Delay Sample closed the gate. The Delayed Sample signal on the line 906c is fed into a circuit 1026 where it generates what is termed a Delayed 0·1 signal. The Delayed 0·1 signal is fed to a circuit 1028 to generate the Read, Write and Inhibit signals. A Read pulse is generated first on a line 1030 and is fed to the Digit Driver circuit 1008; to the Word Drivers 1006; and to a Sense Circuit and Output Latch unit 1031. During Read-in, this signal resets the cores. The trailing end of the Read pulse from 1028 initiates a Write pulse on a line 1032 and an Inhibit pulse on a line 1034.

The Write pulse on the line 1032 is fed to the Digit Driver circuit 1008 and to the Word Driver circuit 1006 to gate through to associated lines 1022 and 1024 the Digit and Word signals from a particular line 887 and a particular line 882 which are conditioned at that time. The Inhibit pulse on the line 1030 is fed to the Inhibit Driver circuit 1016 to gate through inhibit pulses on three of the five lines 1018 in accordance with the digit stored in the Character Register 1002. The Inhibit signals on the lines 1018 coincide with the Write signals on the lines 1022 and 1024 whereby the digit in the Character Register 1002 is stored in the Core Buffer in a two-out-of-five code.

An INPUT Character Register Reset (ICRR) signal is generated on a line 1036 and is fed to the Character Register 1002 to reset it. While a Character Register Reset signal (CRR) is generated on a line 1037 to reset the Sense Circuit and Output Latch unit 1031. The ICRR signal also is fed to a Buffer Status Latch (BSL) circuit 1038, for a purpose described hereinafter.

When Word 4 is being read, the line 882–4 conditions a Character Emitter circuit 1040 whereby the generated signals on the lines 887–8, 887–9 and 887–10 cause the circuit 1040 to emit signals on a line 1042, representative of the digit "eight" to the Inverse Translator 1012 where the code is translated to the inverse two-out-of-five code to emit inhibit signal indicative of the digit "eight" on the lines 1018. When an error is detected in the Sorter-Reader, the Digit Check line 982, leading to the Character Emitter 1040 is pulsed and the unit 1040 emits a signal of a line 1044 which is representative of the digit "nine." The error signal on the line 982 is removed at the end of the digit. However, the error signal remains on the Rejected Document line 980b until the end of the document and is effective to convert the normal digits "eight" in digit position 38, 39 and 40 to digits "nine" to indicate that at least one error has been detected in the reading of the check.

At Word 4 and Digit 8, Digit 9 and Digit 10 times, a line 1046, leading to the Lever Setter circuit 1000, inhibits a signal on the ERROR line 889 from reaching the Sorter-Reader. This inhibit function is necessary since the Character Register is empty at those times and an ERROR condition is reflected on the line 889 even though there is not an error.

At Word 4, Digit 10 time, a signal from the digit line 887–10 and a signal from the Word line 882–4 are fed to the BSL circuit where they are ANDed with the ICRR signal on the line 1036 to turn the BSL circuit ON. When the BSL circuit goes ON, a signal is emitted on a line 1048 which is fed to a Core Storage to General Storage Gate Generator (CS to GS) 1050, indicating that the Core Buffer 1020 is full and the data therein is available to the "IBM 650."

When the BSL circuit is ON and the "IBM 650" recognizes its Code 78, it then looks for an Address Sector 0 (S0), Word 0 (W0), Digit 10 (D10). When the BSL is on and the pulses S0, W0 and D10 arrive, the CS to GS unit 1050 emits a signal on a line 1052 to the Sense Circuit and Output Latch unit 1031, to the Word Driver circuit 1006, to the Digit Driver circuit 1008 and to the Read, Write and Inhibit Generator 1028 to gate signals through the units 1006 and 1008, to gate signals into the unit 1030 and to gate a NEGATIVE EARLY A pulse (NEAP) from the "IBM650" to the unit 1028, to initiate the Read, Write and Inhibit signals.

A particular digit line 1054 is pulsed, from the "IBM 650" drum as is a corresponding Word line 1056. The resultant signals on the lines 1022 and 1024 read-out the corresponding data from the Core Buffer 1020, in the two-out-of-five code, through lines 1058, through the Sense Circuit and Output Latch unit 1031 to the "IBM 650" where it is used in the usual manner.

When the last digit is read out of the Core Buffer 1020, the Word 4 and Digit 9 lines W4 and D9 leading into CS to GS unit 1050 are pulsed and the unit 1050 emits a RESTART signal on a line 1060 which is fed to the BSL circuit 1038, turning 1038 OFF. Circuit 1038 then emits a FEED CALL signal on the line 837 to cause the Sorter-Reader to release a check from the Delay Station 26 whereby further data are fed to the Buffer 868. During read out time the status of the FEED CALL line 837 is fed to the unit 1028 to inhibit incoming signals generated by MV1, in FIG. 25j, from generating Read, Write and Inhibit pulses.

*Buffer 870*

Referring to FIG. 27d, the buffer 870 used to receive data from the Sorter-Reader, to translate it and feed it to the "IBM" Type 419 Numeric Accounting Machine, is shown in block form.

The lines 887–1 through 887–10, 860, 862, 864, 866, 837, 889, 982, 906c from the Sorter-Reader, FIG. 25o, are shown entering a level setting block 1070. In the block 1070, the 0 to −5 volt signals are converted, by conventional means to voltage levels suitable for the circuits of Buffer 870. The 0.$\bar{1}$, 1.$\bar{0}$ and 0+1 lines 860, 866 and 862 respectively, feed into a character Register 1072 which, functionally, is the same as the Sort Register 1002 shown in FIG. 27b.

From the Character Register 1072, the 1, $\bar{1}$, 2, $\bar{2}$, 4, $\bar{4}$, 8 and $\bar{8}$ signals are fed on lines 1073 to a Code Check unit 1074 and to a Binary-to-Decimal Converter 1075. The Code Check unit 1074 is similar to the Code Check unit 1004 in Buffer 868, FIGS. 27b and 27c, and checks each digit stored therein for improper complementing of registers and for invalid characters. If an error of either type is detected, a signal is sent back to the Sorter-Reader on the line 889 to cause the check originating the erroneous data to be sorted into the pocket 36-REJECT.

The coded 1, $\bar{1}$, 2, $\bar{2}$, 4, $\bar{4}$, 8 and $\bar{8}$ inputs signals to the converter circuit 1075 are converted to decimal signals on ten lines 1076-0, 1076-1, 1076-2, 1076-3, 1076-4, 1076-5, 1076-6, 1076-7, 1076-8, 1076-9 and an eleventh line 1076-* representing an asterisk (*) and are fed to a Digit Driver unit 1077. Only one of the lines 1076 is pulsed for a character unless an error is detected in which case the line 1076-* also is pulsed. The asterisk is printed wherever an error is detected and also at the end of a line containing an error whereby the operator may more easily detect errors by observing the printed record described hereinafter.

When an error is detected in the Sorter-Reader circuit, an error signal on the Digit Check line 982 pulses the line 1076-* to store an asterisk in a Core Buffer, 1078, described hereinafter. The error line 889 is addition to feeding an error signal back to the Sorter-Reader, pulses the lines 982 and 1076-* to store an asterisk in the Core Buffer 1078.

The Word lines 882-1 through 882-5 extend through the level setting circuit 1070 to a Word Driver unit 1079. It will be noted that Buffer 870 has a forty-four character capacity and requires the Word 5 lines 882-5 whereas Buffer 868, with a forty character capacity, requires only four Word lines. The Digit lines 887-1 through 887-10 extend through the level setting circuit 1070 to a Digit Driver circuit 1080.

In a manner similar to that employed in Buffer 868, a signal on the 0·1 line 864 gates a Delay Sample signal on the line 906c, into a Delayed 0·1 Generator circuit 1081. The fall of the Delayed Sample signal closes the gate. The Delay Sample signal generates a Write pulse on a line 1082 which is fed to the Digit Value Driver unit 1077 to gate a signal through from the pulsed one of the Digit Value lines 1076, through a corresponding line 1083 leading to the Core Buffer 1078. The Write pulse also is fed to the Digit Driver circuit 1080 to gate a signal through from the pulsed one of the Digit lines 887 through a corresponding line 1084 to the Core Buffer 1078. A signal is generated on a line 1085 and is fed on the Word Driver circuit 1079 where it is ANDed with the status of the four Word lines 882, which are not pulsed at that time, to feed inhibiting signals to all cores in 1078 corresponding to the four Word lines. The fifth Word line 882 is negative at that time and does not pass to the corresponding line 1086. Therefore storage of digits in cores corresponding to the fifth Word line is not inhibited.

The Core Buffer 1078 comprises forty-four rows or columns of storage positions wherein any digit 0 through 9 or an asterisk may be stored in a single core. Data is read out of the Core Buffer 1078 in such a manner as to simulate the reading of an IBM type record card to control the "IBM" 419 which normally operates from such record cord. Forty-four print bars on the "IBM" 419 are utilized in this application, corresponding to the forty-four digits read on the check and stored in the Core Buffer 1078. Each print bar of the "IBM" 419 contains the digits 0-9 and asterisk in the order *, 9, 8, 7, 6, 5, 4, 3, 2, 1 and 0, arranged from top to bottom. At a predetermined time in the "IBM" 419 cycle, the type bars begin to rise and pass a print line; the stored data is read out of the Core Buffer 1078 in the order *, 9, 8, 7, 6, 5, 4, 3, 2, 1 and 0, synchronously with the passage of corresponding digit print elements past the print line. When a stored digit is read out of a particular column of the Core Buffer 1078, the print bar in a corresponding column is arrested with the read-out digit aligned with the print line. When all digit positions have been read-out, the selected digits are simultaneously printed along the print line of a record sheet in the "IBM" 419.

The asterisk precedes the digit 9 whereby any stored digit may be nullified by storing an asterisk in the same column of the Core Buffer 870, as described hereinbefore, and arresting the corresponding print bar at the asterisk position. A forty-fifth type bar, adjacent to the right hand one of the forty-four type bars corresponding to the forty-four stored digits, may be actuated in a parallel manner when any one of the forty-four columns of the Core Buffer 1078 stores an asterisk. The operator may then scan the right hand column only, to determine if an error has been detected and an asterisk printed in the corresponding column.

Data is stored in the Core Buffer 1078 as follows: For each digit read on the check, a particular Word line 882, Digit line 887 and Digit Value line 1076 is pulsed. Each Digit Value line 1084 threads forty-four cores in which the corresponding digit may be stored. Each Digit line 1084 threads eleven cores (*, 9, 8, 7, 6, 5, 4, 3, 2, 1, 0) of each of four rows corresponding to the four word (Digit lines 1084-1, 1084-2, 1084-3 and 1084-4 thread eleven cores of each of five rows, the fifth rows corresponding to columns 41, 42, 43 and 44). Each Word line 1086 threads ten rows of eleven cores each corresponding to the ten digit words. For example, assume the Digit Value is 9, the Digit is 1 and the Word is 1. The Digit Value line 1083-9 pulses all forty-four Digit Value 9 cores with a current of half the magnitude required to magnetize the cores; The Digit 1 line 1084-1 pulses all eleven cores in columns 1, 11, 21, 31 and 41 with a current of half the magnitude required to magnetize the cores. Therefore the Digit 9 core in each column 1, 11, 21, 31 and 41 should be magnetized. However, the Word 2 line 1086-2 pulses all eleven cores of all ten columns corresponding to Word 2, with a current of opposite polarity, and half the magnitude required to magnetize a core, this latter pulse inhibits the magnetizing of the Digit Value 9 core in column 1 of Word 2 but is not sufficient to magnetize the other cores which it links. Similarly the Word 3, Word 4 and Word 5 lines 1086-3, 1086-4 and 1086-5 inhibit storage of a Digit 9 in columns 21, 31 and 41. The Word 1 inhibit line 1086-1 is not pulsed and therefore the Digit 9 is stored in column 1 of Word 1. Similarly other digits are stored by coincidence of a Digit Value pulse and a Digit pulse and the absence of the inhibiting Word pulse.

*Read-Out*

The manner in which the stored data is read out synchronously with the movement of the print bars is described hereinbefore. The data is read out of the Core Buffer 1078 by read-out signals generated by cam operated contacts in the "IBM" 419 which are fed through lines 1088 and the Digit Value lines to the Core Buffer 1078. The signals on the line 1088 are of sufficient magnitude to magnetize a core in a sense opposite the stored state and to thereby induce a signal on an output line 1090. The read out signals from the lines 1088 are fed through the Digit Value lines in the Core Buffer 1078 and therefore read out all forty-four columns in parallel; therefore forty-four read out lines 1090 are required. The forty-four lines 1090 feed into a Relay unit 1091 where each line 1090 may energize a corresponding relay. It is through circuits completed through contacts of the relays in the Relay unit 1091 and through forty-four lines 1092 that the print bars are arrested as described hereinbefore. The relays also complete Digit circuits through other contacts of the same relays and Digit lines 1093 to pulse Digit columns of cores in a Core Buffer 1094. The Digit column pulses combined with Digit Value pulses on eleven lines 1095 store the readout data from Buffer 1078 in Buffer 1094. The Digit Value pulses on the lines 1095 are generated by cam operated contacts in the "IBM" 419.

The Core Buffer 1094 contains data previously read out of 1078 while 1078 contains the data from a succeeding check. Therefore, by reading data out of 1094 at the same time data is read out of 1078, the machine simulates the reading of two successive cards at two successive read stations. The data in 1094 is read out by signals on eleven lines 1099 of sufficient magnitude to reverse the cores. The signals on the lines 1099 are generated by the same cams that generate the read out signals on the lines 1088.

The data is read out on forty-four lines 1096 to a Relay unit 1097 similar to the Relay unit 1091 and through lines 1098 to the "IBM" 419 where it may be compared in the usual manner with data fed in from the relay unit 1091 through the line 1092.

At a predetermined point in the operational cycle of the "IBM" 419, cam operated contacts close to emit a signal on the FEED CALL line 837 which is fed back to the Sorter-Reader to release a check from the Delay station in the manner described hereinbefore.

Components

The components described hereinafter are generally transistor components although a few are diodes. Many of the components are described in pending applications or issued patents and therefore only a block representation and not the circuit is shown and the description is general. Reference to the cited applications and patents may be made for details of the components. Positive and negative signals imply only the direction of shift of potential and not an absolute value. The components for which a reference may not be readily cited, are shown both in circuit and block forms. In FIGS. 25j through 25s, some of the blocks show a line energizing from a block and feeding back into the same block. These lines indicate only an external connection to a resistor and not a logical function. Generally the inputs to the components are on the left side of the block and the outputs on the right side.

Like components have like designations with a serialized suffix to distinguish them. For example two input AND circuits are designated A2–1 and A2–2. The first digit "2" indicates the number of inputs and the digit following the dash (—) is a serial number to distinguish one two-input AND circuit from all others. The first numbered four-input AND is designated A4–1.

Inverter

FIG. 28a is a block representation of an NPN type inverter having the collector connected through a load resistor to a positive potential supply whereas the emitter is connected directly to a negative potential. When the base is negatively biased below the emitter potential, the device is in a non-conducting state. A positive input to the base brings the device to a conducting state and an output terminal connected to the collector end of the load resistor goes negative. Conversely, when the input signal is removed, the device is cut OFF and the output goes positive. In the circuits of FIGS. 25j–25s, the NPN inverter is represented by a box labeled I.

FIG. 28b is a block representation of a PNP type inverter having the emitter grounded and the collector connected through a load resistor to a negative potential. The base is positively biased to a non-conducting state. A negative input to the base brings the device to a conducting state and an output terminal connected to the emitter end of the load resistor goes positive. Conversely, when the negative input signal is removed, the device is cut OFF and the output goes negative. In the circuits of FIGURE 25, the PNP inverter is represented by a box labeled —I.

Both the PNP and the NPN type inverters are shown and described in an application, Serial No. 459,322, filed Sept. 30, 1954, on behalf of G. A. Bruce, et al., to which reference may be made for details.

Emitter Follower

FIG. 28c is a block representation of an NPN type emitter follower. The emitter follower is used for current amplification and as an impedance matching device. The collector is grounded and the emitter is connected through a load resistor to a negative potential. Its operation is Class A, that is, it is not completely cut OFF nor is it driven into saturation. At a selected low value input, the device is slightly conducting. A rise in the input is reflected as a rise in output from a terminal connected to the emitter end of the load resistor. A subsequent drop in the input potential also produces a drop in the output potential. In the circuits of FIGS. 25j–25s, the NPN type emitter follower is represented by a box labeled E.

FIG. 28d is a block representation of a PNP type emitter follower. This device has its collector tied to a negative potential and the emitter connected through a load resistor to a positive potential. The base is biased to permit a small current flow. A drop in the input potential causes the device to conduct more heavily and produces a drop in potential of an output terminal connected to the emitter end of the load resistor. Raising the input voltage again raises the potential of the output terminal. In the circuits of FIGS. 25j–25s, the PNP type emitter follower is represented by a box labeled —E.

The PNP and NPN type emitter follower are shown and described in application Serial No. 459,382, filed Sept. 30, 1945, on behalf of G. A. Bruce, et al. Reference may be made to that application for details.

Trigger

FIG. 28e is a block representation of a transistor trigger of the type shown and described in patent application Serial No.459,381, filed September 30, 1954 in behalf of R. A. Henle et al. Reference may be had to this application for details of the transistor trigger. The trigger is represented by a box labeled T. Generally, the trigger operates as follows: The trigger comprises two PNP type inverters having their collectors and bases cross-coupled, having the collectors common collected to a negative potential and the emitters grounded. In addition to the cross-coupling of the collectors and bases, each base has an input terminal 1 (or 2) for receiving signals for turning the trigger ON (and OFF). The ON state is defined as the state in which the right half of the trigger is conducting. The right-hand input terminal 1 is provided for receiving negative signals for turning the trigger ON, whereas a left-hand input terminal 2 is provided for receiving negative signals for turning the trigger OFF. An upper right hand terminal 5 is positive when the trigger is ON. An upper left hand terminal 6 is positive when the trigger is OFF. The trigger is normally OFF (right side conducting). A negative input to the terminal 1 cuts the right side OFF. The terminal 5 goes positive and the terminal 6 goes negative. A negative input to terminal 2 turns the left side OFF and the right side ON. Where a diamond is indicated in an input to one side of a trigger, it indicates that that side of the trigger, when non-conducting, must be conditional by a positive signal before a negative input to the opposite side can reverse the state of the trigger.

Diode AND

FIG. 28f illustrates the block representations of a positive and a negative diode AND circuit. A diode AND is well known in the art and a brief definition shall suffice. The positive AND is illustrated by a block labeled A whereas the negative AND is labeled —A. The positive AND comprises two or more diodes having their anodes common connected to an output terminal and through a load resistor to a positive potential. The cathodes are connected individually to input terminals which are biased sufficiently negative that the corresponding diodes conduct and the output is at a lower potential, than the other end of the load resistor. A positive input signal cuts OFF the corresponding diode. If any or all inputs remain at the relatively negative potential the output remains negative. If all inputs are made positive, the output goes positive.

A negative AND circuit has the diodes reversed and biased to a conducting state, negative signals to the anode inputs cuts OFF the corresponding diodes. When all diodes are cut OFF, the output goes negative. With any or all inputs positive the output is positive. With all inputs negative the output is negative.

Diode OR

FIG. 28g illustrates the block representations of a positive OR and a negative OR. The positive OR is like the negative AND, except that it is biased to a non-conducting state. A positive input to any or all input terminals effects a positive output. The positive OR is represented by a box labeled O. The negative OR is like the positive AND except that it is biased to a non-conducting state. A negative signal to any or all input terminals effects a negative output. The negative OR is represented by a box labeled —O.

*Clamp*

FIG. 28h is a block representation of a diode clamp circuit for limiting signals within predetermined limits. This is a conventional device and, in the circuits of FIGS. 25j to 25s, is used to limit signals to a 0 to —5 volt range.

Referring to FIG. 28i, the block representation of a PNP type AND-INVERTER is shown and designated AI. The AI circuit comprises two or more PNP type inverters, as described hereinbefore with reference to FIG. 28b, which are connected to a common load resistor. A negative signal to any one or to all of the inputs causes the corresponding PNP unit to conduct and causes the output terminal to go positive. Positive signals to all inputs cuts off all PNP units and the output goes negative.

Referring to FIG. 28j, the block representation of a PNP type AND-EMITTER FOLLOWER is shown and designated AE. The AE circuit comprises two or more PNP type emitter followers connected to a common load resistor to perform the AE function. The emitter followers are the type described with reference to FIG. 28d. A negative signal to one or all of the inputs causes the corresponding PNP units to conduct and the output goes negative, following the input signal. If positive signals are applied to all input terminals, the output goes positive.

Referring to FIG. 28k, the block representation of an NPN type AND-EMITTER FOLLOWER is shown and designated —AE. The —AE circuit comprises two or more NPN type emitter followers connected to a common load resistor. The emitter followers are of the type described with reference to FIG. 28c. The device normally conducts at a relatively high rate. A negative signal to all of the inputs causes the coresponding NPN units to conduct at a reduced rate and the output goes negative. With one or more inputs positive, the corresponding NPN units conduct at the higher rate and the output is positive.

Referring to FIG. 28m, the block representation of an NPN type OR-INVERTER is shown and designated OI. The OI circuit comprises two or more NPN type inverters connected to a common load resistor. The inverters are of the type described with reference to FIG. 28a. A positive signal to any or all of the inputs causes the corresponding NPN unit to conduct and the output goes negative. Negative signals to all inputs cause the output to positive.

*Complementary Emitter Follower*

FIG. 28n is a block representation of a complementary emitter follower. This is a unit comprising an NPN and a PNP unit connected together so as to use the advantages of both. This unit is used where large capacitive loads are to be driven or where the transition time of both sides of a signal must be held within specified limits. The collector of the NPN unit is grounded and the collector of the PNP unit is tied to a negative potential. The two emitters are common connected to an output terminal. The two bases are common connected to an input terminal. A shift in input potential results in a corresponding shift in output potential.

This device is of the general type shown and described in U.S. Pat. No. 2,666,818 issued Jan. 19, 1954, to W. Shockley. In the circuits of FIGS. 25j–25s, the complementary emitter follower is represented by a box labeled EC.

*Relay Driver—Thyratron—Relay*

FIGURE 28o is a circuit including a relay driver, a thyratron, and a relay circuit. The relay driver, shown in FIGS. 25j–25s, as a block labeled RD, is identical to the NPN type inverter described with reference to FIG. 28a, except that the output is connected between two series connected load resistors. The thyratron is an NP junction type having the base connected to the output of the relay driver, the emitter grounded, and the collector connected to the relay circuit. In the circuit of FIGS 25j–25s, the thyratron is represented by a block labeled TH. The thyratron is the type shown and described in application 458,619, filed Sept. 27, 1954 on behalf of R. F. Rutz. Reference may be made to that application for details.

A positive signal is applied to the relay driver and the negative output therefrom is applied to the base of the thyratron causing the thyratron to start conducting. Once conduction has started, the base no longer controls conduction. Conduction stops when the relay contact in the collector circuit are opened. The resistor is placed across the relay coil to reduce the initial impedance of the coil enough to prevent misfiring, of the thyratron.

Referring to FIG. 27p, the circuit and block representation of a single shot multivibrator are shown and are designated SS. This device comprises four transistors *a*, *b*, *c*, and *d*. Transistor *a* is a PNP type inverter which is normally OFF. Transistors *b* and *c* are an NPN and a PNP type respectively, *b* being normally OFF and *c* being normally ON. Transistors *b* and *c* are connected as a complementary inverter. Transistor *d* is the PNP type and is normally ON. A negative input to the base of *a* turns *a* ON and a positive signal from the emitter of *a* turns *b* ON and turns *c* OFF. The output from *b* and *c* renders negative the junction *e* of a 12K ohm resistor R and a 390 microfarad capacitor C to turn transistor *d* OFF. Transistor *d* remains OFF for a period of time required for the charge to leak off the capacitor C through the resistor R. When the potential of the junction *e* rises sufficiently due to the charge leaking off from the capacitor C, transistor *d* goes ON feeding a positive signal back to the base of transistor *a* to turn *a* OFF. A diode *f*, in conjunction with a resistor network between +10 and —15 volt potentials keeps transistor *a* from reading saturation and assures faster response. The complementary inverter including transistors *b* and *c* assure a fast rise and a fast fall of the output signal which is taken at a terminal *g*.

Referring to FIG. 28g, the circuit and block representation of a free running multivibrator are shown and are designated MV. A first PNP type transistor has its collector tied to a +1.5 v. and the emitter connected through a diode to —5 volts; through a resistor to —15 volts; through a capacitor and a potentiometer to —15 volts; and through the same capacitor to the base of a second PNP type transistor. The collector of the second PNP type transistor is grounded and the emitter is connected through a resistor to —15 volts; through a diode to —5 volts; through a capacitor to the base of the first PNP transistor and through a potentiometer to —15 volts; and through a parallel connected resistor and capacitor network to the two bases of a complementary emitter follower of the general type described with reference to FIG. 28n.

When the —15 volt negative bias through the potentiometers is applied to the bases of both transistors, it tends to bring both to a conducting state. It is an unstable circuit and one of the transistors, for example the one having the 2.7K ohm resistor in the emitter circuit will come into conduction faster than the other and the emitter end of the 2.7K ohm resistor goes positive, feeding a positive signal to the base of the second transistor having the 2.4K ohm resistor in the emitter circuit. The positive input to the base of the latter transistor prevents conduction. When the charge leaks off the 4700 microfarad capacitor below the cut off level, the second transistor conducts and the emitter end of the 2.4K ohm resistor goes positive, cutting off the first transistor which again conducts when the charge leaks off the 5600 microfarad condenser below the cut off value. In the foregoing manner, the two transistors go ON and OFF, alternately, and the output from the emitter of the second transistor is fed into the complementary emitter follower, the output of which is utilized as described in the circuit description hereinbefore.

Referring to FIG. 28r, a circuit is shown comprising five input lines a, b, c, d and e connected through 51K ohm (51 thousand ohm) resistors to a line f. Each line a, b, c, d and e has a parallel connection through a 51K ohm resistor to a line g. Each line f and g is connected through its own 6.8K ohm resistor and its own 10K ohm potentiometer to a minus 90 volt (−90 v.) power supply. The opposite end of each line f and g is connected to its own neon light h and i respectively. The opposite side of the light h is connected to an output terminal j and through a 75K ohm resistor and a 50K ohm potentiometer to a plus 48 (+48 v.) power supply. The opposite side of the neon light i, is connected to an output terminal k, and through a 75K ohm resistor and a 50K ohm potentiometer to the +48 v. supply. The potentiometers are adjusted in such a manner that an input signal to one of the lines a, b, c, d and e produces one increment of increase in potential at the terminal j and a different increase in potential at the terminal k. A coincident input to a second terminal produces another increment of rise of potential at the terminals j and k. Similarly, third, fourth and fifth coincident inputs to the lines a, b, c, d and e produce corresponding increases in the potential of the terminals j and k.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

We claim:

1. A document analyzing device comprising, in combination, a stationary curved element forming a document transport path, analyzing means mounted on said element adjacent said path, a circular element rotatably mounted adjacent one side of said curved element and having a document aligning flange integral therewith, a circular element rotatably mounted adjacent the opposite side of said curved element, a belt rotatably mounted in contact with last said circular element for cooperation therewith for moving a document past said analyzing means, means for feeding a document between last said circular element and said rotatable belt in alignment with said flange and a pressure element for maintaining said document closely adjacent said analyzing means.

2. The device of claim 1 wherein said document has informational indicia recorded thereon a predetermined spaced distance from a particular edge, and wherein said integral flange is spaced from said analyzing means a distance corresponding to said predetermined distance.

3. A device for analyzing random sized documents, each of which has a row of informational indicia recorded thereon a predetermined spaced distance from a particular edge, comprising, an analyzing station, transport means for successively moving said documents in a path from a source of supply past said analyzing station, an abutment extending along one side of said path at least from a point prior to said station to a point past said station, said abutment being spaced laterally from said station a distance corresponding to said predetermined distance, and means for urging said documents into alignment with said abutment concurrently with their movement toward said station.

4. A device for analyzing pliable random sized documents each of which has a row of informational indicia recorded thereon a predetermined spaced distance from a particular edge, comprising, an analyzing station, transport means for successively moving said documents in a path from a source of supply past said analyzing station, curved means positioned in said path to guide documents past said station, an aligning flange extending coextensively with said curved means along one side of said path, said flange being spaced laterally from said station a distance corresponding to said predetermined distance, and means for urging said documents laterally into alignment with said flange concurrently with their movement toward said analyzing station.

5. A device for analyzing random sized documents, each of which has a row of informational indicia recorded thereon a predetermined spaced distance from a particular edge, comprising, an analyzing station, a rotatable drum member having a cylindrical aligning portion and a cylindrical drive portion, said portions being affixed to a common shaft so that the respective peripheries of said portions rotate in circular paths on opposite sides of said analyzing station, a projecting flange extending around the periphery of the aligning portion of said drum, said flange being positioned laterally with respect to said analyzing station a distance corresponding to said predetermined distance, means for guiding each of said documents into peripheral engagement with said drum, means cooperating with said drive portion for rotating said drum and any document engaged therewith past said analyzing station, and means for urging said documents laterally into alignment with said flange concurrently with their movement toward said analyzing station.

6. A device for analyzing random sized documents, each of which has a row of magnetic informational indicia recorded thereon a predetermined spaced distance from a particular edge, comprising, means at an analyzing station for detecting the magnetic indicia on said documents, transport means for successively moving said documents in a path from a source of supply past said analyzing station, an aligning flange extending along one side of said path at least from a point prior to said station to a point past said station, said flange being spaced laterally from said station a distance corresponding to said predetermined distance, and means for urging each said document laterally so that said particular edge of each document is in contact with said flange concurrently with its movement past said station.

References Cited in the file of this patent

UNITED STATES PATENTS

| | | |
|---|---|---|
| 1,058,314 | Lynch | Apr. 8, 1913 |
| 1,214,474 | Jones | Jan. 30, 1917 |
| 1,835,382 | Cunningham | Dec. 8, 1931 |
| 1,955,819 | Maul | Apr. 29, 1934 |
| 2,000,214 | Campbell | May 7, 1935 |
| 2,359,670 | Page | Oct. 3, 1944 |
| 2,369,794 | Phinney et al. | Feb. 20, 1945 |
| 2,490,085 | Nordquist | Dec. 6, 1949 |
| 2,514,037 | Daly | July 4, 1950 |
| 2,529,513 | Pechy | Nov. 14, 1950 |
| 2,533,309 | Blakely | Dec. 12, 1950 |
| 2,567,552 | Cronin | Sept. 11, 1951 |
| 2,617,528 | Moore | Nov. 11, 1952 |
| 2,620,924 | Kusters | Dec. 9, 1952 |
| 2,639,149 | Hampton | May 19, 1953 |
| 2,669,454 | Babicz | Feb. 16, 1954 |
| 2,787,383 | Rehberg | Apr. 2, 1957 |
| 2,791,328 | Beardsley | May 7, 1957 |
| 2,792,175 | Amundsen | May 14, 1957 |
| 2,795,328 | Tyler et al. | June 11, 1957 |
| 2,808,930 | Reilly | Oct. 8, 1957 |